US009236637B2

(12) United States Patent
Anderson

(10) Patent No.: US 9,236,637 B2
(45) Date of Patent: Jan. 12, 2016

(54) ELECTRIC VEHICLE SOLAR CHARGING SYSTEM

(76) Inventor: Lawrence Everett Anderson, Arlington, VA (US)

( * ) Notice: Subject to any disclaimer, the term of this patent is extended or adjusted under 35 U.S.C. 154(b) by 850 days.

(21) Appl. No.: 13/118,449

(22) Filed: May 29, 2011

(65) Prior Publication Data

US 2011/0241604 A1    Oct. 6, 2011

Related U.S. Application Data

(63) Continuation-in-part of application No. 13/020,800, filed on Feb. 3, 2011, now Pat. No. 8,022,667, which is a continuation-in-part of application No. 12/860,876, filed on Aug. 21, 2010, now Pat. No. 7,954,977, which is a continuation of application No. 12/462,555, filed on Aug. 5, 2009, now Pat. No. 7,789,524.

(51) Int. Cl.
| | |
|---|---|
| *H02J 7/00* | (2006.01) |
| *H01M 10/44* | (2006.01) |
| *H01M 10/46* | (2006.01) |
| *B60L 8/00* | (2006.01) |
| *B60L 11/18* | (2006.01) |

(52) U.S. Cl.
CPC ............... *H01M 10/44* (2013.01); *B60L 8/003* (2013.01); *B60L 8/006* (2013.01); *B60L 11/1818* (2013.01); *B60L 11/1824* (2013.01); *B60L 11/1827* (2013.01); *H01M 10/46* (2013.01); *B60L 2230/22* (2013.01); *B60L 2230/24* (2013.01); *Y02T 10/7005* (2013.01); *Y02T 10/7083* (2013.01); *Y02T 10/7094* (2013.01); *Y02T 90/121* (2013.01); *Y02T 90/125* (2013.01); *Y02T 90/14* (2013.01)

(58) Field of Classification Search
USPC ........................................... 320/101; 136/245
See application file for complete search history.

(56) References Cited

U.S. PATENT DOCUMENTS

| | | | |
|---|---|---|---|
| 3,876,925 | A | 4/1975 | Stoeckert |
| 5,461,298 | A | 10/1995 | Lara et al. |
| 5,462,439 | A | 10/1995 | Keith |
| 5,629,603 | A | 5/1997 | Kinoshita |
| 5,995,000 | A * | 11/1999 | King .............................. 340/438 |
| 6,590,363 | B2 | 7/2003 | Teramoto |
| 7,731,383 | B2 | 6/2010 | Myer |
| 2002/0139413 | A1* | 10/2002 | Sasaki ........................... 136/246 |

(Continued)

FOREIGN PATENT DOCUMENTS

DE          4003513 A1 *    8/1991

*Primary Examiner* — Arun Williams

(57) ABSTRACT

An assembly for recharging an electric vehicle comprising at least one solar panel positioned above surface of a vehicle; at least one motor assembly operatively connected to the at least one solar panel for positioning the at least one solar panel; the at least one solar panel operating to cover at least one window of the vehicle in a first position and to provide an unobstructed view in a second position; the panel moving from the first position to the second position by operation of the at least one motor assembly. A method of recharging an electric vehicle comprising placing a retractable solar collector on the roof of a vehicle, the retractable solar collector having an open position in which maximum exposure of the solar collector to the sun is enable, to a closed position in which the vehicle may be transported without the solar collector blocking the view of the driver, the retractor solar collector comprising interconnected sections which fold together in the closed position and which cover at least the windshield of the car in the open position.

13 Claims, 47 Drawing Sheets

(56) References Cited

U.S. PATENT DOCUMENTS

| | | |
|---|---|---|
| 2006/0149607 A1 | 7/2006 | Sayers |
| 2008/0100258 A1* | 5/2008 | Ward .......................... 320/101 |
| 2009/0079384 A1* | 3/2009 | Harris ......................... 320/102 |
| 2010/0029268 A1 | 2/2010 | Myers et al. |
| 2010/0190534 A1* | 7/2010 | Sun ............................. 455/573 |
| 2011/0005583 A1* | 1/2011 | Thomas ....................... 136/252 |

* cited by examiner

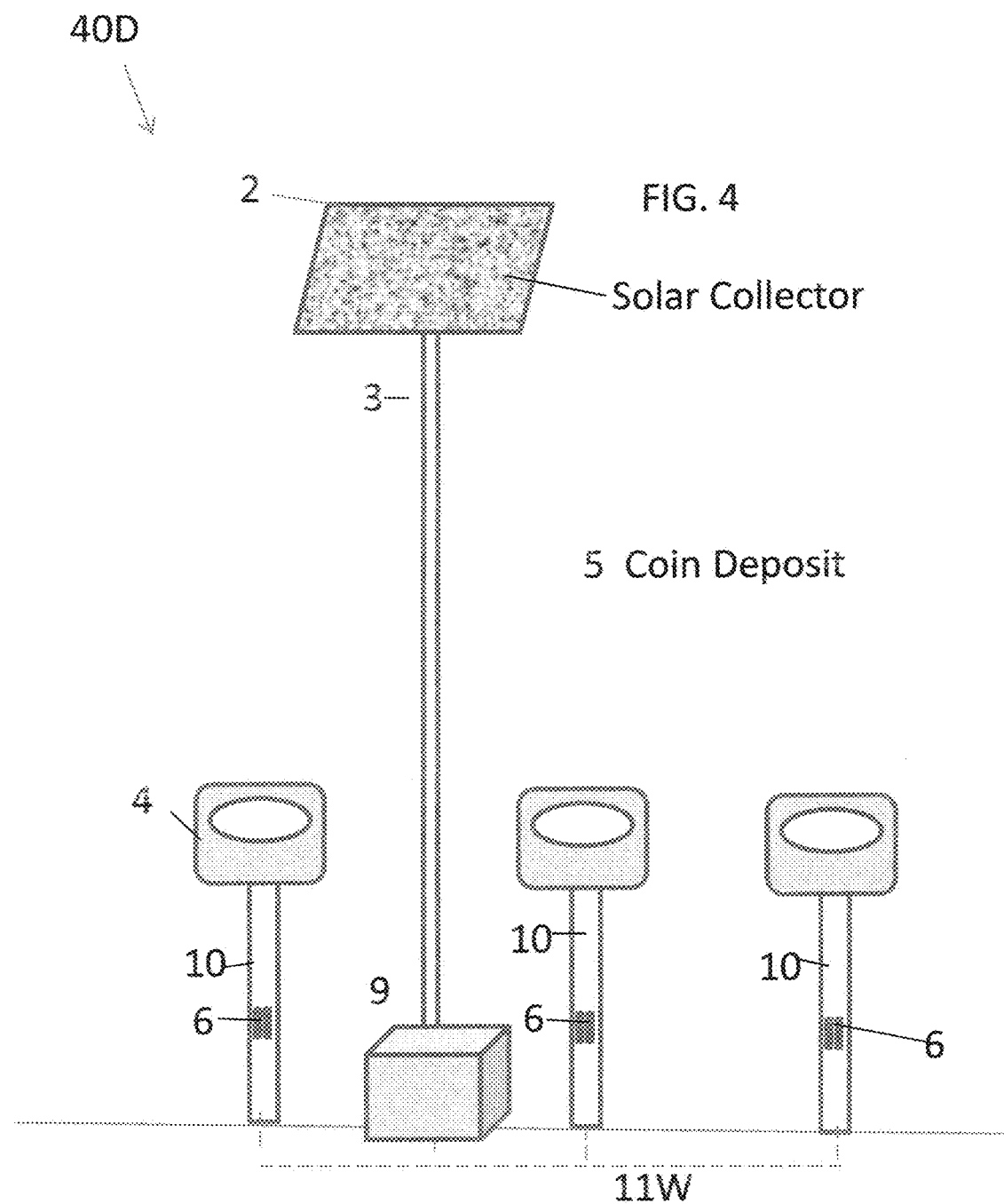

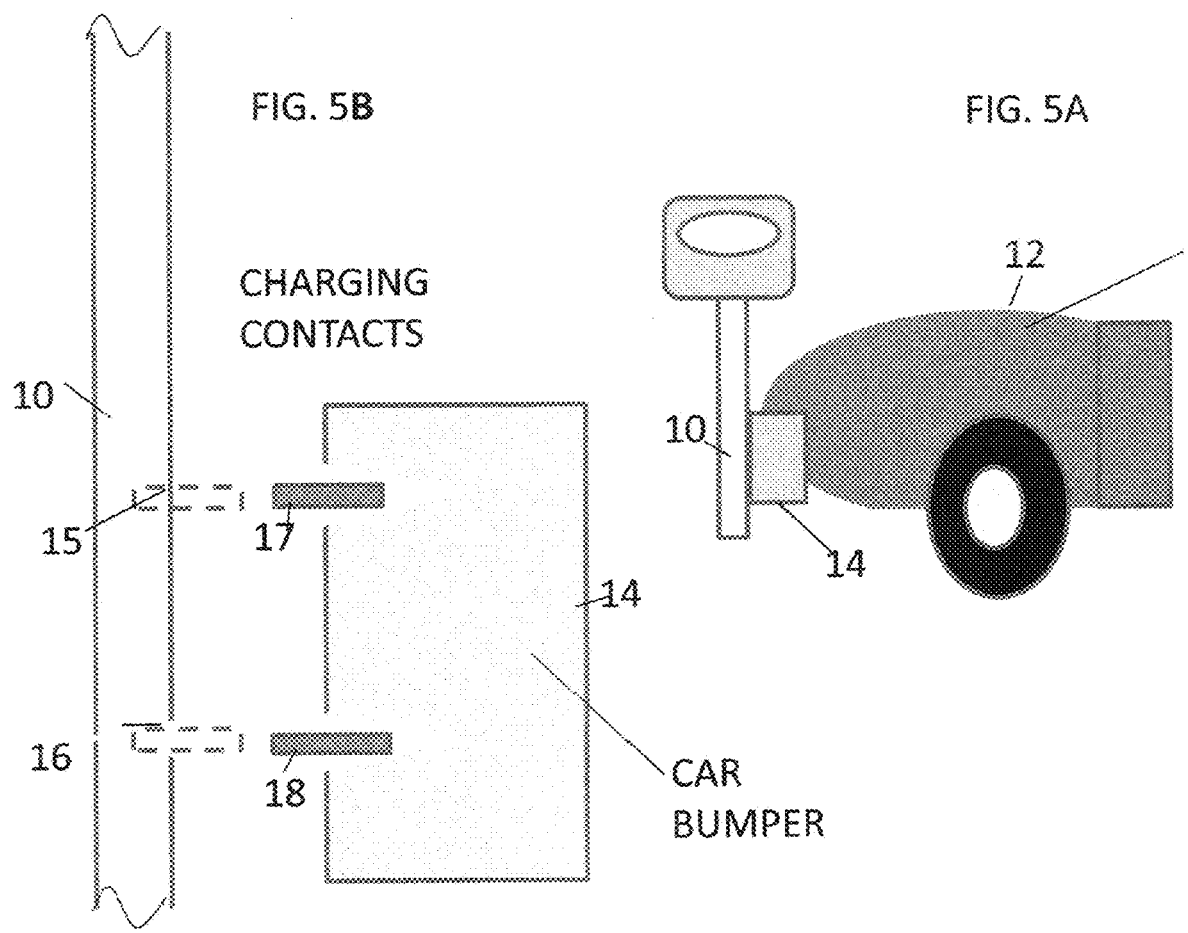

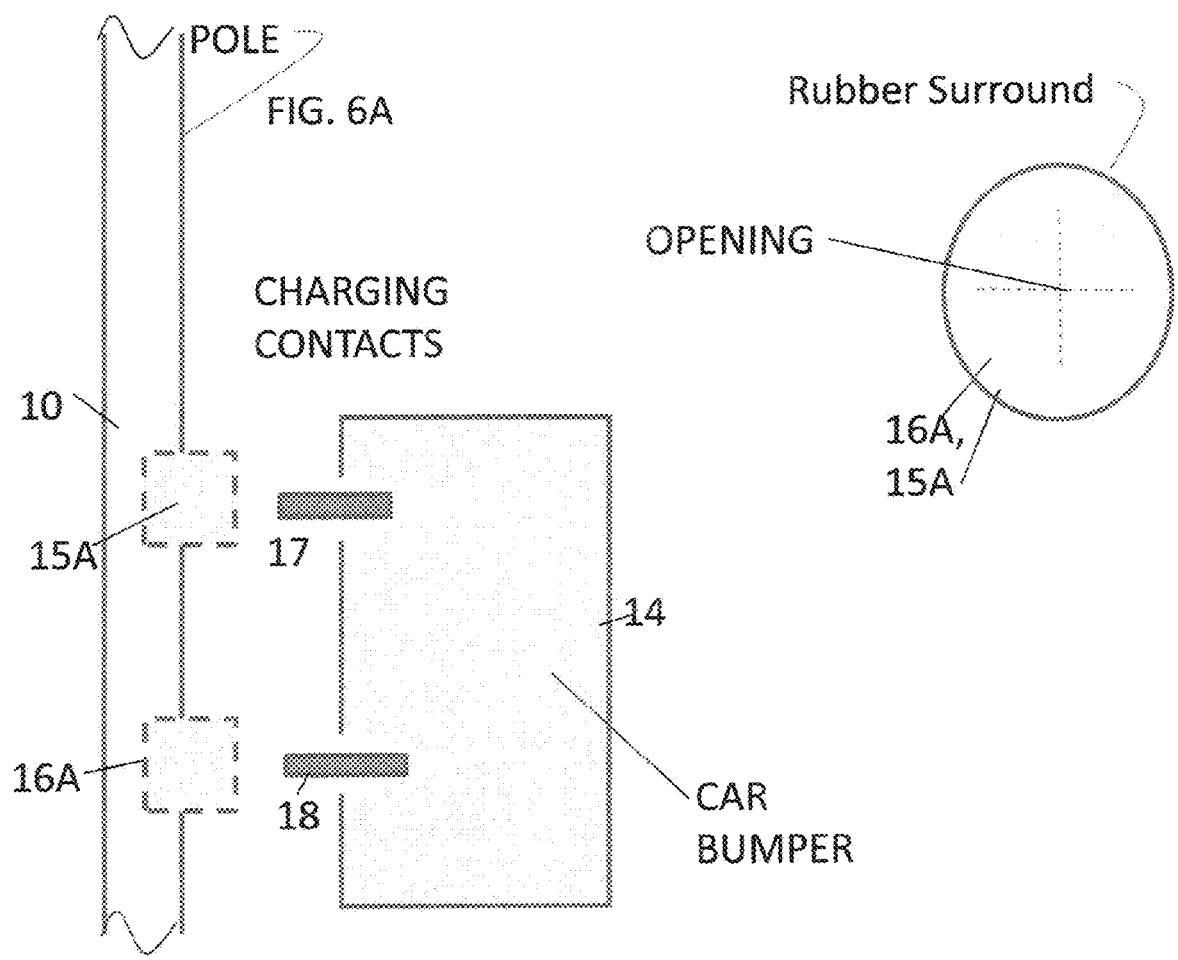

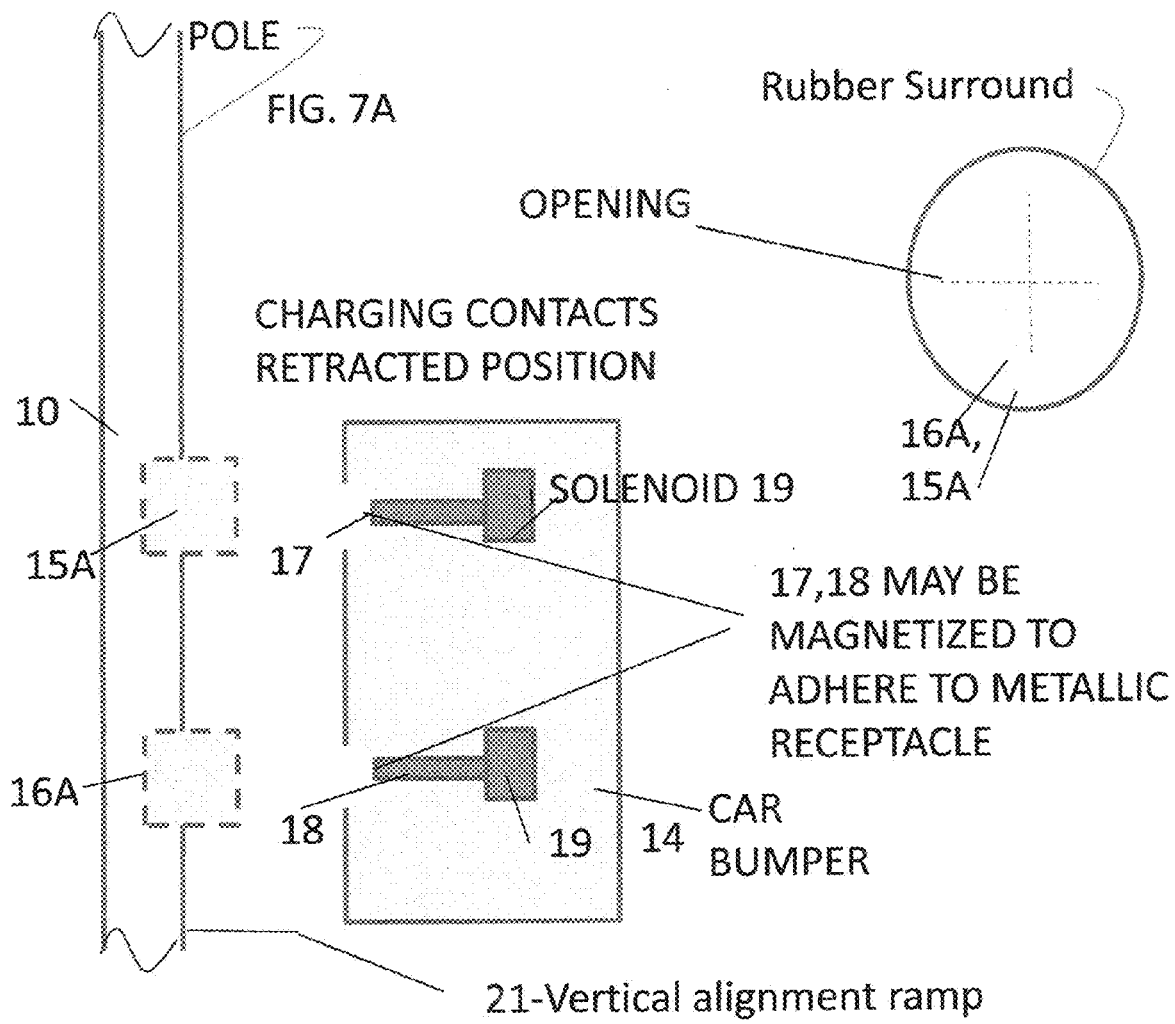

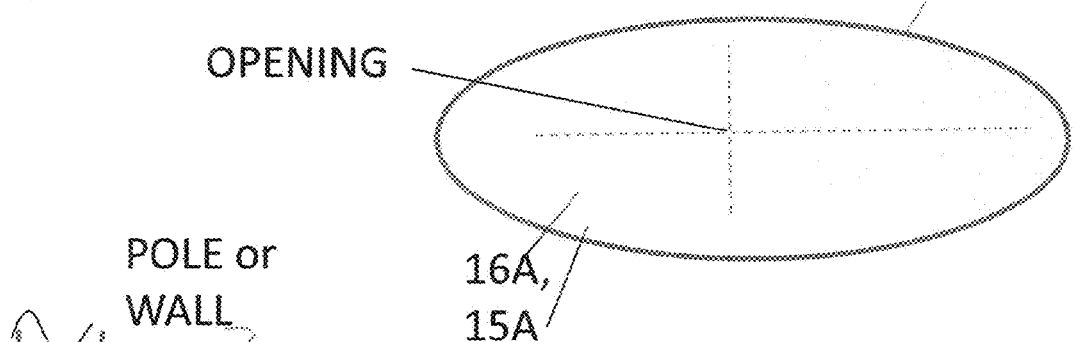
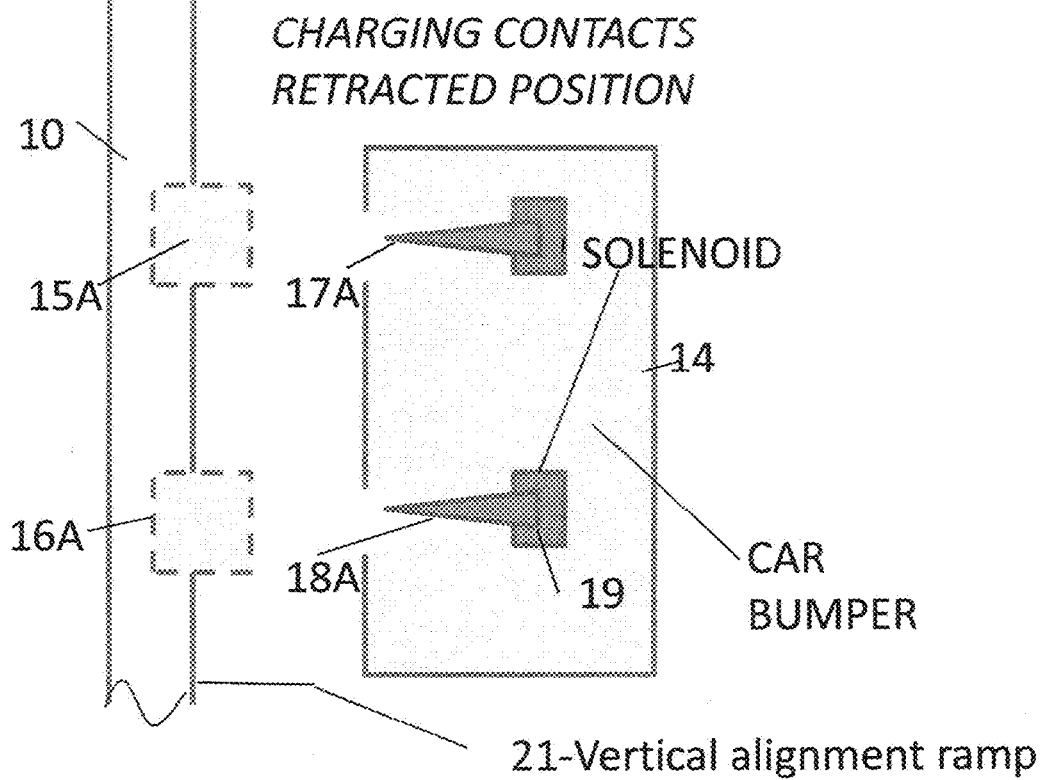

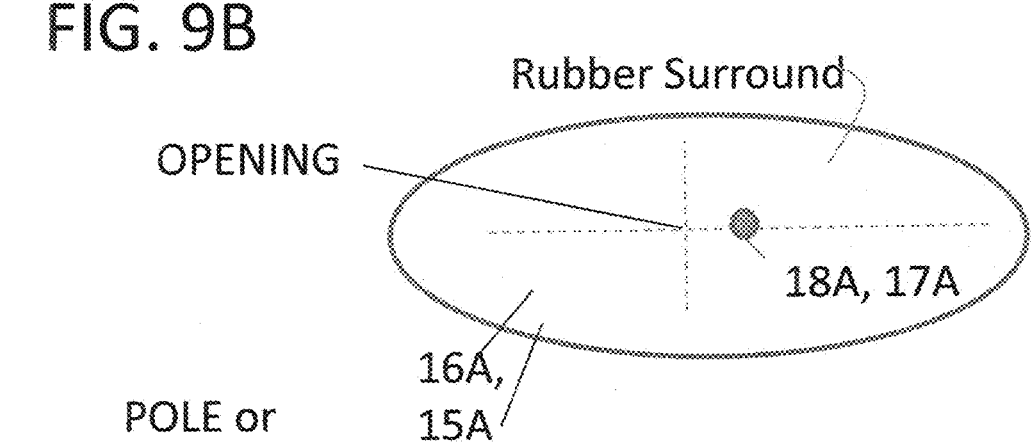
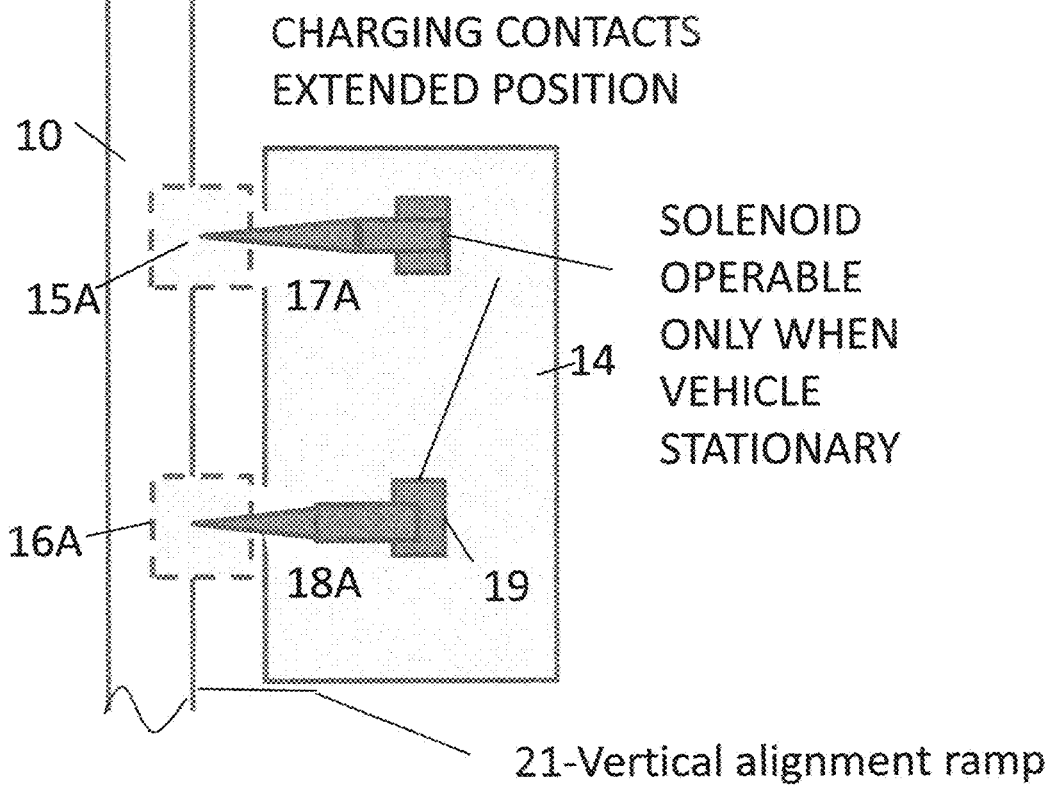

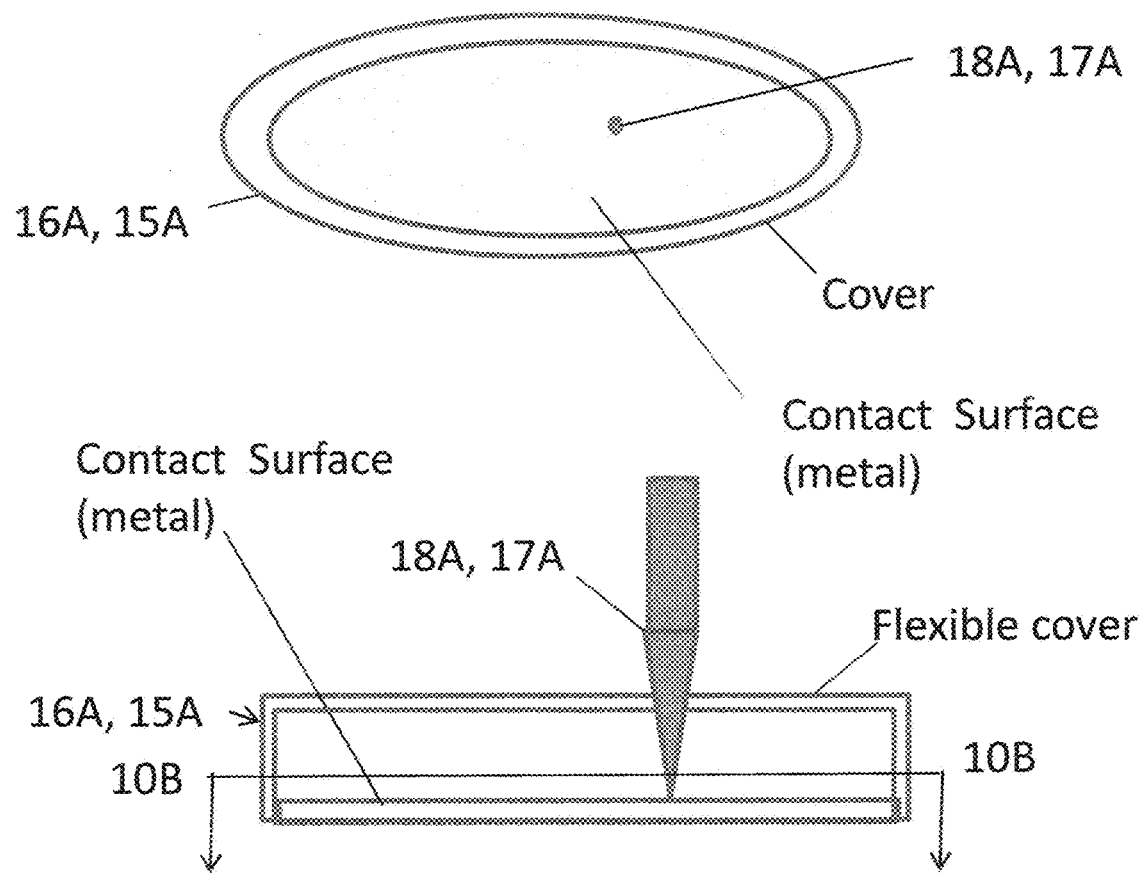

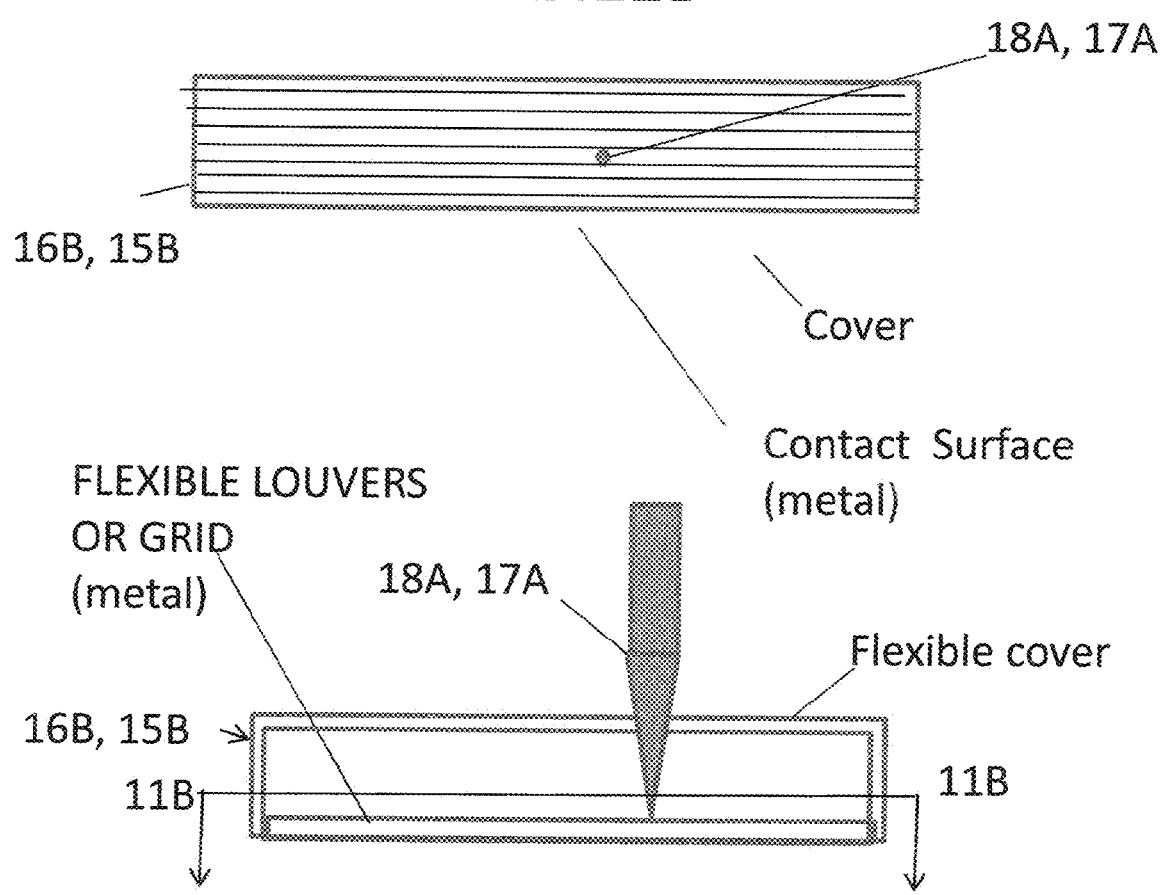

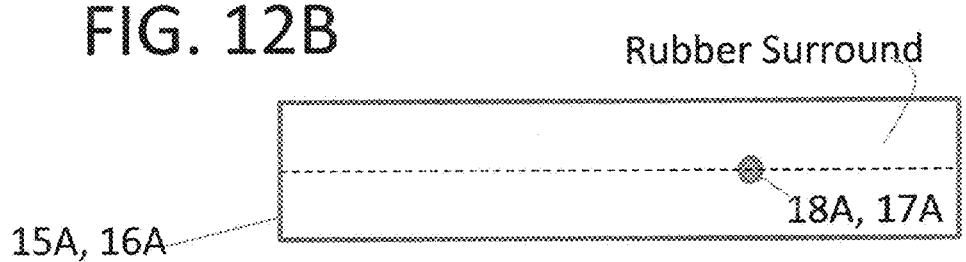
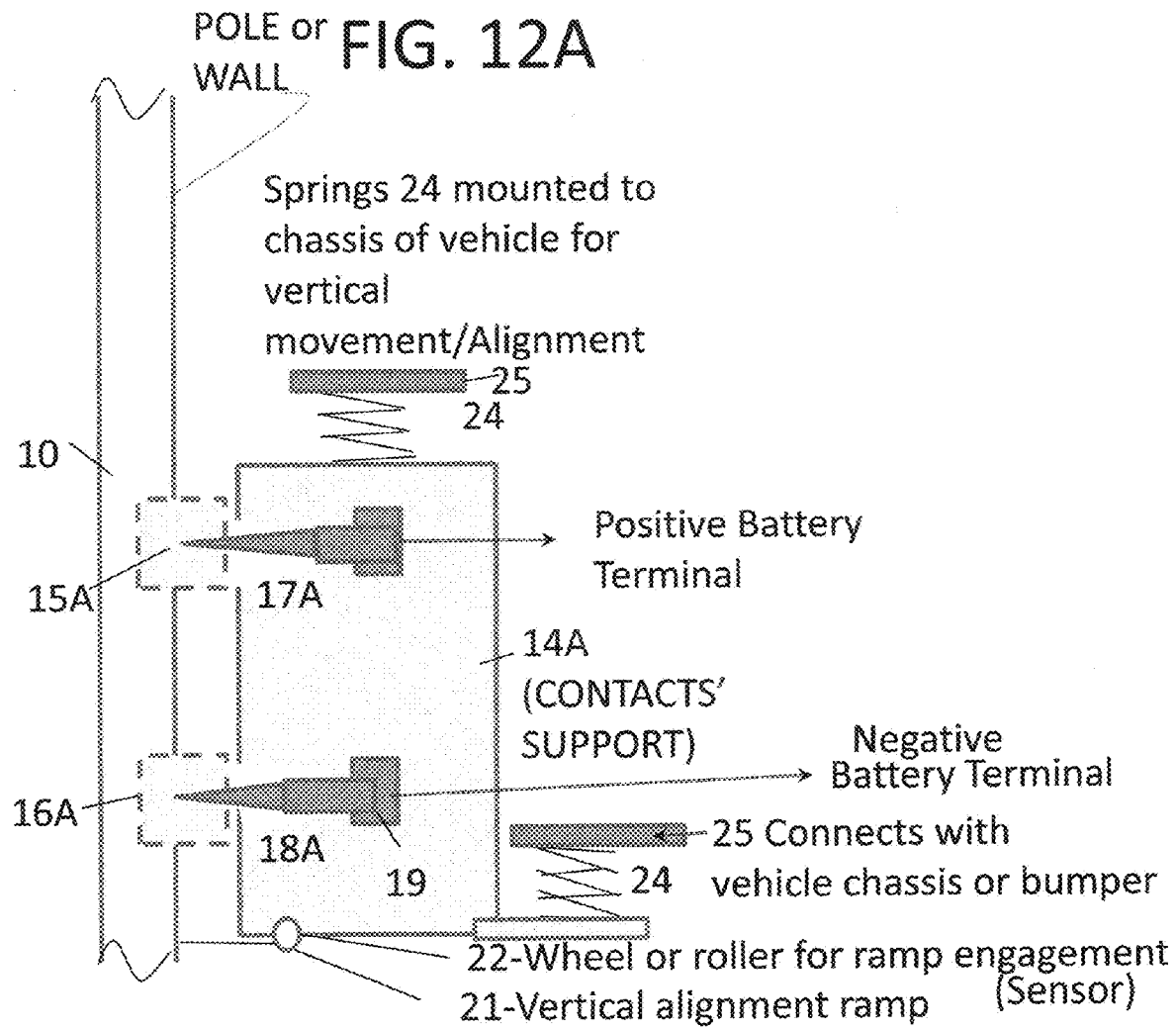

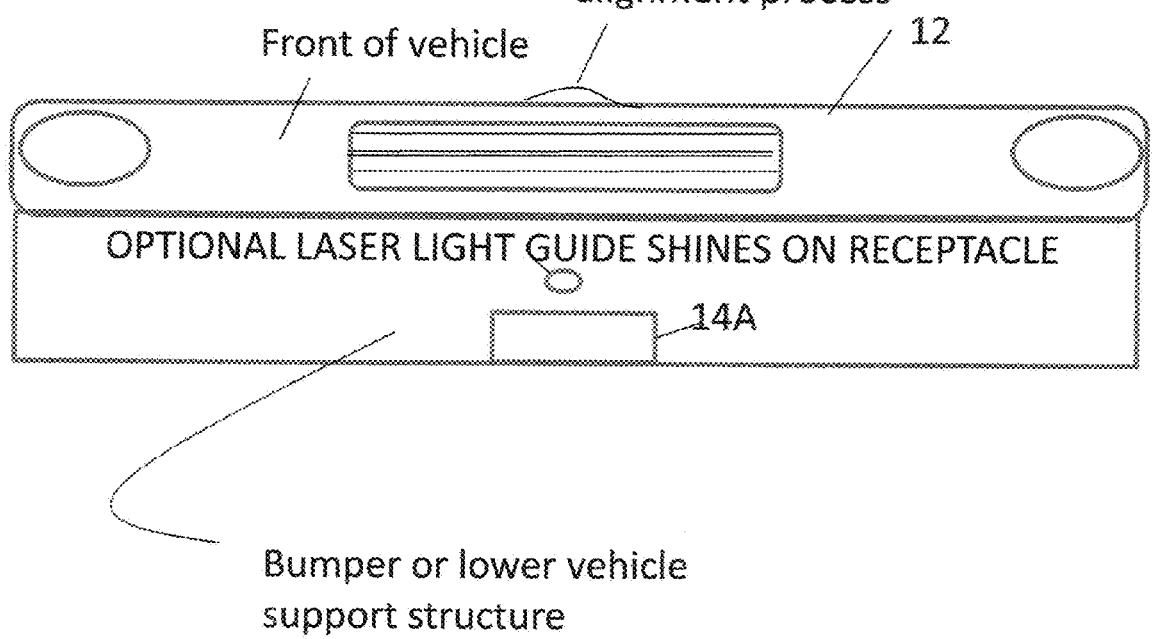

Lever 32 may be spring biased so that force generated by movement of car is necessary to actuate

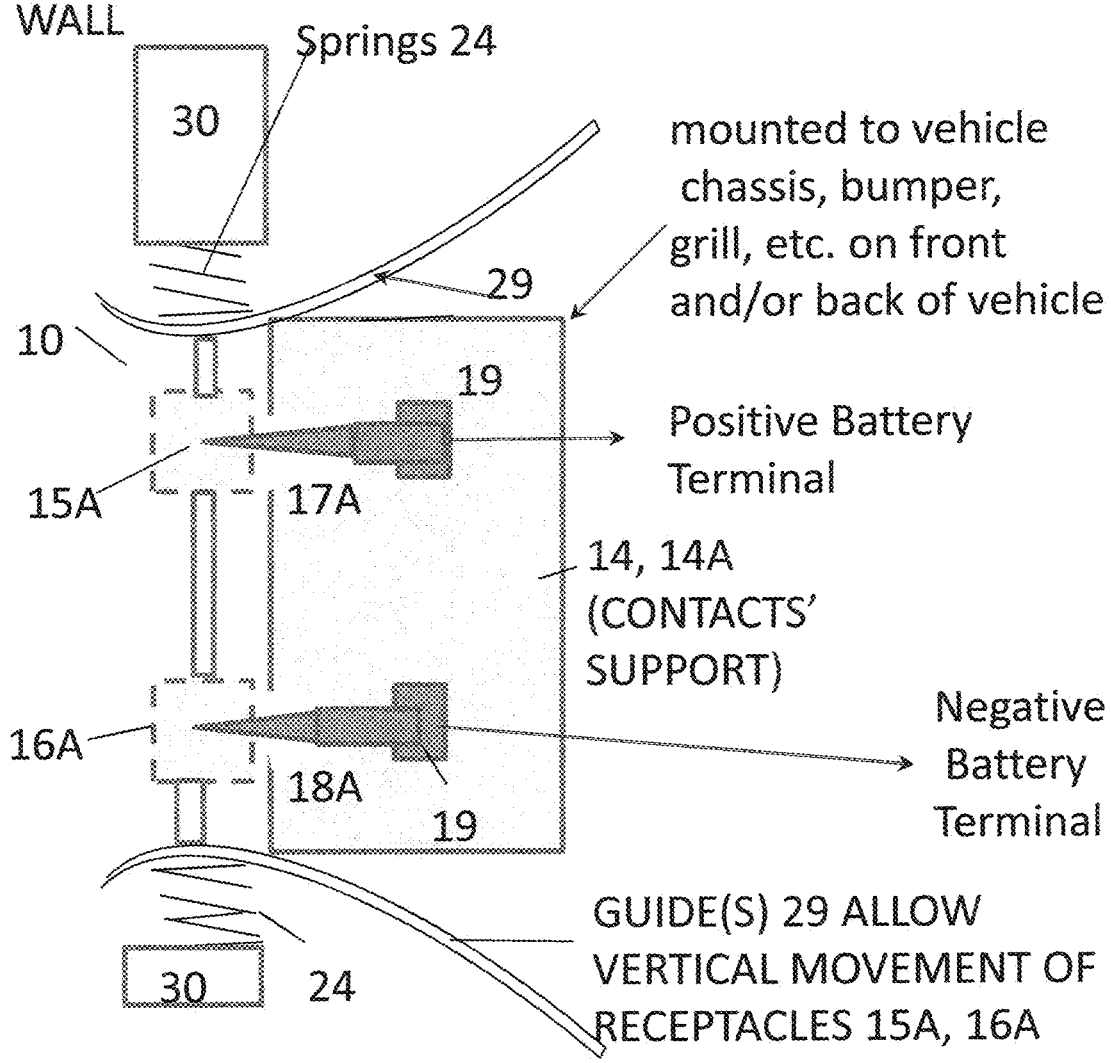

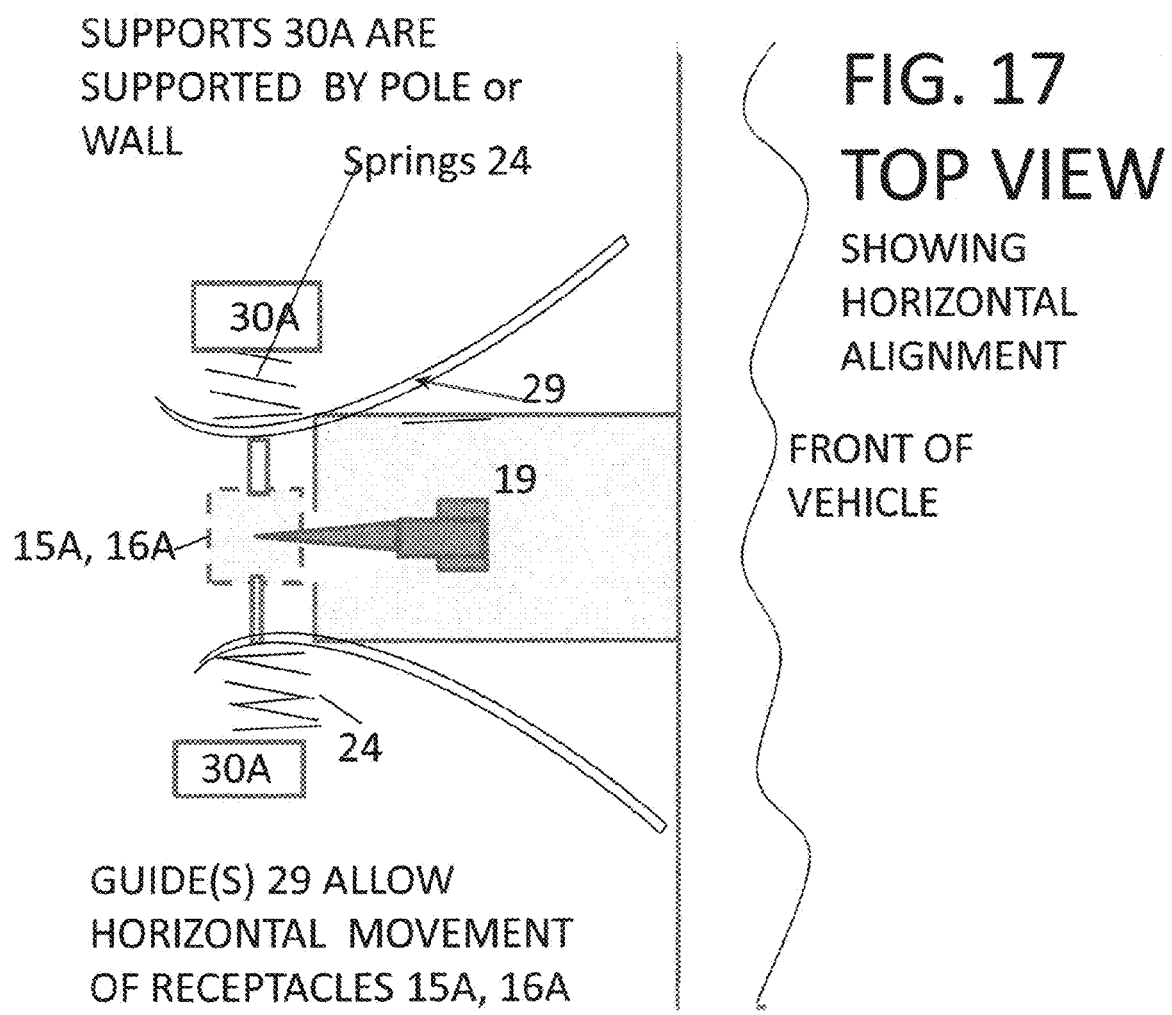

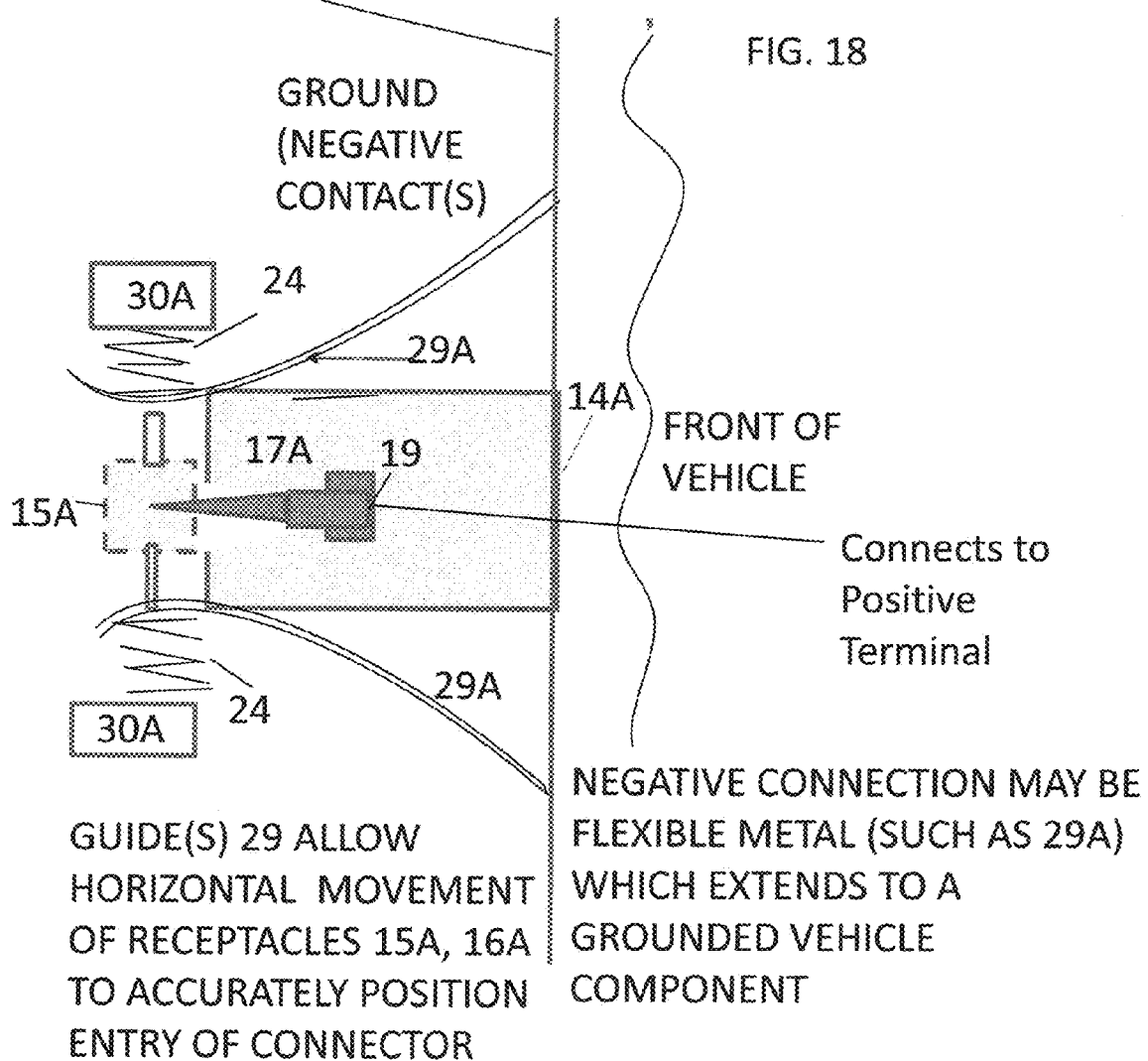

Tightly Strung WIRES (FOR EXAMPLE) MAKE CONTACT WITH 17A, 18A AND HOLD THE TIPS IN PLACE

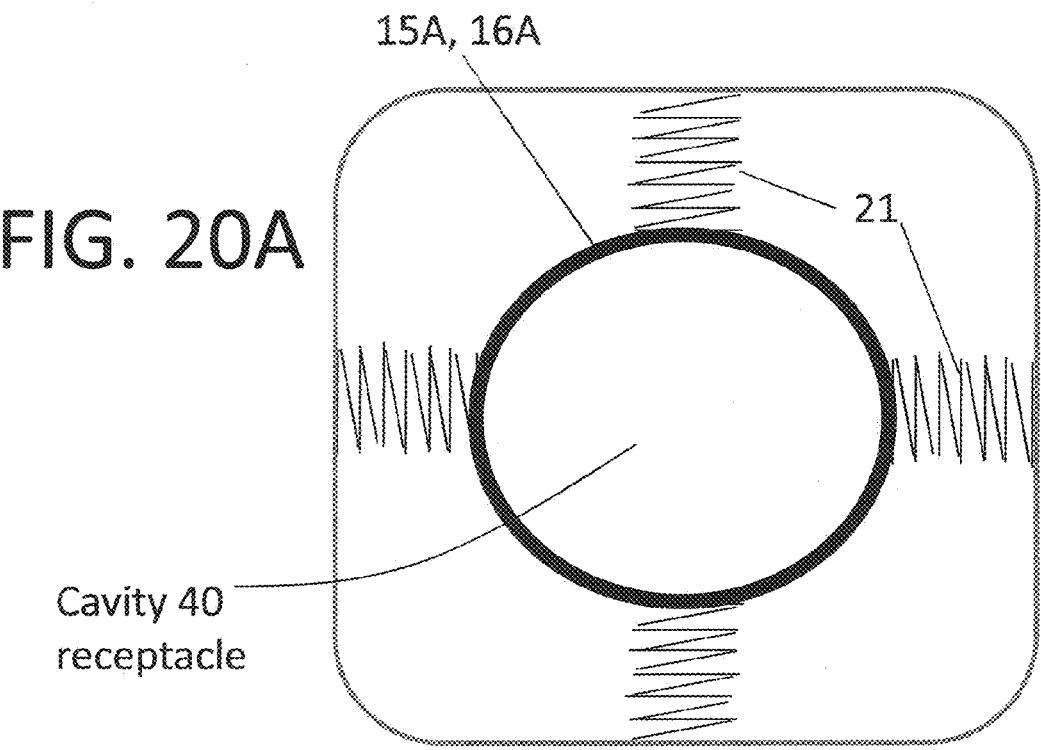
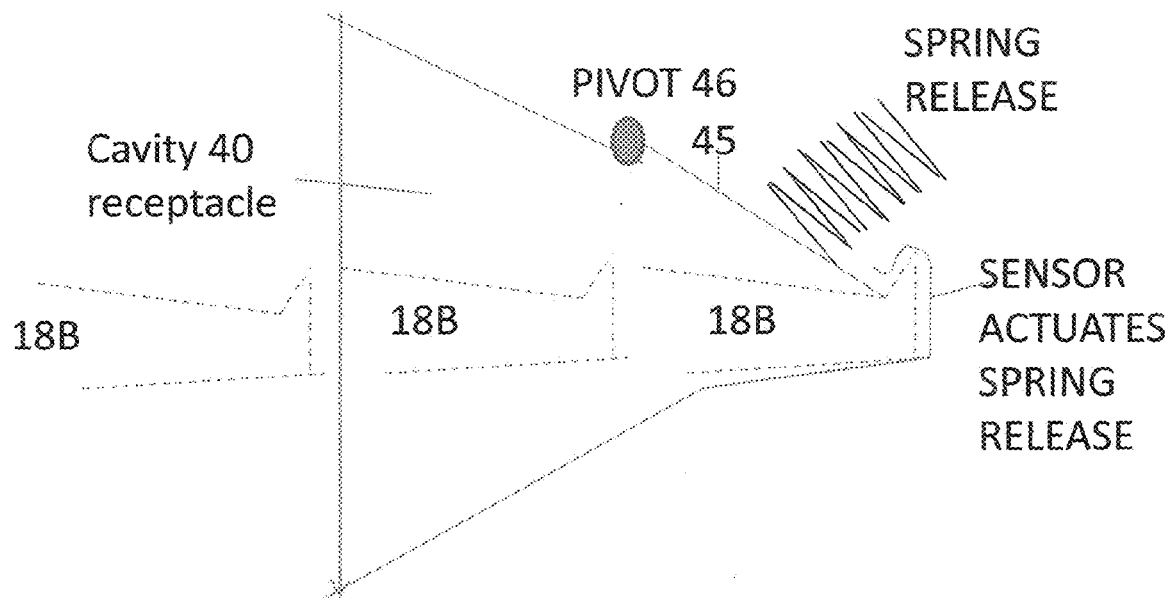

15A, 16A
21
41
Cavity 40 receptacle 18A
18A
41
ELECTRO MAGNETS/ SENSOR

Solar Collector serves dual purpose of keeping car cooler

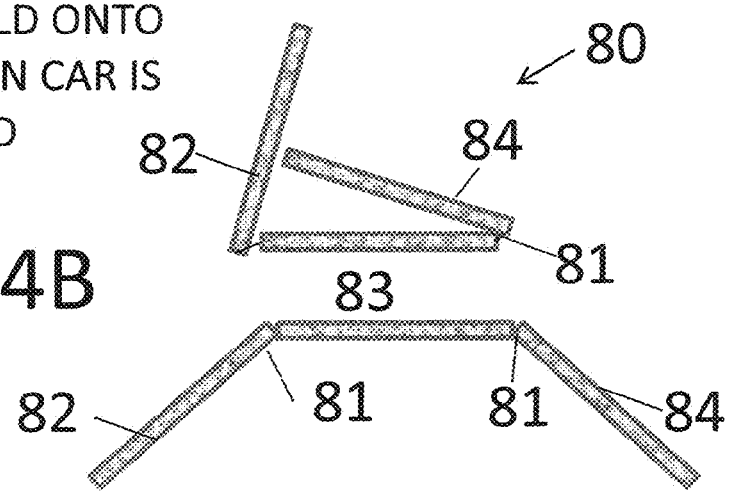
PANELS FOLD ONTO ROOF WHEN CAR IS NOT PARKED
FIG. 24B
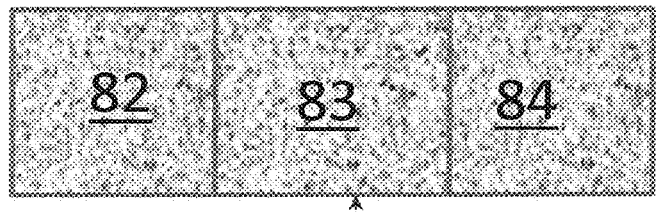
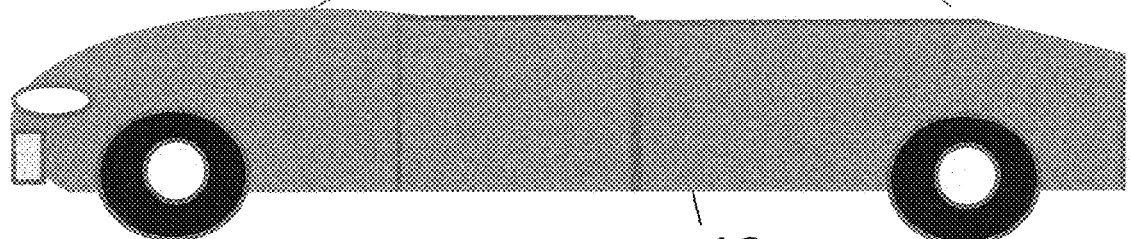
FIG. 24A PANELS FOLD INTO
ROOF WHEN CAR IS
NOT PARKED
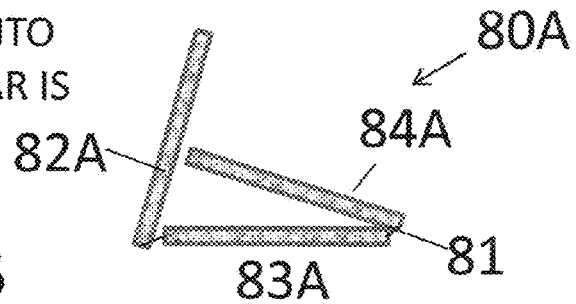
FIG. 25B
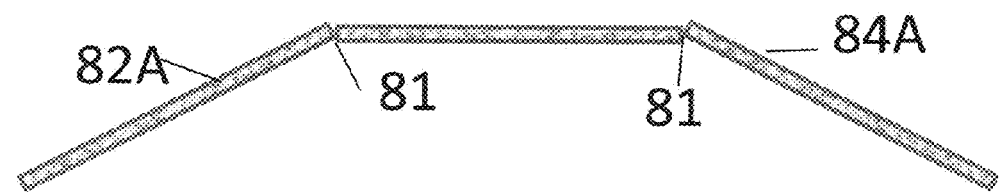
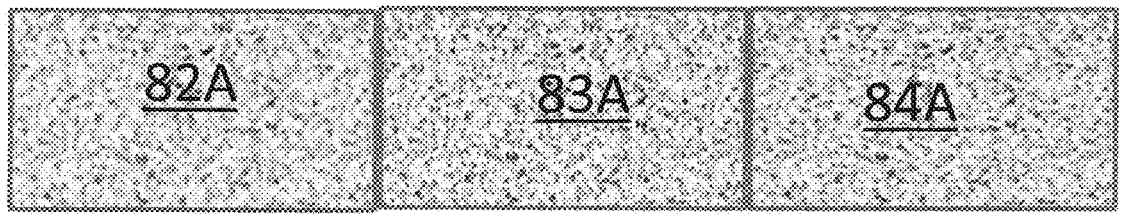
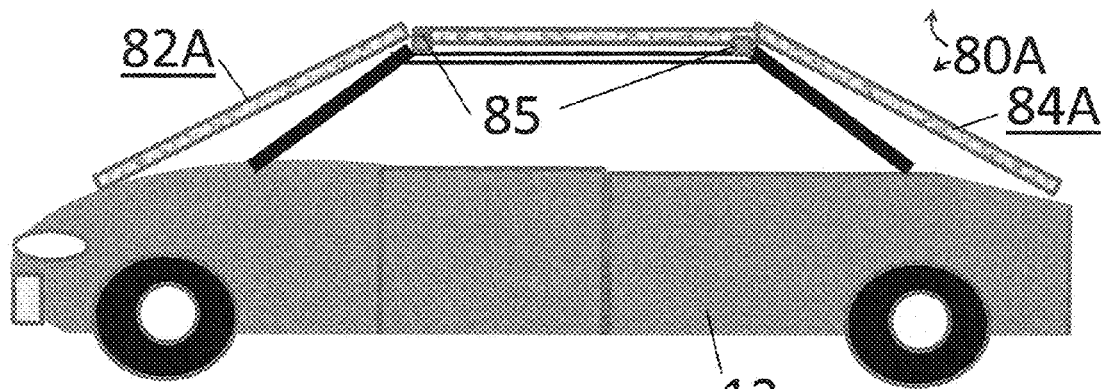
FIG. 25A

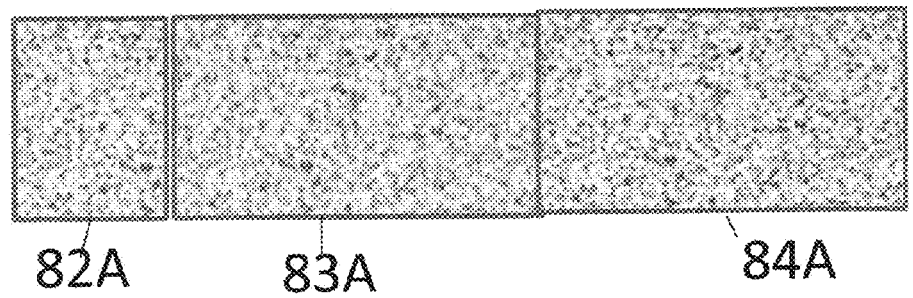
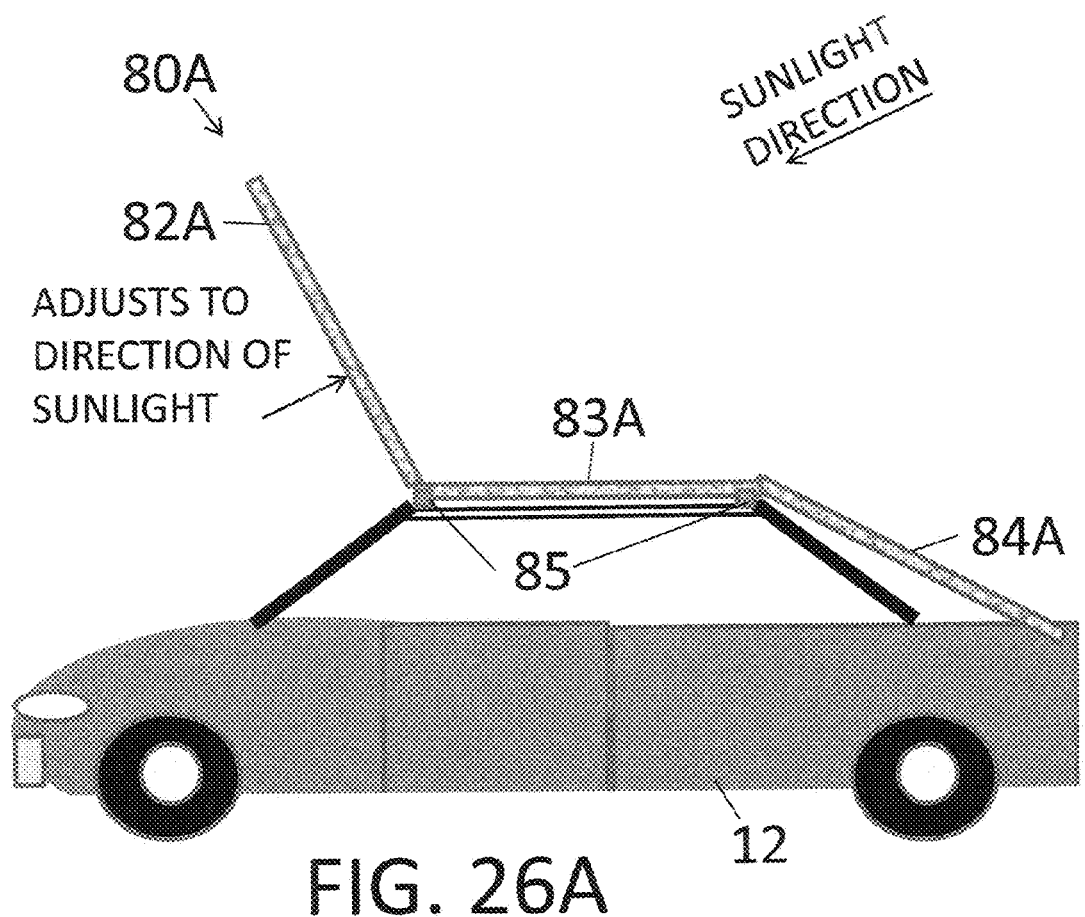

ADJUSTS TO DIRECTION OF SUNLIGHT

SUNLIGHT DIRECTION

AMOUNT OF CURRENT MEASURED AS PANEL IS SLOWLY ROTATED TO DETECT POINT OF MAXIMUM EXPOSURE

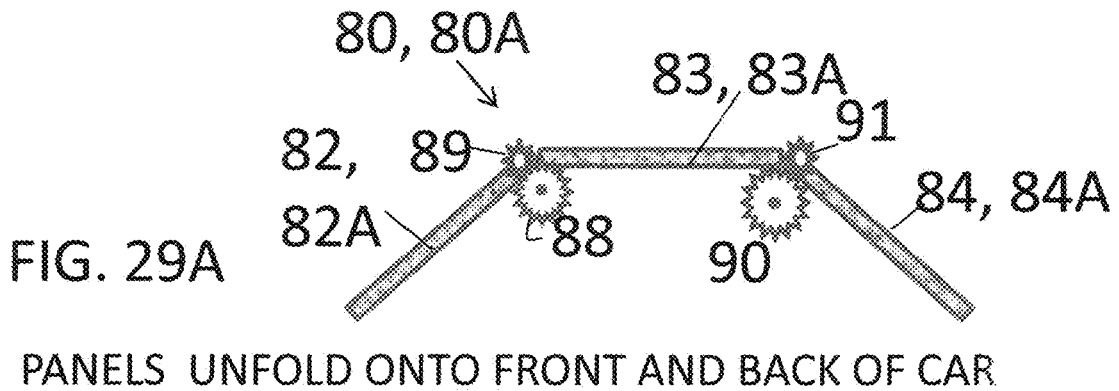
PANELS UNFOLD ONTO FRONT AND BACK OF CAR
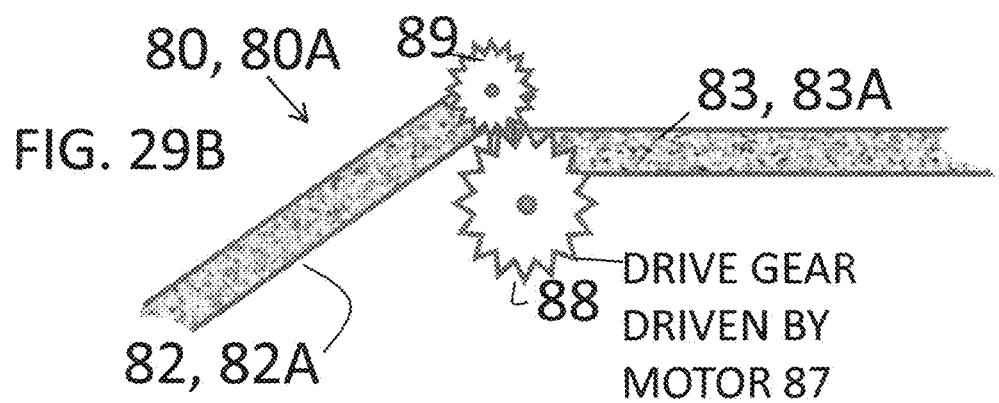
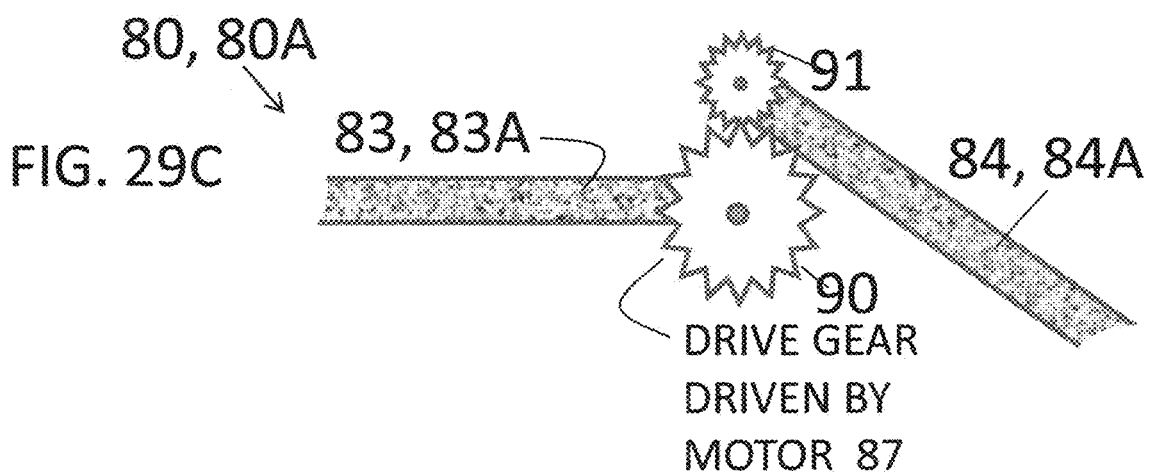
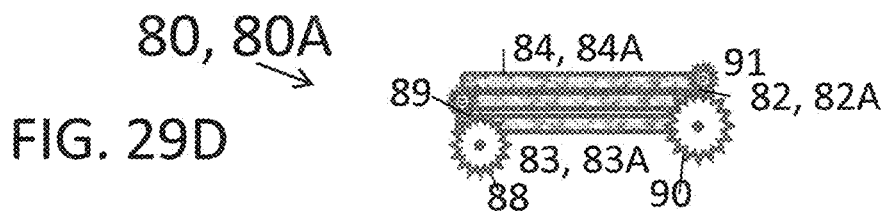

PANELS UNFOLD ONTO
FRONT AND BACK OF CAR

ELECTRIC VEHICLE SOLAR CHARGING SYSTEM

CROSS-REFERENCE TO RELATED APPLICATIONS

This application claims priority to and is a continuation-in-part of application Ser. No. 13/020,800 entitled "Electric Vehicle Charging System," filed on Feb. 3, 2011, which is a continuation-in-part to application Ser. No. 12/860,876 entitled "Electrical Assembly," filed Aug. 21, 2010, to which priority is claimed and through which priority is claimed to application Ser. No. 12/462,555 (now U.S. Pat. No. 7,789,524) filed Aug. 5, 2009, entitled "Solar or Wind Powered Light," which issued as a patent on Sep. 7, 2010.

BACKGROUND OF THE INVENTION

The 2011 Chevy Volt, primarily an electric (or hybrid) vehicle is advertised as requiring 10 to 12 hours of charging at 110 volts. If the charging current is between 15-30 amperes of current @ 110 volts, the power is on the order of 1650 to 3300 watts per hour. If the charge is 10-12 hours, one can multiply by the number of hours to produce the kilowatt hours. While charging is available to some people in their homes/garages, it presents a problem to apartment dwellers and to people who do not have access to a charging system. Accordingly, making charging systems available through parking meters or charging stations is highly desirable.

Remote power stations may be useful to supplement or as an alternative to the home recharging concept. Solar power does not require the installation of power lines for supply of power to remote charging stations.

Background solar powered devices include U.S. patent application Ser. No. 12/025,737 entitled "SOLAR-POWERED LIGHT POLE AND LED LIGHT FIXTURE," hereby incorporated by reference, which discloses a solar-powered lighting system that includes a flexible, wrap-around, preferably self-stick panel of photovoltaic laminate applied to the outside surface of a light pole. An LED light fixture is connected preferably at or near the top of the pole and has the same or similar diameter as the pole. The LED light fixture has multiple columns and rows of LEDs and an interior axial space for air flow to cool the LEDs. The pole preferably also has vents and axial passage(s) for creating a natural updraft through at least a portion of the pole and the light fixture, for cooling of the photovoltaic panel interior surface, the LEDs, and/or other equipment inside the fixture or pole, and batteries that may be provided inside the pole or pole base.

U.S. Patent Application No. 2006/0149607, hereby incorporated by reference, discloses means for programming and controlling an LED assembly using a programmable controller and feedback means.

Once the electric vehicle leaves the owner's charging facility, the range of travel is limited by the amount of charge in the batteries of the vehicle. There is a need for an auxiliary power source to enable recharging of electric vehicles at remote locations.

SUMMARY OF THE PRESENT INVENTION

Embodiments of the present invention include assemblies for use both with home charging systems and remote charging systems. The assemblies may be powered by conventional power lines or may be solar powered.

A preferred embodiment comprises solar panels adapted to be positioned on the top surface of a vehicle to enable solar charging at remote locations, the assembly comprising at least one solar panel positioned above surface of a vehicle; at least one motor assembly operatively connected to the at least one solar panel for positioning the at least one solar panel; the at least one solar panel operating to cover at least one window of the vehicle in a first position and to provide an unobstructed view in a second position; the panel moving from the first position to the second position by operation of the at least one motor assembly.

Optionally the at least one motor assembly may be operatively connected to move the solar panel in response to the movement of the sun though the use of either a time or a detector which operates to attempt to position the solar panel in an optimal position to obtain maximum exposure to the sun.

The preferred embodiment assembly may comprise at least three inter connected sections, a rear section which covers at least a portion of the rear of the vehicle, a middle section which covers at least a portion of the central portion of the vehicle and a front section which covers at least a portion of the front the vehicle, and the at least one motor assembly may operate to control the positioning of the front and rear sections. The front and rear sections may each be positioned by movement of a gear or gears which are connected to the at least one motor assembly. Optionally, the front and rear sections may be positioned using at least one pulley operatively connected to the at least one motor assembly. The front and rear sections may move from a closed position in which the front, middle and rear sections are stacked on top of one another in close proximity to a position in which the front and rear sections cover at least portions of the front and rear of the vehicle. This provides a cooling effect in hot weather as sunlight is restricted from entering the interior of the vehicle while the vehicle is parked. Optionally, the movement of the front and rear sections may be controlled by a processor, the processor may be programmed so as to enable the front and rear sections to be individually positioned to obtain maximum exposure to the sun. Optionally the at least three sections are positionable in an open position in which the sections are positioned to collect solar radiation while the vehicle is not moving to a closed position while the vehicle is moving; with at least one section operating to absorb solar radiation for conversion to electricity while the vehicle is moving. The solar collector is adapted to be electrically connectable to the electric system of the car for recharging the batteries of the vehicle. Optionally, the at least one motor assembly may be operatively controlled by at least one processor, and the assembly may be removably attached to the vehicle. The assembly may optionally comprise a detector which detects the amount of light being absorbed by at least one of the interconnected portions, the at least one motor assembly operating to position the at least one of the interconnected portions in response to the amount of light detected by the detector. The assembly may optionally comprise a detector which detects the geographical orientation of the vehicle and a timer which regulates the position of at least one of the interconnected portions to control the amount of light being absorbed by at least one of the interconnected portions, the at least one motor assembly operating to position the at least one of the interconnected portions in response to the timer.

A preferred method of recharging an electric vehicle comprises placing a retractable solar collector on the roof of a vehicle, the retractable solar collector having an open position in which maximum exposure of the solar collector to the sun is enable, to a closed position which the vehicle may be transported without the solar collector blocking the view of the driver, the retractor solar collector comprising interconnected sections which fold together in the closed position and which cover at least the windshield of the car in the open position. Optionally, the retractable solar collector may be opened from a closed position to an open position by at least one motor assembly, which may be controlled by a controller which positions the interconnected sections from an open position to a closed position where the interconnected sections are overlapping on the top of the car. The solar collector may be removably mounted to the roof of the vehicle by one of supports, straps or fasteners. The retractable solar collector may be moved from an open position to a closed position through controls located inside the vehicle. The retractable solar collector may optionally be moved from an open position to a closed position using at least one motor assembly in connection with one of gear assemblies or pulley assemblies.

BRIEF DESCRIPTION OF THE DRAWINGS

These and/or other aspects and advantages of the invention will become apparent and more readily appreciated from the following description of the embodiments, taken in conjunction with the accompanying drawings of which: The drawings of this invention are illustrative and diagrammatic in nature in order to present the principles of the invention. They are being provided as examples without limiting the invention to the specific configuration or dimensions shown.

FIG. 4 is a schematic illustration showing a view of a preferred embodiment assembly of the present invention comprising a solar collector 2, panel support 3, central portions 4 (optionally comprising a meter for measurement of electricity transferred (dispensed)), plug (receptacle) connectors 6, and supports 10.

FIG. 5A is a schematic illustration showing a view of a preferred embodiment assembly of the present invention comprising a vehicle 12 and a vehicle bumper section or portion 14, support 10 for a meter (details of which are not shown).

FIG. 5B is a schematic illustration showing a close-up view of a preferred embodiment assembly of the present invention comprising a vehicle bumper section or portion 14, support 10, receptacle portions 15, 16, ad protruding connector portions 17, 18, FIG. 6A is a schematic illustration showing a close-up view of a preferred embodiment assembly of the present invention comprising a vehicle bumper section or portion 14, support 10, receptacle portions 15A, 16A, ad protruding connector portions 17, 18.

FIG. 6B is a close up schematic view of the receptacles 15A, 16A comprising a cover (such as for example, a rubber or plastic cover or surround) having slits or openings into which the connectors 17, 18 may be inserted.

FIG. 7A is a schematic illustration showing a close-up view of a preferred embodiment assembly of the present invention comprising a vehicle bumper section or portion 14, support 10, receptacle portions 15A, 16A, and protruding connector portions 17, 18 which are mounted in solenoids 19 (shown in retracted position in FIG. 7A). The connector portions 17, 18 may be magnetized to facilitate attachment to the metallic portions of receptacles 15A and 16A.

FIG. 7B is a close up schematic view of the receptacles 15A, 16A comprising a cover (such as for example, a rubber or plastic cover) having slits or openings into which the connectors 17, 18 may be inserted.

FIG. 8A is a schematic illustration showing a close-up view of a preferred embodiment assembly of the present invention comprising a vehicle bumper section or portion 14, support 10, receptacle portions 15A, 16A, ad protruding connector portions 17A, 18A (which may be pointed) which are mounted in solenoids 19 (shown in retracted position in FIG. 8A). The connector portions 17A, 18A may be magnetized to facilitate attachment to the metallic portions of receptacles 15A and 16A.

FIG. 8B is a close up schematic view of the receptacles 15A, 16A comprising a cover (such as for example, a rubber or plastic cover or surround) having slits or openings into which the connectors 17A, 18A may be inserted (one of which is illustrated).

FIG. 9A is a schematic illustration showing a close-up view of a preferred embodiment assembly of the present invention comprising a vehicle bumper section or portion 14, support 10, receptacle portions 15A, 16A, ad protruding connector portions 17A, 18A (which may be substantially pointed) (shown in EXTENDED position in FIG. 9A) which are mounted in solenoids 19, which optionally may be operable only when the vehicle is stationary or moving at a very slow speed. The connector portions 17A, 18A may be magnetized to facilitate attachment to the metallic portions of receptacles 15A and 16A.

FIG. 9B is a close up schematic view of the receptacles 15A, 16A comprising a cover (such as for example, a rubber or plastic cover/surround) having slits or openings into which the connectors 17A, 18A may be inserted.

FIG. 10A is a close up schematic view of the receptacles 15A, 16A comprising a cover (such as for example, a rubber surround) having slits or openings into which the connectors 17A, 18A may be inserted.

FIG. 10B illustrates schematically a cut-away view of receptacles 15A, 16A taken along the lines 10B in FIG. 10A.

FIG. 11A is a close up schematic view of the receptacles 15B, 16B comprising a cover (such as for example, a rubber or plastic cover/surround) having slits or openings into which the connectors 17A, 18A may be inserted.

FIG. 11B illustrates schematically a cut-away view of receptacles 15A, 16A taken along the lines 11B in FIG. 10A.

FIG. 12A is a schematic illustration showing a close-up view of a preferred embodiment assembly of the present invention comprising a vehicle bumper section or portion 14, support 10, receptacle portions 15A, 16A, and protruding connector portions 17A, 18A (which may be pointed) (shown in EXTENDED position in FIG. 12A) which are mounted in solenoids 19, which optionally may be operable only when the vehicle is stationary or moving at a very slow speed. The connector portions 17A, 18A may be magnetized to facilitate attachment to the metallic portions of receptacles 15A and 16A. The portion 14A may be movably mounted on springs 24 to provide for adjustment.

FIG. 12B is a close up schematic view of the receptacles 15A, 16A comprising a cover (such as for example, a rubber surround) having slits or openings into which the connectors 17A, 18A may be inserted. The configuration of 15A, 16A may be rectangular, as shown in FIG. 12B.

FIG. 13 is a schematic illustration of a front of a vehicle comprising optional guides.

FIG. 16A is a schematic illustration showing a close-up view of a preferred embodiment assembly of the present invention comprising a vehicle bumper section or portion 14 or 14A, support, guides 29, receptacle portions 15A, 16A movably mounted on springs 24, and protruding connector portions 17A, 18A (which may be pointed) (shown in EXTENDED position in FIG. 15A) which are mounted in solenoids 19, which optionally may be operable only when the vehicle is stationary or moving at a very slow speed. The connector portions 17A, 18A may be magnetized to facilitate attachment to the metallic portions of receptacles 15A and 16A. The portion 14A may also be movably mounted on springs 24 to provide for adjustment.

FIG. 16B is a close up schematic view of the spring mounted receptacles 15A, 16A comprising a cover (such as for example, a rubber ore plastic cover or surround) having slits or openings into which the connectors 17A, 18A may be inserted. The configuration of 15A, 16A may be rectangular, as shown in FIG. 16B.

FIG. 17 is a schematic illustration showing a top view of a preferred embodiment assembly of the present invention comprising a vehicle bumper section or portion 14 or 14A, support, guides 29, receptacle portion (either 15A or 16A) movably mounted on springs 24, and protruding connector portion (17A or 18A) (which may be pointed) (shown in EXTENDED position in FIG. 15A) which are mounted in solenoids 19, which optionally may be operable only when the vehicle is stationary or moving at a very slow speed. The connector portions 17A or 18A may be magnetized to facilitate attachment to the metallic portions of receptacles 15A and 16A. The portion 14A may also be movably mounted on springs 24 to provide for adjustment.

FIG. 18 is a schematic illustration showing a top view of a preferred embodiment assembly of the present invention comprising a vehicle bumper section or portion 14 or 14A, support, guides 29A, receptacle portion (either 15A or 16A) movably mounted on springs 24, and protruding connector portion (17A or 18A) (which may be pointed) (shown in EXTENDED position in FIG. 15A) which are mounted in solenoids 19. The portion 14A may also be movably mounted on springs 24 to provide for adjustment. The guides 29A also operate as negative charge carrying connectors which contact a metallic surface of vehicle which is grounded to complete the negative portion of the charging circuit.

FIG. 20A is a close-up schematic view of a receptacle 15A or 16A, further showing a cavity receptacle for holding the protruding connectors 17A, 17B in position.

FIG. 20B is a close-up schematic view of a modified receptacle 15A or 16A, further showing a cavity receptacle for holding the protruding connectors 17A, 17B in position and further comprising a sensor which actuates a spring release such that the sidewall prevents the protruding connector from inadvertent release as it locks it into place.

As shown in FIG. 23, the solar collector 80 serves the dual purposes of collecting solar radiation for conversion to electricity while keeping the car cooler by shielding the interior of the car from the sunlight.

FIG. 24A is schematic illustration of a preferred embodiment solar collector on the roof and front and rear windows of a vehicle; further comprising hinges between sections for folding as illustrated. The hinges may be customary hinges or simply flexible material between the sections allowing the sections to fold together for compact storage.

FIG. 24 B is a side view of the roof solar collector 80 of FIG. 24A.

FIG. 25A is schematic illustration of a vehicle 12 or other vehicle having a preferred embodiment solar collector 80A on the roof and front and rear of the vehicle such that the collector 80A substantially covers the vehicle; further comprising hinges or flexible connectors 81 between front sections 82A, middle section 83A and rear section 84A for positioning on a vehicle as illustrated.

FIG. 25 B is a side view of the roof solar collector 80A of FIG. 25A showing the solar collector 80 in an open position (lower) and partially closed position (upper). Optionally, although not shown, the sections 82A, 83A, or 84A may comprise interlocking portions whereby the sections may be separated for ease of storage.

FIG. 26A is schematic illustration of the preferred embodiment solar collector 80A of FIG. 25A showing the front section 82A positionable to obtain increased and/or maximum exposure to the sun.

FIG. 26B is schematic top view illustration of the solar collector 80A of FIG. 26A.

FIG. 29A is a schematic side view illustration of a preferred embodiment solar collector 80 or 80A showing the sections 82, 83 and 84 (or 82A, 83A and 84A), where the front and rear sections 82 and 84 are positioned by gears 89 and 91, which are driven by drive gears 88 and 90 respectively, in an open position covering the front and back of the vehicle (not shown).

FIG. 29b is a close-up view of the preferred embodiment assembly 80 or 80A of FIG. 29A.

FIG. 29 C is a schematic side view illustration of a preferred embodiment solar collector 80 or 80A showing the sections 82, 83 and 84 (or 82A, 83A and 84A), where the front section 82 is closed against the middle section 83 by gears.

FIG. 29 D is a schematic side view illustration of a preferred embodiment solar collector 80 or 80A showing the sections 82, 83 and 84 (or 82A, 83A and 84A), in a closed position.

DETAILED DESCRIPTION OF PREFERRED EMBODIMENTS

Figure 1:
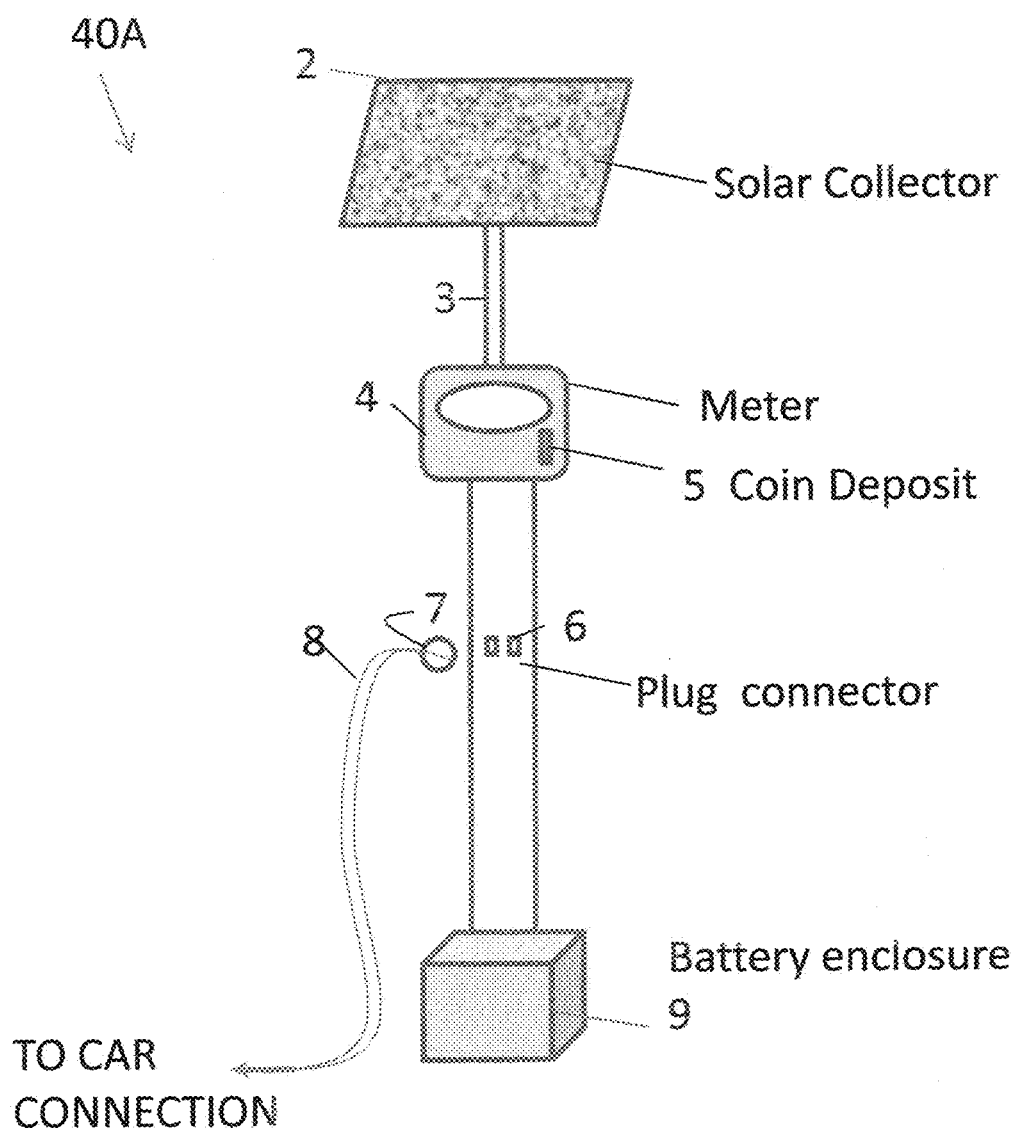
FIG. 1 is a schematic illustration showing a view of a preferred embodiment assembly of the present invention comprising solar collector 2, solar panel support 3, central portion 4, coin deposit 5, and plug (receptacle) connector 6.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout the description of the figures.

It will be understood that when an element is referred to as being "on" another element, it can be directly on the other element or intervening elements may be present. In contrast, when an element is referred to as being "directly on" another element, there are no intervening elements present. It will be understood that when an element is referred to as being "connected" or "coupled" to another element, it can be directly connected or coupled to the other element or intervening elements may be present. In contrast, when an element is referred to as being "directly connected or coupled" to another element, there are no intervening elements present. Furthermore, "connected" or "coupled" as used herein may include wirelessly connected or coupled. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first layer could be termed a second layer, and, similarly, a second layer could be termed a first layer without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," "left" or right" may be used herein to describe one element's relationship to other elements as illustrated in the Figures. It will be understood that relative terms are intended to encompass different orientations of the device in addition to the orientation depicted in the Figures. For example, if the device in one of the figures were turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

FIG. 1 is a schematic illustration showing a view of a preferred embodiment assembly 40A of the present invention comprising solar collector 2, solar panel support 3, central portion 4, coin deposit 5, and plug (receptacle) connector 6. The solar collector 2 collects photons which are in turn converted to electricity to for supply to either a battery 9, which may be positioned behind the collector or in a base near the ground. Alternatively, the assembly may be wired to a public distribution grid for supply of electricity 24 hours a day. The meter in the housing or central portion 4 may include a means for dispensing electricity. For example, a person paying into the meter may receive electricity in return, the amount of which depending upon the amount paid. This may be down in conjunction with the standard parking meter or as a primary selection; i.e., a meter primarily for the dispensing of electricity. This provides a revenue stream for the property owner, such as a town or city, and provides a means for electric vehicle owners to recharge their vehicles which shopping, attending to business or dining or working. The plug connector may be the same or similar to the plug connectors used to recharge the Chevy Volt. The cable 8 connects the electric vehicle to the receptacle or plug connector 6 by means of a plug 7.

Figure 2:
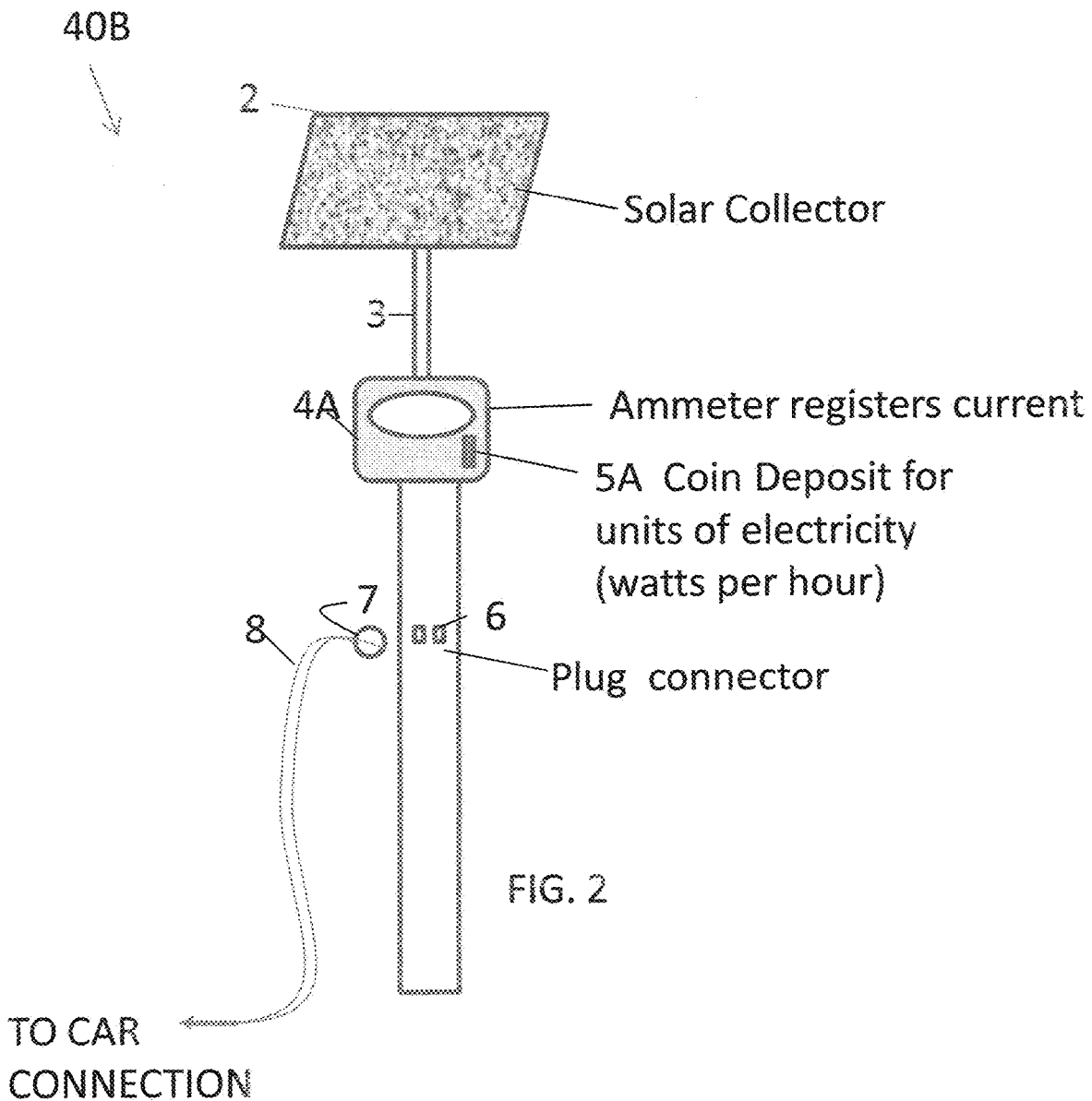
FIG. 2 is a schematic illustration showing a view of a preferred embodiment assembly of the present invention comprising solar collector 2, panel support 3, central portion 4 comprising a meter for measurement of electricity transferred (dispensed), coin deposit 5, and plug (receptacle) connector 6.

FIG. 2 is a schematic illustration showing a view of a preferred embodiment assembly 40B of the present invention comprising solar collector 2, panel support 3, central portion 4 comprising a meter for measurement of electricity transferred (dispensed), coin deposit 5, and plug (receptacle) connector 6. For example, the unit meter may charge a predetermined amount for a given amount of electricity. Moreover, the meter may be used to control the rate of the charge. The solar collector 2 may be used to collect photons for transfer to electricity. Alternatively, the assembly may be wired to a public distribution grid for supply of electricity 24 hours a day.

Figure 3:
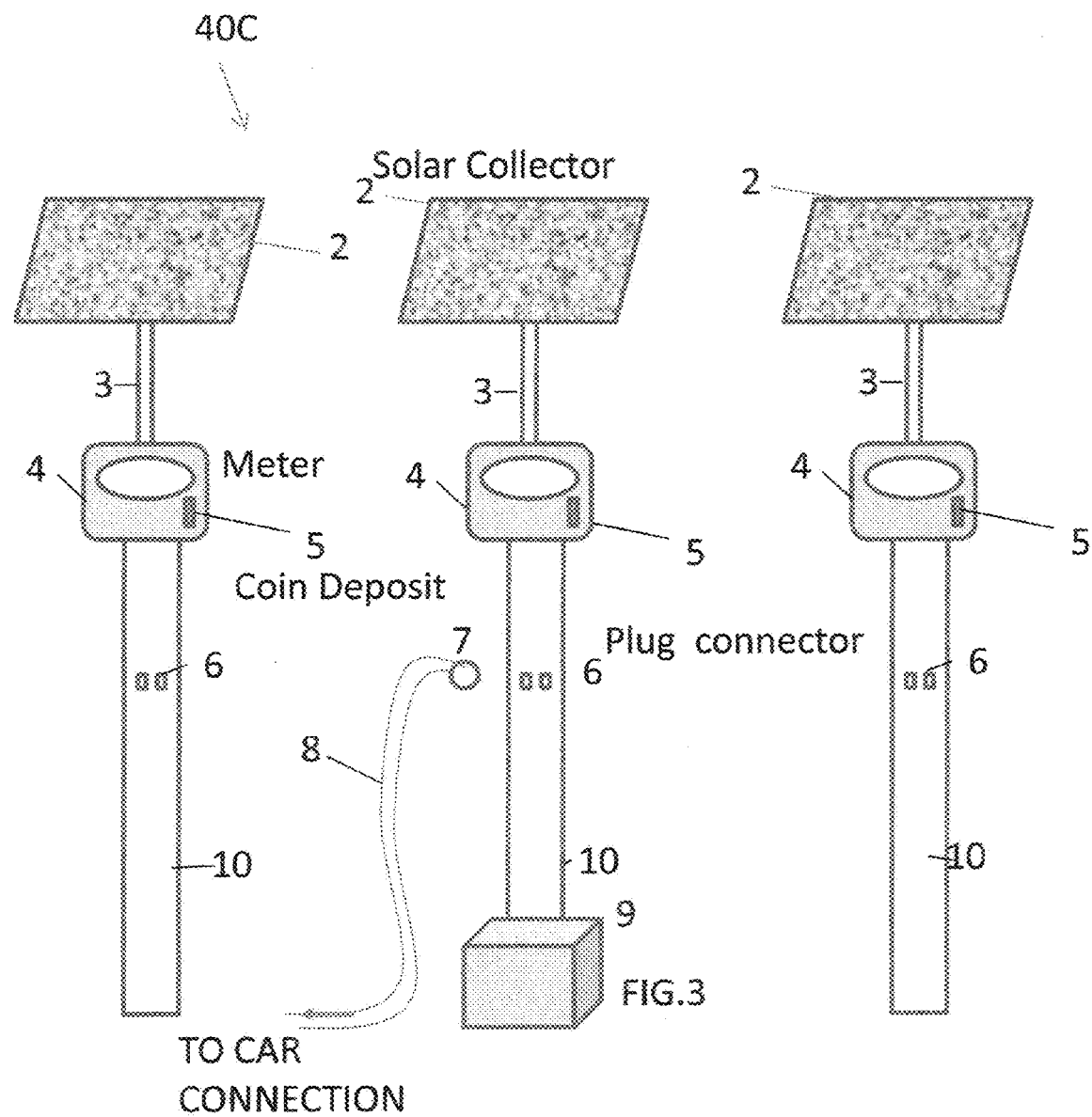
FIG. 3 is a schematic illustration showing a view of a preferred embodiment assembly of the present invention comprising a plurality of solar collectors 2, panel supports 3, central portions 4 (optionally comprising a meter for measurement of electricity transferred (dispensed)), coin deposit 5, plug (receptacle) connector 6, and support 10.

FIG. 3 is a schematic illustration showing a view of a preferred embodiment assembly 40C of the present invention comprising a plurality of solar collectors 2, panel supports 3, central portions 4 (optionally comprising a meter for measurement of electricity transferred (dispensed)), coin deposit 5, plug (receptacle) connector 6, and support 10. The electricity collected via the solar collector 2 may be stored in a central battery 9 or individual batteries may be positioned adjacent each support 10 or behind the collector 2. Alternatively, the assembly may be wired to a public distribution grid for supply of electricity 24 hours a day. The meter assemblies may be positioned adjacent to vehicle parking places or garages for dispensing of electricity to allow recharging of batteries of an electric vehicle.

FIG. 4 is a schematic illustration showing a view of a preferred embodiment assembly 40D of the present invention comprising a solar collector 2, panel support 3, central portions 4 (optionally comprising a meter for measurement of electricity transferred (dispensed)), plug (receptacle) connectors 6, and supports 10. Alternatively, the assemblies may be wired to a public distribution grid for supply of electricity 24 hours a day. The wires 11W represent underground connection of the assemblies. The wires 11W may also be connected to the public electrical grid for both obtaining electricity from the grid and for supplying electricity to the grid, as well as to the electrical vehicles parking nearby.

FIG. 5A is a schematic illustration showing a view of a preferred embodiment assembly of the present invention comprising a vehicle 12 and a vehicle front or back bumper section or portion 14, support 10 for a meter (details of which are not shown). The meter support 10 may also include a battery (not shown). As depicted in FIGS. 5A and 5B, the bumper of a vehicle may be positioned adjacent or in the proximity of the support 10 so that charging contacts positioned in the vehicle bumper or chassis portion engage corresponding contacts (or receptacles) 15 and 16. It can be appreciated by those of ordinary skill in the art that a ground can be used for one of the contacts; similar in nature to the grounding of vehicle frames and bumpers in vehicles of the 1950s, 1960s and 1970s. Using a grounded vehicle bumper or metallic vehicle surface, the vehicle surface may be positioned adjacent to a metallic surface of the support 10. The other contact must then be insulated from the metallic surface which engages the ground of the vehicle.

By making the contacts on the exterior of the vehicle, there is no need for a cumbersome cord between the vehicle and the meter assembly. This averts exposure of such a cord to mischief or stealth. Moreover, the cord can itself be a hazard in that it may be tripped over. In bad weather, a person could be electrocuted while handling the cord improperly.

FIG. 5B is a schematic illustration showing a close-up view of a preferred embodiment assembly of the present invention comprising a vehicle bumper section or portion 14, support 10, receptacle portions 15, 16, ad protruding connector portions 17, 18, FIG. 6A is a schematic illustration showing a close-up view of another preferred embodiment assembly of the present invention comprising a vehicle bumper section or portion 14, support 10, receptacle portions 15A, 16A, and protruding connector portions 17, 18. The protruding contacts 17 and 18 may be movable so as to recede into the vehicle bumper when not in use. This prevents exposure of a charged contact to individuals or animals. The receptacle portions 15A and 16A may be covered with insulating material such as rubber or synthetic rubber. The receptacle portions 15A, 16A may include a slit or cut opening to allow entry of the protruding portions or contacts 17, 18 into the receptacles 15A, 16A to complete the electrical charging circuit. Alternatively, only one terminal (the positive terminal) need be covered and insulated with the negative charge being carried by a ground wire or ground circuit connection, such as a metallic surface of the vehicle engaging a metallic portion of the support 10. Although the support 10 appears as a post or pole, the receptacles may be mounted to a wall or any type of support.

FIG. 6B is a close up schematic view of the receptacles 15A, 16A comprising a cover (such as for example, a rubber surround) having slits or openings into which the connectors 17, 18 may be inserted. The opening may be such as to allow entry of protruding connectors 17, 18 while providing an enclosure to prevent water or other elements from entering the receptacle.

FIG. 7A is a schematic illustration showing a close-up schematic view of a preferred embodiment assembly of the present invention comprising a vehicle bumper section or portion 14, support 10, receptacle portions 15A, 16A, ad protruding connector portions 17, 18 which are mounted in solenoids 19 (shown in retracted position in FIG. 7A). The connector portions 17,18 may be magnetized to facilitate attachment to the metallic portions of receptacles 15A and 16A. As shown in FIG. 7A, the protruding contacts 17, 18 recede into the housing, which may be a component in a vehicle bumper 14. The retractable protruding portions 17, 18 may be retracted by solenoids 19. In this manner, the electrical contacts 17, 18 are not exposed external to the vehicle bumper 14 so as to not endanger persons in the vicinity.

FIG. 7B is a close up schematic view of the receptacles 15A, 16A comprising a cover (such as for example, a rubber surround) having slits or openings into which the connectors 17, 18 may be inserted. The receptacles 15A, 16A may be of any configuration such as a square, diamond, oval, circle, or the like.

FIG. 8A is a schematic illustration showing a close-up view of a preferred embodiment assembly of the present invention comprising a vehicle bumper section or portion 14, support 10, receptacle portions 15A, 16A, and retractable protruding connector portions 17A, 18A (which may be pointed) which are mounted in solenoids 19 (shown in retracted position in FIG. 8A), The connector portions 17A,18A may be magnetized to facilitate attachment to the metallic portions of receptacles 15A and 16A. As shown, the protruding connector portions may be pointed to facilitate entry into the receptacles 15A and 16A. Shown in FIG. 8A are the charging contacts in the receded position inside a vehicle bumper or a component housing on the front or back of a vehicle. Shown in FIG. 8A is a ramp 21 to facilitate the vertical positioning of the housing 14 relative to the receptacles 15A, 16A.

FIG. 8B is a close up schematic view of the receptacles 15A, 16A comprising a cover (such as for example, a rubber or plastic cover or surround) having slits or openings into which the connectors 17A, 18A may be inserted. Although an oval configuration is shown, a variety of configurations may be used without departing from the scope of the invention.

FIG. 9A is a schematic illustration showing a close-up view of a preferred embodiment assembly of the present invention comprising a vehicle bumper section or portion 14, support 10, receptacle portions 15A, 16A, and protruding connector portions 17A, 18A (which may be pointed) (shown in EXTENDED position in FIG. 9A) which are mounted in solenoids 19, which optionally may be operable only when the vehicle is stationary or moving at a very slow speed. The connector portions 17A, 18A may be magnetized to facilitate attachment to the metallic portions of receptacles 15A and 16A. Also shown in FIG. 9A is a vertical alignment of the receptacles 15A, 216A with the housing 14.

FIG. 9B is a close up schematic view of the receptacles 15A, 16A comprising a cover (such as for example, a rubber surround) having slits or openings into which the connectors 17A, 18A may be inserted. Also shown is the tip of the protruding portions 18A, 17A.

FIG. 10A is a close up schematic view of an example of one of receptacles 15A, 16A comprising a cover (such as for example, a rubber surround) having slits or openings into which the connectors 17A, 18A may be inserted.

FIG. 10B illustrates schematically a cut-away view of receptacles 15A, 16A taken along the lines 10B in FIG. 10A. An example of a protruding connector tip is should associated with the 18A, 17A in FIG. 10B.

FIG. 11A is a close up schematic view of the receptacles 15B, 16B comprising a cover (such as for example, a rubber surround) having slits or openings into which the connectors 17A, 18A may be inserted.

FIG. 11B illustrates schematically a cut-away view of receptacles 15A, 16A taken along the lines 11B in FIG. 10A. In FIG. 11B, the tips of the protruding contact portions may wedge between louvered receptacle surfaces so that the protruding portions are held in place during the charging of the vehicle battery. Alternately the back surface of the receptacle 17A, 18A may be a flexible grid surface which surrounds and engages the tips of the protruding portions 17A, 18A for a secure connection while charging takes place.

FIG. 12A is a schematic illustration showing a close-up view of a preferred embodiment assembly of the present invention comprising a vehicle bumper section or portion 14, support 10, receptacle portions 15A, 16A, and protruding connector portions 17A, 18A (which may be pointed) (shown in EXTENDED position in FIG. 12A) which are mounted in solenoids 19, which optionally may be operable only when the vehicle is stationary or moving at a very slow speed. The connector portions 17A,18A may be magnetized to facilitate attachment to the metallic portions of receptacles 15A and 16A. The portion 14A may be movably mounted on springs 24 to provide for adjustment. As the vehicle moves towards the charging assembly 40A-40D, a vertical alignment ramp positioned adjacent to the support 10 may be engaged by a wheel on the bottom of the housing 14A which drives the housing 14A vertically such that the protruding contacting portions 17A, 18A are in vertical alignment to facilitate engagement of the protruding contact portions 17A, 17B with the receptacle portions 15A, 16A. The supports 25 are operatively connected to the vehicle frame, bumper or vehicle front, and the springs 234 allow movement of the housing 14A, which houses and supports the protruding contacts 17A and/or 18A to allow for alignment with the receptacles 15A, 16A. As the vehicle upon which the housing 14A is mounted approaches one of the assemblies 40A through 40D, the wheel 22 engages the ramp 21 and causes alignment of the housing 14A with the receptacles 15A, 16A to facilitate entry of the connector 17A, 18A into the receptacles 15A, 16A. It can be appreciated by those skilled in the art that although the receptacles 15A, 16A (as well as 15, 16) are positioned one above the other, they may be positioned side-by-side, diagonally or any predetermined position without departing from the scope of the invention. The receptacles may be positioned on a post, wall or any suitable supporting surface. This holds true for all of the assemblies 40A-40D. Although certain parts are associated with certain ones of the assemblies 40A through 40D, the components are fully interchangeable and the description is intended to convey this interchangeability. For example, the components shown in FIGS. 5A, 5B, 6A, 6B, 7A, 7B, 8A, 8B, 9A, 9B, 10B, 10A, 11A, 11B, 12A, 12B, 14A, 14B, 15A, 15B, 16A, 16B 17, 18, 19, 20A, 20B , 21A, 21B may be interchangeably used to replace the plug 7, cord 8, and plug connector 6 of the assemblies 40A-40D. Also, instead of solar panels, the source of power could come from a wind turbine or combination wind turbine solar cell as describe in detail in U.S. Pat. No. 7,789,524, hereby incorporated by reference as though fully rewritten herein.

FIG. 12B is a close up schematic view of the receptacles 15A, 16A comprising a cover (such as for example, a rubber surround) having slits or openings into which the connectors 17A, 18A may be inserted. The configuration of 15A, 16A may be rectangular, as shown in FIG. 12B.

FIG. 13 is a schematic illustration of a front of a vehicle comprising optional guides. A laser beam 41L may be emitted from the center of the vehicle to facilitate alignment of the protruding contacts with the receptacles as the driver approaches one of the assemblies 40A through 40D. Alternately, a signal may be emitted when the laser light beam is in proper alignment. Although the location of the beam is shown in the center of the vehicle, any position is suitable without departing from the scope of the present invention as long as the relationship between the laser light beam and receptacle location results in the protruding contacts entering the receptacles at the proper location. An optional guide may be positioned on top of the hood as shown in FIG. 13. The assembly or housing 14A may be removably positioned on the exterior of the vehicle so as to engage the corresponding receptacles on the support 10. For example, if a person has the charging assembly positioned in a location within his or her garage, the housing on the vehicle may be moved to suit the location of the charging assembly in the garage. It is likewise within the scope of the present invention to make the laser movable to reflect changes in relative location of the housing 14A.

Figures 14A, 14B:
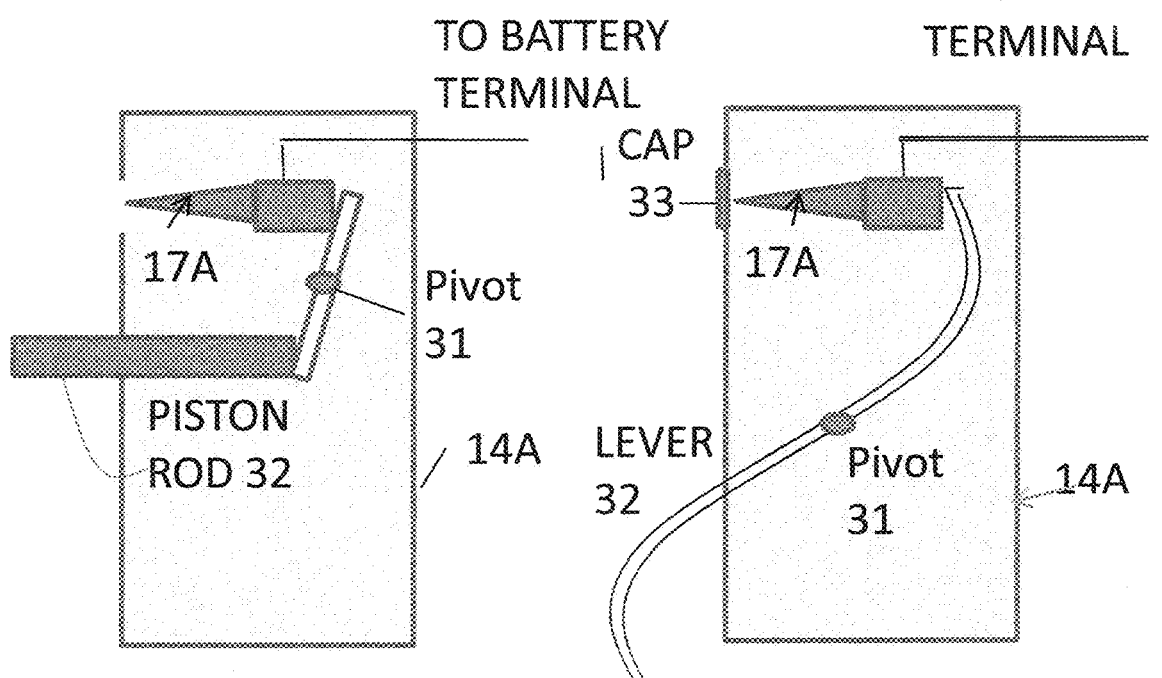
FIG. 14A is a schematic illustration of a bumper or support portion 14A the launching/extension of the contactor/connector portions 17A (or 18A) utilizing a piston rod 32 in connection with a lever operating on a pivot 31.
FIG. 14B is a schematic illustration of a bumper or support portion 14A the extension of the contactor/connector portions 17A (or 18A) utilizing a lever 32. The lever 32 may be biased so as to be actuated only by movement of the vehicle; i.e. an unintended push by a human did not actuate the extension or contactor/connector protruding portion 17A, 18A.

FIG. 14A is a schematic illustration of a bumper or support portion 14A the launching/extension of the contactor/connector portions 17A (or 18A) utilizing a piston rod 32 in connection with a lever operating on a pivot 31. As the vehicle approaches the support 10 of assemblies 40A-40D, the piston rod is engaged by the support to drive the piston to the right as shown in FIG. 14A resulting in the protruding portion 17A being pushed to the left in FIG. 14A to enable the protruding contact 17A to enter one of the receptacles 15A, 15, 16, 16A in a manner well known to those in the art.

FIG. 14B is a schematic illustration of a bumper or support portion 14A the extension of the contactor/connector portions 17A (or 18A) utilizing a lever 32. The lever 32 may be biased so as to be actuated only by movement of the vehicle; i.e. an unintended push by a human did not actuate the extension or contactor/connector protruding portion 17A, 18A. The present invention is not limited to the specific lever configuration and a variety of levers may be used without departing from the scope of the present invention.

Figure 15B:
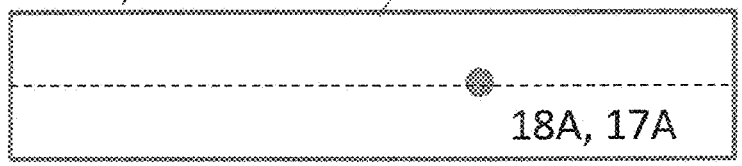
FIG. 15B is a close up schematic view of the spring mounted receptacles 15A, 16A comprising a cover (such as for example, a rubber surround) having slits or openings into which the connectors 17A, 18A may be inserted. The configuration of 15A, 16A may be rectangular, as shown in FIG. 15B.
Figure 15A:
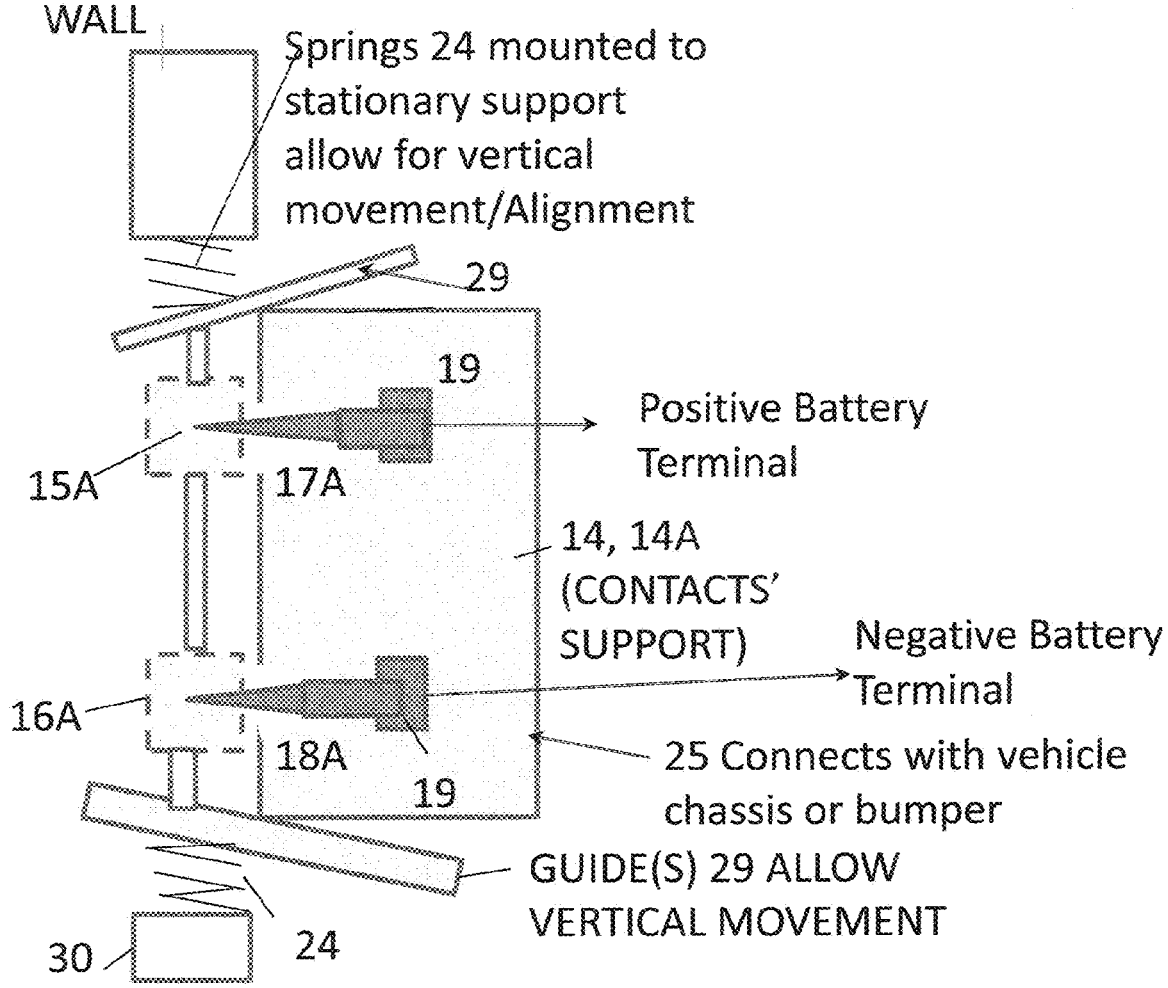
FIG. 15A is a schematic illustration showing a close-up view of a preferred embodiment assembly of the present invention comprising a vehicle bumper section or portion 14 or 14A, support, receptacle portions 15A, 16A movably mounted on springs 24, and protruding connector portions 17A, 18A (which may be substantially pointed) (shown in EXTENDED position in FIG. 15A) which are mounted in solenoids 19, which optionally may be operable only when the vehicle is stationary or moving at a very slow speed. The connector portions 17A, 18A may be magnetized to facilitate attachment to the metallic portions of receptacles 15A and 16A. The portion 14A may also be movably mounted on springs 24 to provide for adjustment.

FIG. 15A is a schematic illustration showing a close-up view of a preferred embodiment assembly of the present invention comprising a vehicle bumper section or portion 14 or 14A, support, receptacle portions 15A, 16A movably mounted on springs 24, and protruding connector portions 17A, 18A (which may be pointed) (shown in EXTENDED position in FIG. 15A) which are mounted in solenoids 19, which optionally may be operable only when the vehicle is stationary or moving at a very slow speed. The connector portions 17A,18A may be magnetized to facilitate attachment to the metallic portions of receptacles 15A and 16A. The portion 14A may also be movably mounted on springs 24 to provide for adjustment. The supports 30 may be attached to a wall, post or support 10. Spring 24 allow the receptacles to move vertically. Naturally, if the receptacles 15a, 16A were spaced horizontally, the springs could be mounted to facilitate horizontal movement without departing from the spirit of the invention. Guides 29 are contacted by the housing 14, 14A associated with the vehicle and force the receptacles 15A, 16a up and down to facilitate entry of the protruding portions 17A, 18A into the receptacles 15A, 16A.

FIG. 15B is a close up schematic view of the spring mounted receptacles 15A, 16A comprising a cover (such as for example, a rubber surround) having slits or openings into which the connectors 17A, 18A may be inserted. The configuration of 15A, 16A may be rectangular, as shown in FIG. 15B.

FIG. 16A is a schematic illustration showing a close-up view of a preferred embodiment assembly of the present invention comprising a vehicle bumper section or portion 14 or 14A, support, guides 29, receptacle portions 15A, 16A movably mounted on springs 24, and protruding connector portions 17A, 18A (which may be pointed) (shown in EXTENDED position in FIG. 15A) which are mounted in solenoids 19, which optionally may be operable only when the vehicle is stationary or moving at a very slow speed. The connector portions 17A,18A may be magnetized to facilitate attachment to the metallic portions of receptacles 15A and 16A. The portion 14A may also be movably mounted on springs 24 to provide for adjustment. As the support housing 14, 14A engages the guides 29, the receptacles 15A, 16a are driven up and down to facilitate alignment and entry of the protruding portions 17A, 18A into the receptacles 15A, 16A. Alternately, the housing portion 14, 14A can be spring supported as in FIG. 12A to further facilitate alignment and entry of the protruding portions 17A, 18A into the receptacles 15A, 16A.

FIG. 16B is a close up schematic view of the spring mounted receptacles 15A, 16A comprising a cover (such as for example, a rubber surround) having slits or openings into which the connectors 17A, 18A may be inserted. The configuration of 15A, 16A may be rectangular, as shown in FIG. 16B.

Regarding horizontal alignment, FIG. 17 is a schematic illustration showing a top view of a preferred embodiment assembly of the present invention comprising a vehicle bumper section or housing portion 14 or 14A, support, guides 29, receptacle portion (either 15A or 16A) movably mounted on springs 24, and protruding connector portion (17A or 18A) (which may be pointed) (shown in EXTENDED position in FIG. 15A) which are mounted in solenoids 19, which optionally may be operable only when the car or other vehicle is stationary or moving at a very slow speed. The connector portions 17A or 18A may be magnetized to facilitate attachment to the metallic portions of receptacles 15A and 16A. The portion 14A may also be movably mounted on springs 24 to provide for adjustment. As the housing 14A engages the guides, which may be metal or plastic, the receptacle (15A or 16A) is moved horizontally to allow for proper alignment of the protruding portion 17A with the receptacle 15A, 16A.

FIG. 18 is a schematic illustration showing a top view of a preferred embodiment assembly of the present invention comprising a car or vehicle bumper section or portion 14 or 14A, support, guides 29A, receptacle portion (either 15A or 16A) movably mounted on springs 24, and protruding connector portion (17A or 18A) (which may be pointed) (shown in EXTENDED position in FIG. 15A) which are mounted in solenoids 19. The portion 14A may also be movably mounted on springs 24 to provide for adjustment. The guides 29A also operate as negative charge carrying connectors which contact a metallic surface of vehicle which is grounded to complete the negative portion of the charging circuit. Moreover, the second connector may be dispensed with if the guides 29 engage a metallic surface of the vehicle which is grounded to the negative pole of the battery, for example, a chrome bumper grounded to the vehicle chassis. The first connector would connect to the positive terminal of the vehicle battery.

Figure 19:
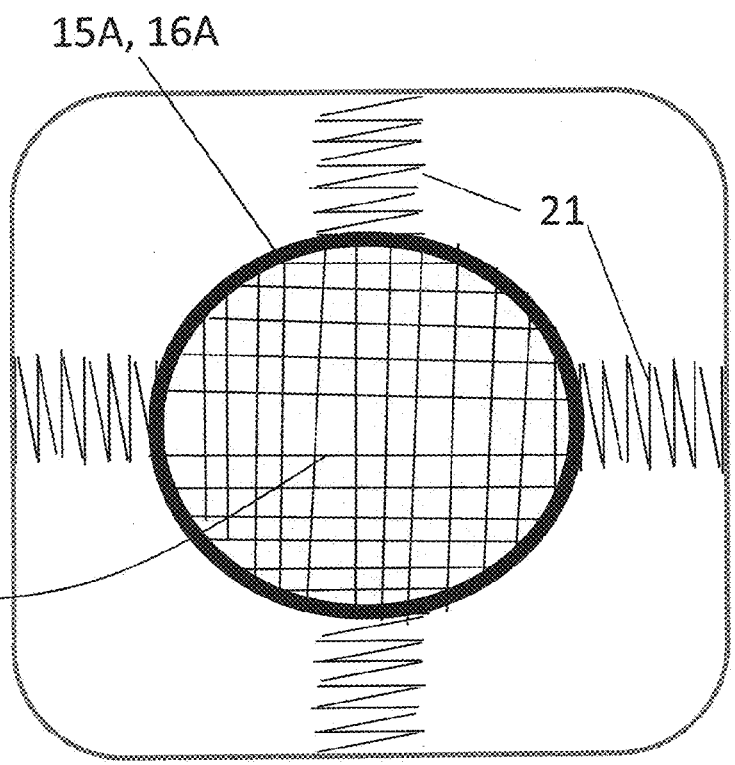
FIG. 19 is a close-up schematic view of a receptacle 15A or 16A, further showing tightly strung wires for holding the protruding connectors in position.
Figure 21A:
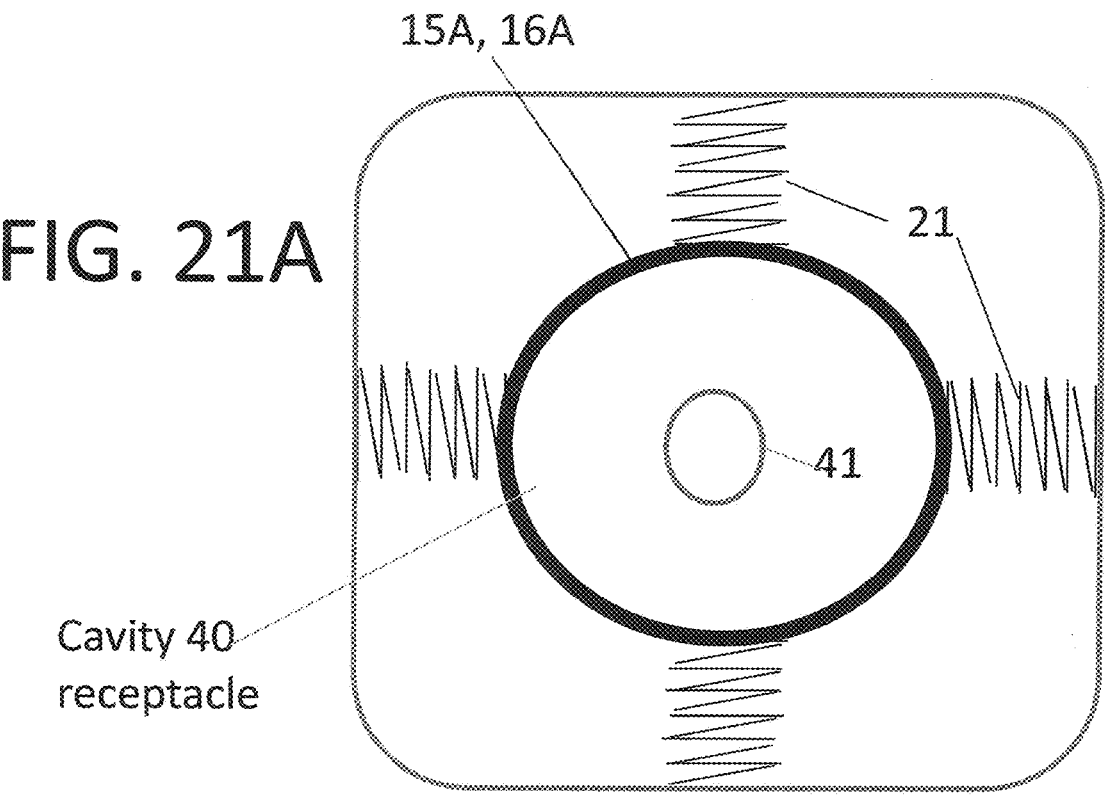
FIG. 21 A is a close-up schematic view of a modified receptacle 15A or 16A, further showing a cavity receptacle for holding the protruding connectors 17A, 17B in position and further comprising a reduced section 41 and electromagnets/sensors which prevents the protruding connector from inadvertent release as it is held in place.
FIG. 21B is a schematic side view illustration of the assembly shown in an FIG. 21A.
Figure 21B:
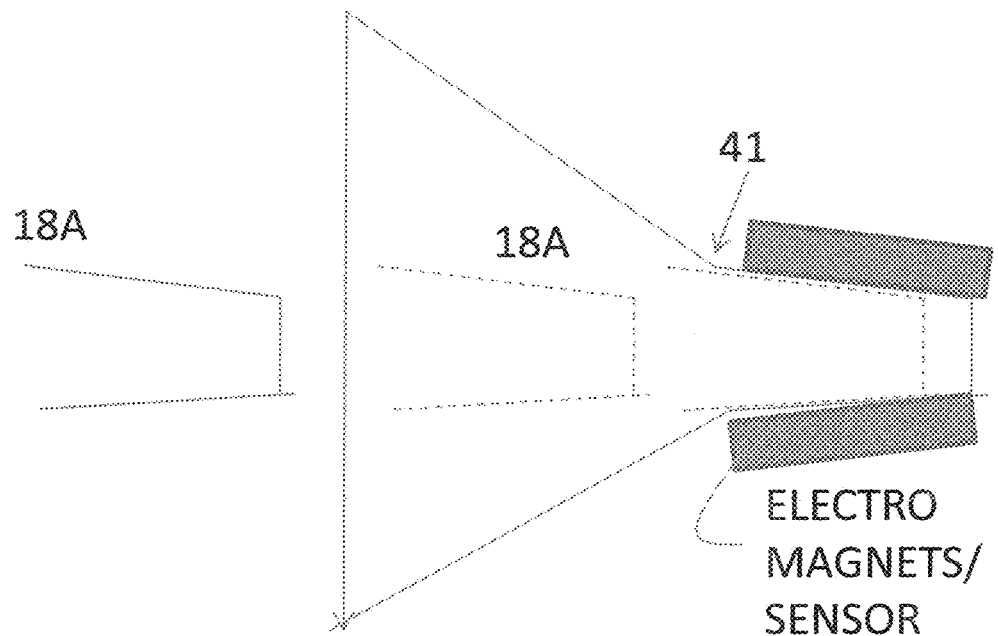

FIG. 19 is a close-up schematic view of a receptacle 15A or 16A, further showing tightly strung wires for holding the protruding connectors in position. The protruding contact 17A or 18A would enter between the wires and be held in place by the tightly strung wires. Springs 21 allow movement in both the horizontal and vertical directions.

FIG. 20A is a close-up schematic view of a receptacle 15A or 16A, further showing a cavity receptacle for holding the protruding connectors 17B, 18B in position. As the protruding connector 18A enters the receptacle it pushes against the rear wall of the receptacle. The pivoting wall 45, which is spring biased, engages the notch on the protruding connector 17B, 18B to hold it in place during charging of the vehicle battery. The pivoting wall may comprise a plurality of walls or be circumferential to securely retain the protruding connector 17B.

FIG. 20B is a close-up schematic view of a modified receptacle 15A or 16A, further showing a cavity receptacle for holding the protruding connectors 17A, 17B in position and further comprising a sensor which actuates a spring release such that the sidewall prevents the protruding connector from inadvertent release as it locks it into place.

FIG. 21 A is a close-up schematic view of a modified receptacle 15A or 16A, further showing a cavity receptacle for holding the protruding connectors 17A, 18A in position and further comprising a reduced section 41 and electromagnets/sensors which prevents the protruding connector from inadvertent release as it is held in place.

Figure 22:
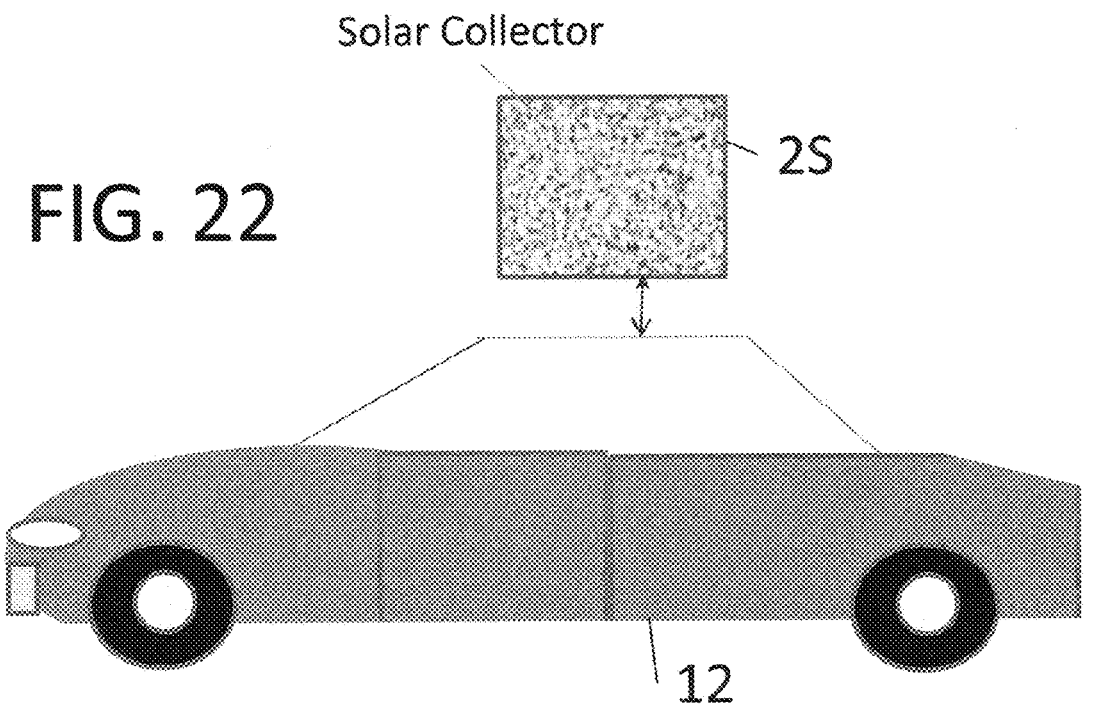
FIG. 22 is schematic illustration of a car or vehicle 12 having a solar collector on the roof.

FIG. 22 is schematic illustration of a car or other vehicle having a preferred embodiment solar collector on the roof. This provides an effective way of recharging the vehicle battery while the vehicle is in motion or at a standstill.

Figure 23:
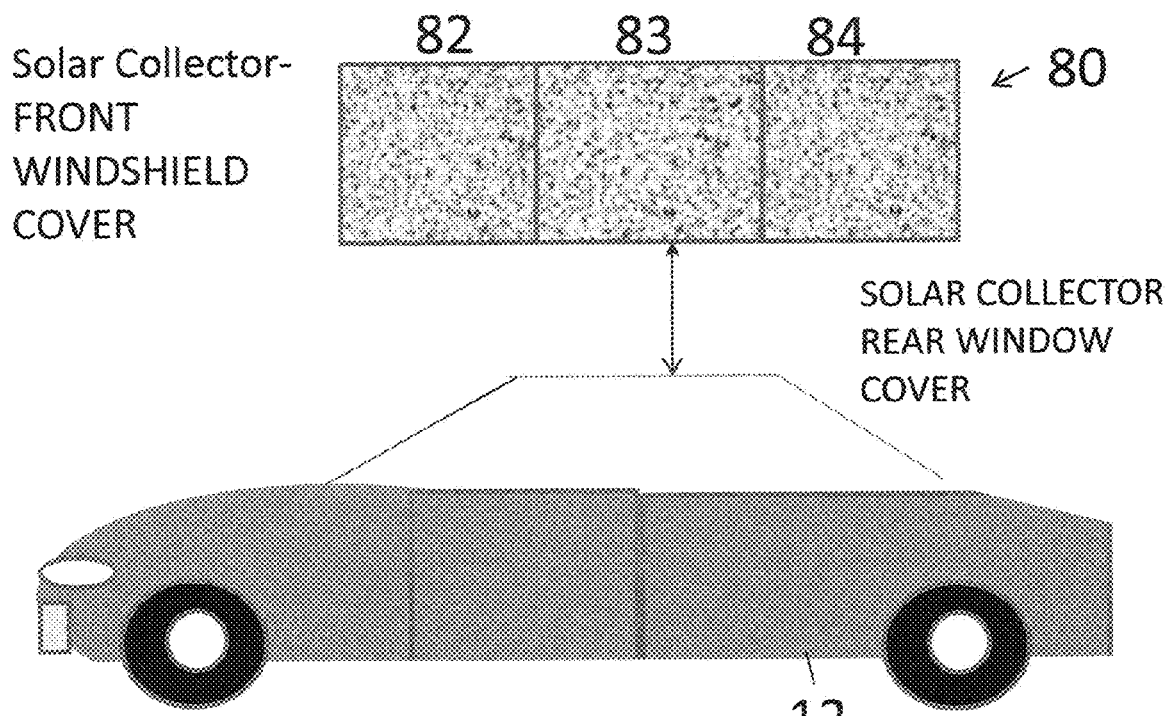
FIG. 23 is schematic illustration of a car or vehicle 12 having a preferred embodiment solar collector on the roof, front and rear windows of a vehicle. The solar panel sections 83, 83 and 84 may be formed of rigid, semi-flexible or flexible material.

FIG. 23 is schematic illustration of a vehicle having a preferred embodiment solar collector 80 on the roof and front and rear windows. This configuration provides an effective way of recharging the vehicle battery while the vehicle is not in motion. Moreover, the solar collector rear window cover keeps the vehicle cooler and/or prevents sunlight from entering the interior of the vehicle.

FIG. 24A is schematic illustration of a vehicle 12 or other vehicle having a preferred embodiment solar collector 80 on the roof and front and rear windows; further comprising hinges or flexible connectors 81 between front sections 82, middle section 83 and rear section 84 for folding as illustrated. The assembly may fold into the top/roof of the vehicle 12 or may be removed to storage. Although three sections 82, 83 and 84 are shown, two or more sections may be utilized without departing from the scope of the present invention.

FIG. 24 B is a side view of the roof solar collector 80 of FIG. 24A showing the solar collector 80 in an open position (lower) and partially closed position (upper). Hinges or flexible connectors 81 may be flexible material connectors such as cloth or plastic that extends between sections 82 and 83 and sections 84 and 84 or may be hinges.

FIG. 23 is schematic illustration of a car or vehicle 12 having a preferred embodiment solar collector on the roof, front and rear windows of a vehicle. The solar panel sections 83, 83 and 84 may be formed of rigid, semi-flexible or flexible material. As shown in FIG. 23, the solar collector 80 serves the dual purposes of collecting solar radiation for conversion to electricity while keeping the car cooler by shielding the interior of the car from the sunlight.

FIG. 24A is schematic illustration of a preferred embodiment solar collector on the roof and front and rear windows of a vehicle; further comprising hinges between sections for folding as illustrated. The hinges may be customary hinges or simply flexible material between the sections allowing the sections to fold together for compact storage.

FIG. 24 B is a side view of the roof solar collector 80 of FIG. 24A.

FIG. 25A is schematic illustration of a car 12 or other vehicle having a preferred embodiment solar collector 80A on the roof and front and rear windows; further comprising hinges or flexible connectors 81 between front sections 82A, middle section 83A and rear section 84A for positioning on a vehicle as illustrated. Solar collector 80A is intended to cover more of the vehicle for increased solar collector area and electrical output. The section 82A may extend to the front of the vehicle and section 84A may extend to the rear of vehicle 12. The assembly may fold into the top/roof of the vehicle 12 or may be removed to storage. Although three sections 82A, 83A and 84A are shown, two or more sections may be utilized without departing from the scope of the present invention. Optionally roof mounts may be used to removably attach the sections 82A, 83A and 84A to the vehicle. The roof mounts 85 may comprise suction cups, straps, flexible mounts, magnetic connectors or metal supports for removable attachment to the vehicle roof.

FIG. 25 B is a side view of the roof solar collector 80A of FIG. 25A showing the solar collector 80 in an open position (lower) and partially closed position (upper). Optionally, although not shown, the sections 82A, 83A, or 84A may comprise interlocking portions whereby the sections may be separated for ease of storage. Hinges or flexible connectors 81 may be flexible material connectors such as cloth or plastic that extends between sections 82 and 83 and sections 84 and 84 or may be hinges.

FIG. 26A is schematic illustration of the preferred embodiment solar collector 80A of FIG. 25A showing the front section 82A positionable to obtain increased and/or maximum exposure to the sun. The section 82A may be adjustably positioned by gears or pulleys as illustrated in FIGS. 27A through 33D. The section 82A may be manually positioned or may be positioned by a motor assembly 86. The assembly 80A (and 80) may optionally include roof mounts 85 for ease in fastening or positioning the assembly 80, 80A on a vehicle of a car or the like. The roof mounts 85 may comprise suction cups, rubber mounts, straps, flexible mounts, magnetic connectors and/or metal supports for removable attachment to the vehicle roof. The assemblies include electrical wires, not shown for connection to the vehicles electrical system in a manner well known to those of ordinary skill in the art. Although not illustrated, rear section 84A may also be adjustably positioned for maximum exposure when the sun is shining in the opposite direction.

FIG. 26B is schematic top view illustration of the solar collector 80A of FIG. 26A. Although three sections 82A, 83A, and 84A are shown, any number of sections may be utilized to essentially cover the upper surface of the car 12. As shown in FIG. 26B, the panels are sized or tailored to the periphery of the vehicle and arranged to cover the top portion of the car without creating a hazardous condition resulting when a passer-by may inadvertently walk in the close proximity of the vehicle 12 and strike the solar collector 80, 80A. However, if this is not a problem with a particular application, the solar panels 82, 83 and 84 may extend beyond the periphery of the motor vehicle.

Figure 27A:
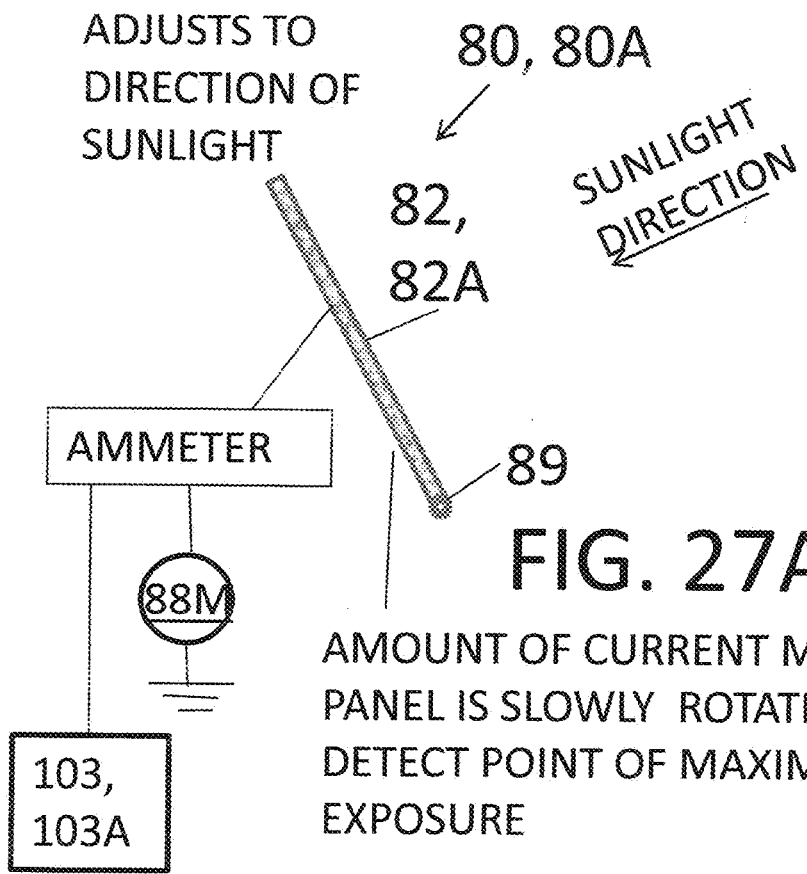
FIG. 27A is schematic side view illustration of a cut-a-way portion of the preferred embodiment solar collector 80A showing the front section 82, 82A positionable to obtain increased and/or maximum exposure to the sun using an ammeter to determine the maximum current available and a motor and gear assembly for positioning. According to the sunlight direction, the ammeter collects the amount of electricity to be collected while slowly moving the panel to and fro to obtain an optimal position.
Figure 27B:
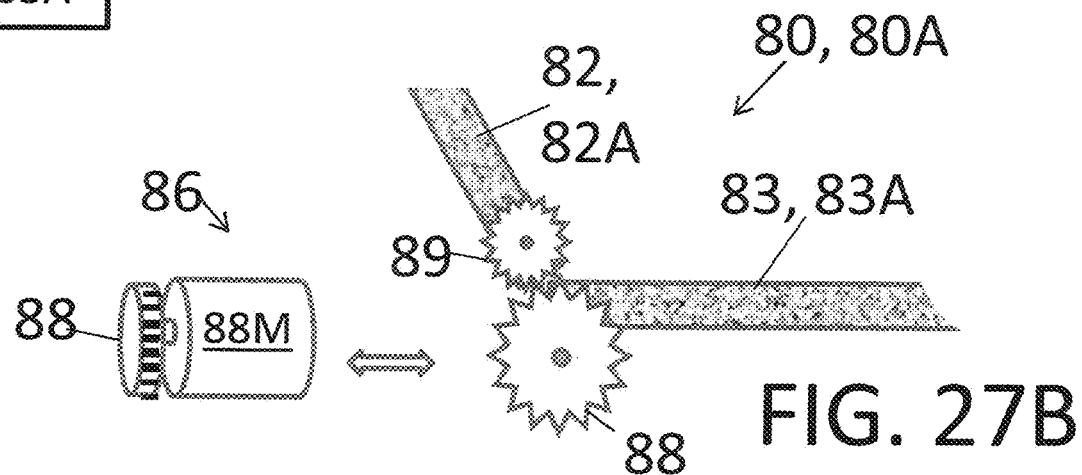
FIG. 27B is an enlarged schematic side view illustration of a cut-a-way portion of the solar collector 80A showing the front section 82 or 82A and middle section 83 or 83A and the gear drive assembly 86 comprising motor 88M and gear 88 which drives gear 89 to position 82 or 82A to obtain increased and/or maximum exposure to the sun.

FIG. 27A is schematic side view illustration of a cut-a-way portion of the preferred embodiment solar collector 80A showing the front section 82, 82A positionable to obtain increased and/or maximum exposure to the sun using an ammeter to determine the maximum current available and a motor and gear assembly for positioning. According to the sunlight direction, the ammeter collects the amount of electricity to be collected while slowly moving the panel to and fro to obtain an optimal position. This may be repeated periodically, such as every hour. For example, by moving the gear motor 88M which rotates gear 89 and causes the angle of section 82, 82A to change back and forth, one may determine the location of the maximum current at a particular time. Optionally, once the maximum is determined the angle will remain positioned for a predetermined period of time, such as ten minutes (or one hour), then be adjusted forward and back to again determine a maximum exposure position. Although gears 88, 89, 90 and 91 are illustrated in FIGS. 27A through 30D, wheels having a friction surface on their periphery may be substituted. Optionally, pulleys may be substituted for gears 88, 89, 90 and 91 with a drive belt extending therebetween, The positioning may be controlled using a series of gears 88, 89 and motor assembly 86 as depicted in FIG. 27B. However, any suitable positioning mechanisms may be used without departing from the scope of the invention.

FIG. 27B is an enlarged schematic side view illustration of a cut-a-way portion of the solar collector 80A showing the front section 82 or 82A and middle section 83 or 83A and the gear drive assembly 86 comprising motor 88M and gear 88 which drives gear 89 to position 82 or 82A to obtain increased and/or maximum exposure to the sun. The motor 88M may be driven by the current from the solar collector assembly 80 or 80A or from a battery which is charged by the assembly 80 or 80A. Similarly, the panel 84 or 84A is also adjustable in the same or similar manner in accordance with the position of the sun.

Figure 27C:
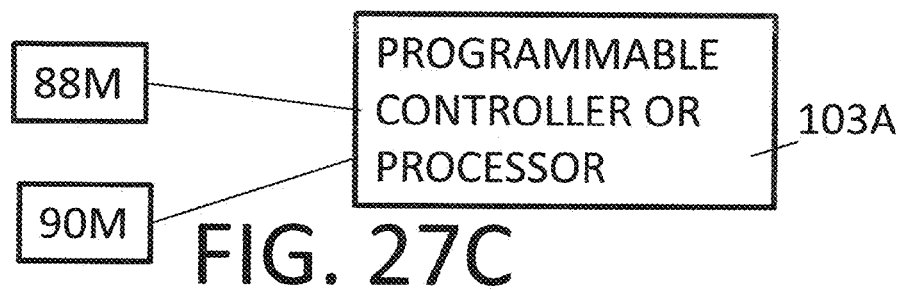
FIG. 27C illustrates an optional programmable controller or processor 103A used to control drive motors 88M and 90M for positioning the associated sections 82, 82A, 84, or 84A.

FIG. 27C illustrates an optional programmable controller or processor 103A used to control drive motors 88M and 90M for positioning the associated sections 82, 82A, 84, or 84A. The programmable controller may contain GPS information as to the vehicle location and may be programmed with data concerning the movement of the sun, such as seasonal information dependent upon time of day.

Figure 28A:
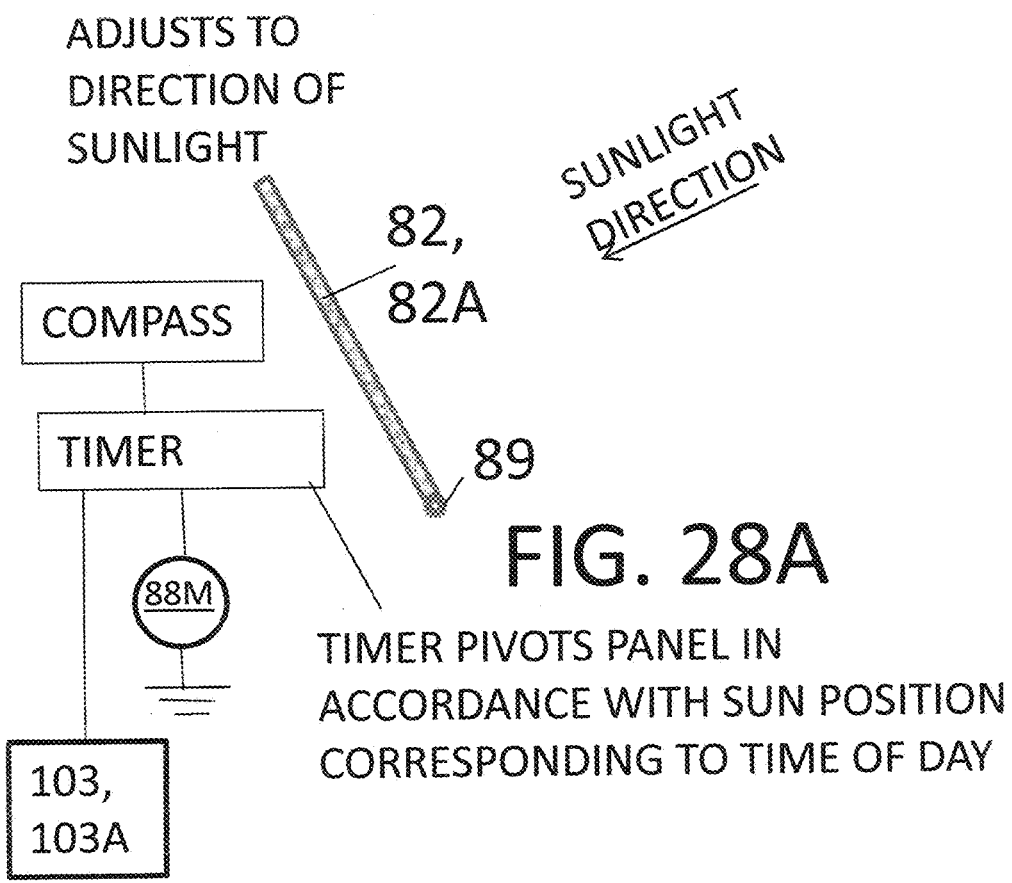
FIG. 28A is schematic side view illustration of a cut-a-way portion of the solar collector 80A showing the front section 82, 82A positionable to obtain increased and/or maximum exposure to the sun using a timer to adjust the positioning of the section using a motor and gear assembly for positioning.

FIG. 28A is schematic side view illustration of a cut-a-way portion of the solar collector 80A showing the front section 82, 82A positionable to obtain increased and/or maximum exposure to the sun using a timer to adjust the positioning of the section using a motor and gear assembly for positioning. The timer controls the pivoting of the panel 82 or 82A in accordance with the expected position of the sun. The positioning of a solar panel in response to the time of day was further discussed in U.S. Pat. No. 7,789,524. For example, at noon, the sun is expected to be overhead. Using a compass, the sun will set in the west and, the positioning of the section 82 or 82A will be adjusted to reflect the angle of the sun as it sets. Similarly, the panel 84 or 84A is also adjustable in the same or similar manner in accordance with the position of the sun.

Figure 28B:
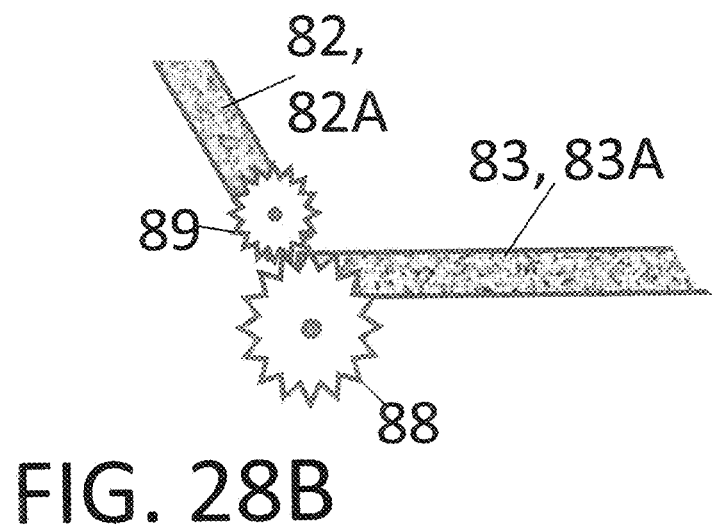
FIG. 28B is an enlarged schematic side view illustration of a cut-a-way portion of the preferred embodiment solar collector 80A showing the front section 82 or 82A and middle section 83 or 83A and the gear drive assembly 86 comprising motor 88M and gear 88 which drives gear 89 to position 82 or 82A in accordance with the expected position of the sun.

FIG. 28B is an enlarged schematic side view illustration of a cut-a-way portion of the preferred embodiment solar collector 80A showing the front section 82 or 82A and middle section 83 or 83A, wherein a drive gear 88 rotates gear 89 to position 82 or 82A in accordance with the expected position of the sun. A motor assembly 86 comprising motor 88M and gear is used to drive the drive gear 88. Although not shown, the gear 90 may also be driven by a motor gear assembly 86 wherein a motor 90M is connected to the gear 90 in a like manner to that shown in FIG. 27B.

FIG. 29A is schematic side view illustration of a preferred embodiment solar collector 80A showing the sections 82, 83 and 84 (or 82A, 83A and 84A), where the front and rear sections 82 and 84 are positioned by gears 89 and 91, which are driven by drive gears 88 and 90 respectively, from an open position in FIG. 29A to a closed position in FIG. 29D. The sections may be hinged together by hinges or flexible material such as plastic or cloth. As shown in FIG. 27C a programmable controller 103A may be used which operates the gear motor assemblies 86 associated with drive gears 88 and 90 in a well known manner. Optionally, the programmable controller 103A may use sensors to sense the position of the sections 82 and 84 as they close into the position shown in FIG. 29D. The section 84 may have solar cell capability on both of its sides so as to function as a solar source when in the position shown in FIB. 29D, as well as in the open position shown in FIG. 29A. As described in connection with FIG. 27A, either or both sections 82 and 84 may be positioned for maximum exposure to sunlight. Preferred methods include using a sensor (ammeter) as described in connection with FIG. 27A, or a compass and/or timer as shown in FIG. 28A. As depicted in FIG. 29D, the assembly 80 or 80A folds into a compact unit which may be stored in a compartment in the roof of the vehicle or may be positioned on top of the car by straps, hooks, supports or the like. The roof mounts 85 may be used in conjunction with assembly 80 or 80A and may comprise suction cups, straps, flexible mounts, magnetic connectors or metal supports for removable attachment to the vehicle roof.

While two gears are depicted in connection with the embodiment of FIG. 29A-D, any number of gears may be used without departing from the scope of the present invention. Optionally, instead of gears, rubber wheels may be used to pivot the sections 82, 84. The rubber or friction surfaced wheels could be motor driven and pivot the sections 82, 84. Optionally, the sections 82 and 84 could be folded or pivoted manually. Section 84 or 84A may be double sided so as to collect solar radiation in both the open and closed positions.

Figure 30A:
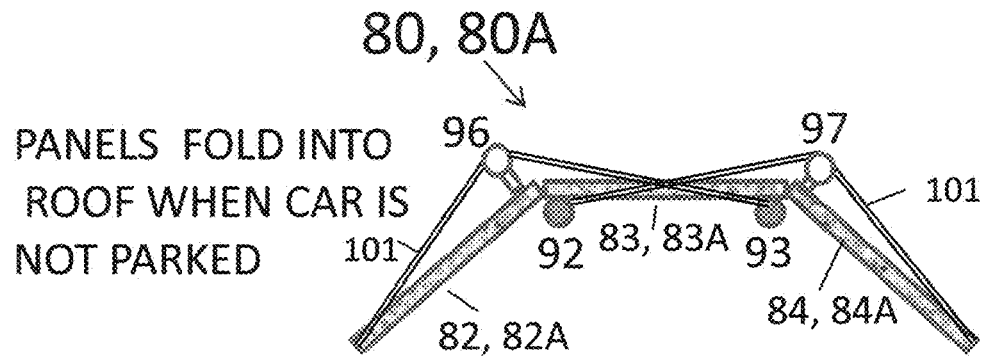
FIG. 30A is a schematic side view illustration of a preferred embodiment solar collector 80W or 80AW showing the sections 82, 83 and 84 (or 82A, 83A and 84A), in an open position using, inter alia, winches 92, 93.

FIG. 30A is a schematic side view illustration of a preferred embodiment solar collector 80W or 80AW showing the sections 82, 83 and 84 (or 82A, 83A and 84A), in an open position using, inter alia, winches 92, 93 and cable 101. Although pulleys may be used for components 96, 97, grooved support may be used to provide a sliding surface for cable 101. As an alternative to cable 101, a strong filament, wire, strapping, string, cord or the like may be used.

Figure 30B:
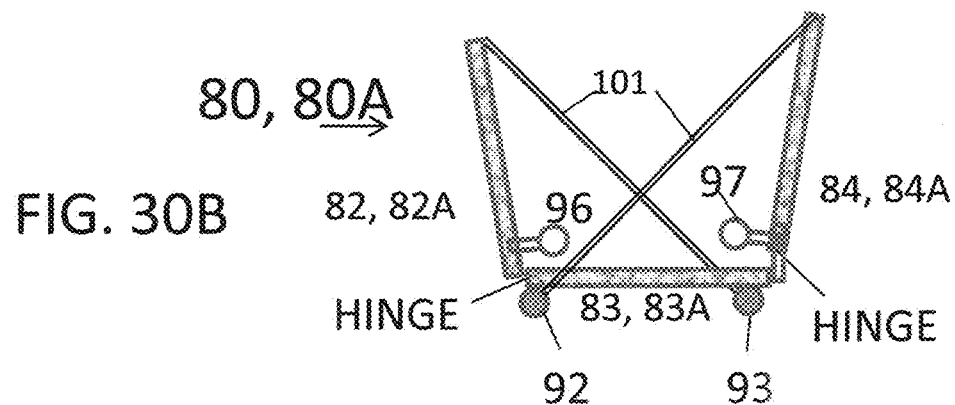
FIG. 30B is a schematic side view illustration of a preferred embodiment solar collector 80W or 80AW showing the sections 82, 83 and 84 (or 82A, 83A and 84A), with sections 84 and 82 being substantially in an upright position using, inter alia, winches 92, 93.

FIG. 30B is a schematic side view illustration of a preferred embodiment solar collector 80W or 80AW showing the sections 82, 83 and 84 (or 82A, 83A and 84A), with sections 84 and 82 being substantially in an upright position using, inter alia, winches 92, 93. Alternatively, as described in connection with FIG. 27A, either or both sections 82 and 84 may be positioned for maximum exposure to sunlight. Preferred methods include using a sensor (ammeter) as described in connection with FIG. 27A, or a compass and/or timer as shown in FIG. 28A.

Figure 30C:
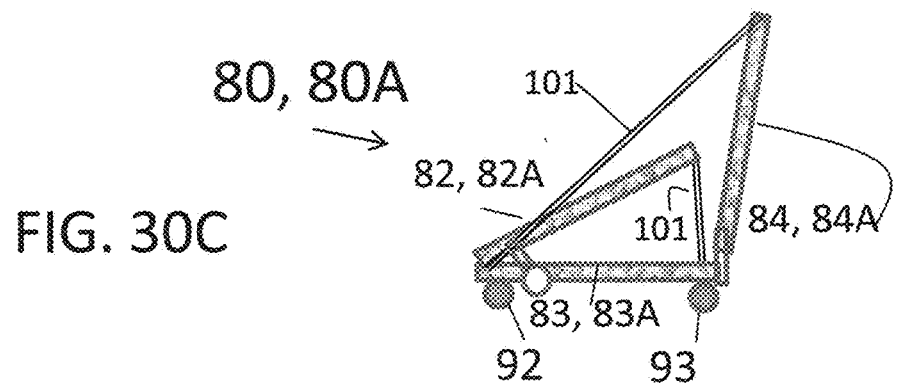
FIG. 30C is a schematic side view illustration of a preferred embodiment solar collector 80W or 80AW showing the sections 82, 83 and 84 (or 82A, 83A and 84A), with section 84 (or 84A) being substantially in an upright position using, inter alia, winches 92, 93.

FIG. 30C is a schematic side view illustration of a preferred embodiment solar collector 80W or 80AW showing the sections 82, 83 and 84 (or 82A, 83A and 84A), with section 84 (or 84A) being substantially in an upright position using, inter alia, winches 92, 93.

Figure 30D:
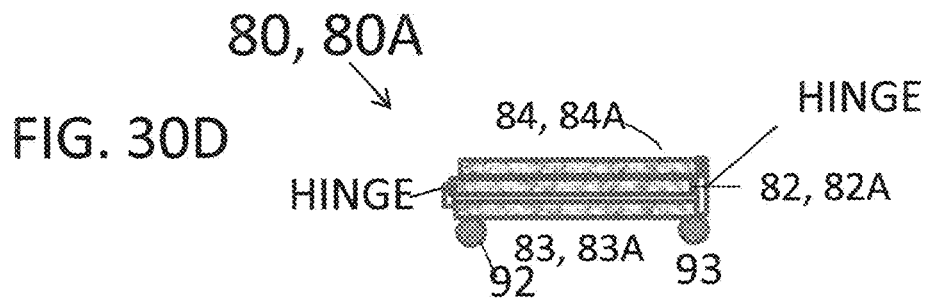
FIG. 30D is a schematic side view illustration of a preferred embodiment solar collector 80W or 80AW showing the sections 82, 83 and 84 (or 82A, 83A and 84A), with all sections being in a closed position, using, inter alia, winches 92, 93.

FIG. 30D is a schematic side view illustration of a preferred embodiment solar collector 80W or 80AW showing the sections 82, 83 and 84 (or 82A, 83A and 84A), with all sections being in a closed position, using, inter alia, winches 92, 93. Section 84 or 84A may be double sided so as to collect solar radiation in both the open and closed positions.

Figure 31A:
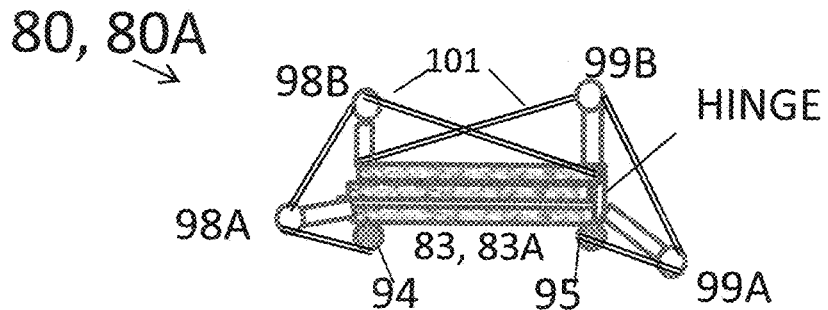
FIG. 31A is a schematic side view illustration of a preferred embodiment solar collector 80W or 80AW showing the sections 82, 83 and 84 (or 82A, 83A and 84A), with all sections being in a closed position, using, inter alia, winches 94, 95. Note that winches 92 and 93 are also present in the embodiments 80W and 80AW shown in FIGS. 31A-31D, but not shown for reasons relating to clarity of presentation. Likewise, winches 94 and 95 are also present but not illustrated in the embodiments 80W and 80AW shown in FIGS. 30A-30D.

FIG. 31A is a schematic side view illustration of a preferred embodiment solar collector 80W or 80AW showing the sections 82, 83 and 84 (or 82A, 83A and 84A), with all sections being in a closed position, using, inter alia, winches 94, 95. Note that winches 92 and 93 are also present in the embodiments 80W and 80AW shown in FIGS. 31A-31D, but are not shown in these Figures for reasons relating to clarity of presentation. Likewise, winches 94 and 95 are also present but not illustrated in the embodiments 80W and 80AW shown in FIGS. 30A-30D.

Figure 31B:
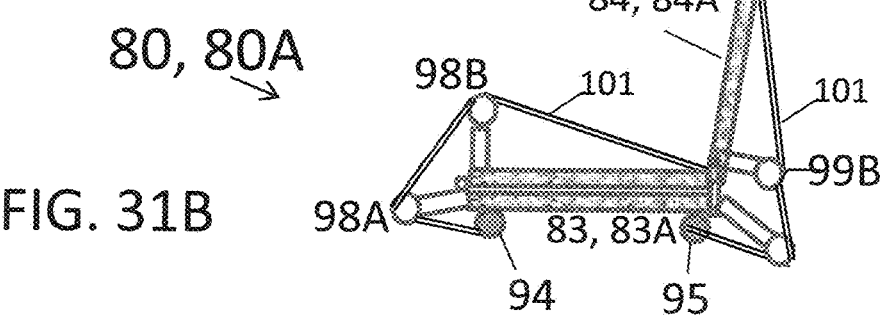
FIG. 31B is a schematic side view illustration of a preferred embodiment solar collector 80W or 80AW showing the sections 82, 83 and 84 (or 82A, 83A and 84A), with sections 84, 84A in an upright position using, inter alia, winch 95.

FIG. 31B is a schematic side view illustration of a preferred embodiment solar collector 80W or 80AW showing the sections 82, 83 and 84 (or 82A, 83A and 84A), with sections 84,84A in an upright position using, inter alia, winch 95. Elements 98A, 98B, 99A, 99B may be pulleys, cable guides or simply grooved supports which position the cable, wire, cord 101 in the proper position.

Figure 31C:
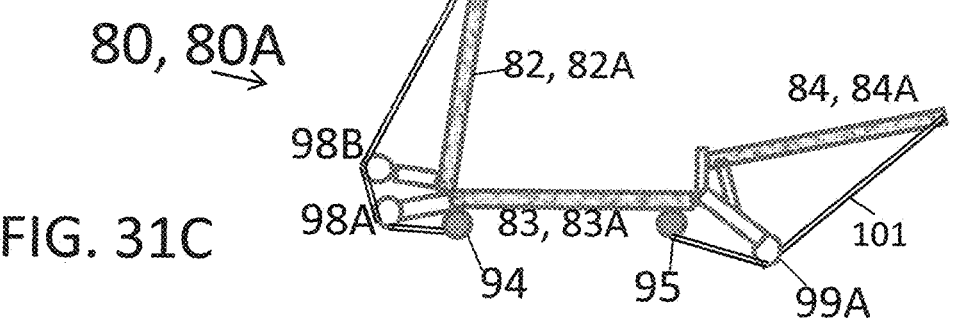
FIG. 31C is a schematic side view illustration of a preferred embodiment solar collector 80W or 80AW showing the sections 82, 83 and 84 (or 82A, 83A and 84A), with sections 82, 82A in a somewhat upright position using, inter alia, winch 94 and sections 84, 84A in a substantially horizontal position using, inter alia, winch 95.

FIG. 31C is a schematic side view illustration of a preferred embodiment solar collector 80W or 80AW showing the sections 82, 83 and 84 (or 82A, 83A and 84A), with sections 82,82A in a somewhat upright position using, inter alia, winch 94 and sections 84, 84A in a substantially horizontal position using, inter alia, winch 95.

Figure 31D:
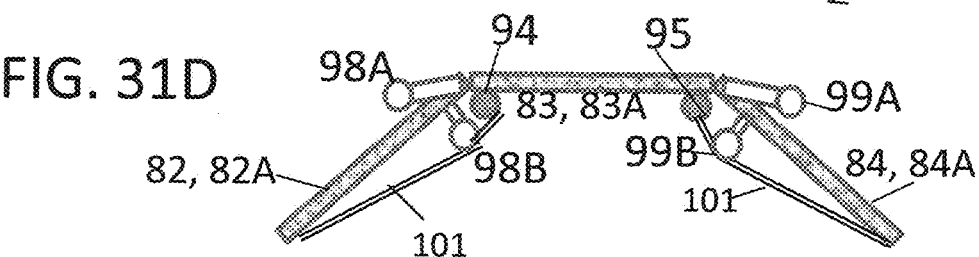
FIG. 31D is a schematic side view illustration of a preferred embodiment solar collector 80W or 80AW showing the sections 82, 83 and 84 (or 82A, 83A and 84A), with sections 82,82A in an open position using, inter alia, winches 94, 95.

FIG. 31D is a schematic side view illustration of a preferred embodiment solar collector 80W or 80AW showing the sections 82, 83 and 84 (or 82A, 83A and 84A), with sections 82,82A in an open position using, inter alia, winches 94, 95. A programmable controller may be used to drive the motor assemblies or winches 92, 93, 94, 95 in accordance with the proper timing, or the winches may be powered manually.

Figure 32A:
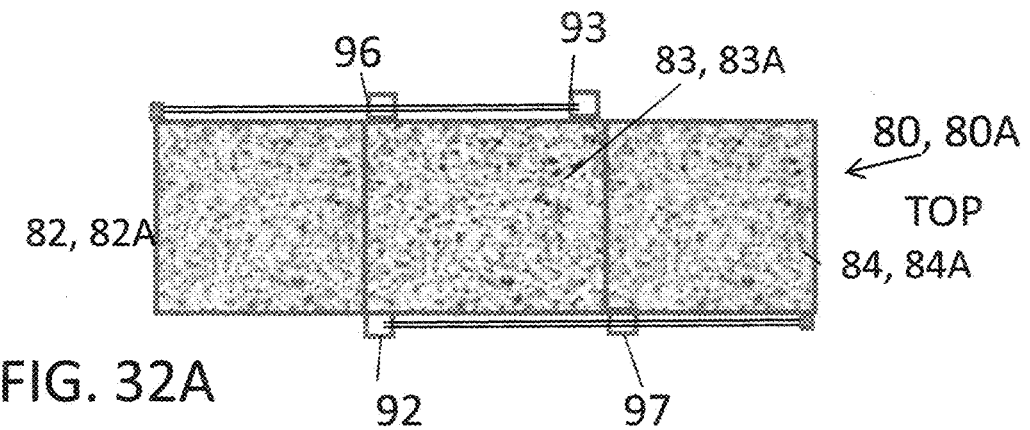
FIG. 32A is a schematic top view illustration of a preferred embodiment solar collector 80W or 80AW showing the sections 82, 83 and 84 (or 82A, 83A and 84A) in open position using, inter alia, winches 92, 93, 94, and 95.

FIG. 32A is a schematic top view illustration of a preferred embodiment solar collector 80W or 80AW showing the sections 82, 83 and 84 (or 82A, 83A and 84A) in open position using, inter alia, winches 92, 93, 94, and 95.

Figure 32B:
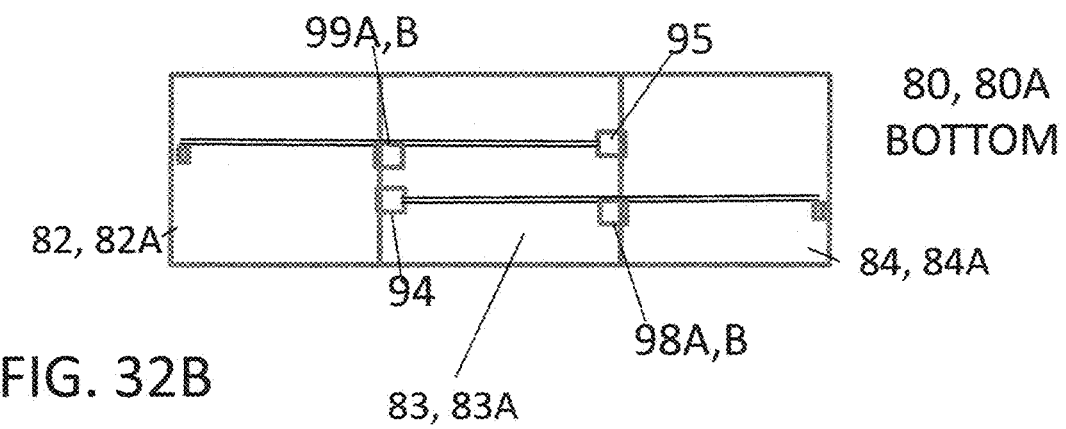
FIG. 32B is a schematic bottom view illustration of a preferred embodiment solar collector 80W or 80AW showing the sections 82, 83 and 84 (or 82A, 83A and 84A) in open position using, inter alia, winches 92, 93, 94, and 95. Winches 92 and 93 are present but not shown for the sake of clarity.

FIG. 32B is a schematic bottom view illustration of a preferred embodiment solar collector 80W or 80AW showing the sections 82, 83 and 84 (or 82A, 83A and 84A) in open position using, inter alia, winches 92, 93, 94, and 95. Winches 92 and 93 are present but not shown for the sake of clarity.

Figure 32C:
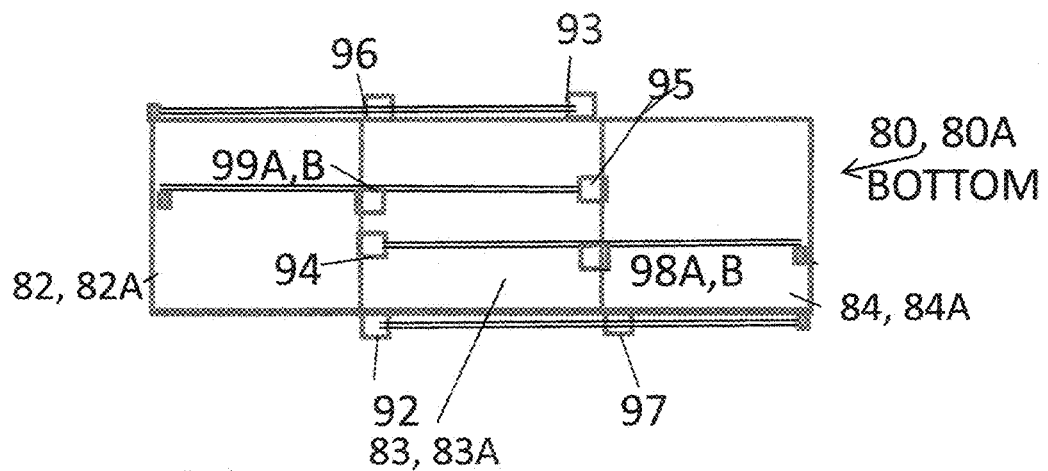
FIG. 32C is a schematic bottom view illustration of a preferred embodiment solar collector 80W or 80AW showing the sections 82, 83 and 84 (or 82A, 83A and 84A) in open position showing, inter alia, winches 92, 93, 94, and 95.

FIG. 32C is a schematic bottom view illustration of a preferred embodiment solar collector 80W or 80AW showing the sections 82, 83 and 84 (or 82A, 83A and 84A) in open position showing, inter alia, winches 92, 93, 94, and 95.

Figure 33:
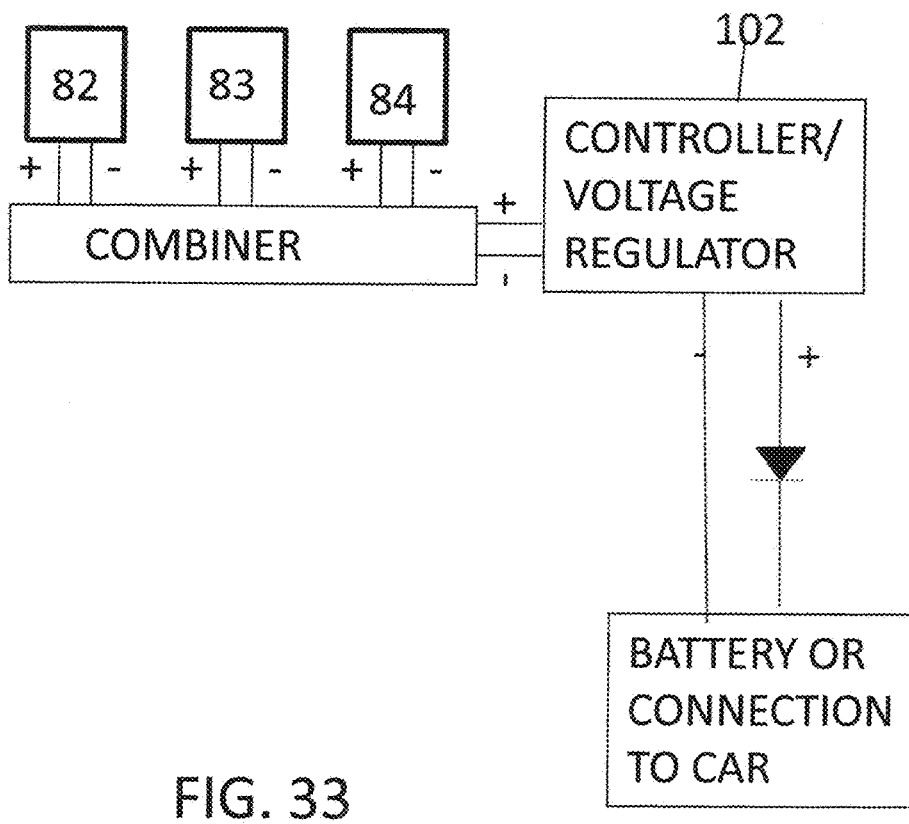
FIG. 33 is a schematic illustration of a combiner for combining the electric input from solar panels 82, 83, and 84.

FIG. 33 is a schematic illustration of a combiner for combining the electric input from solar panels 82, 83, and 84. Optionally any number of sections may be used depending upon the particular application and type of vehicle. An optional voltage regulator may be used depending upon the power requirements. An optional diode or one way circuit may be used to prevent current from flowing from the vehicle battery into the assembly 80 or 80A except when desired.

Figure 34:
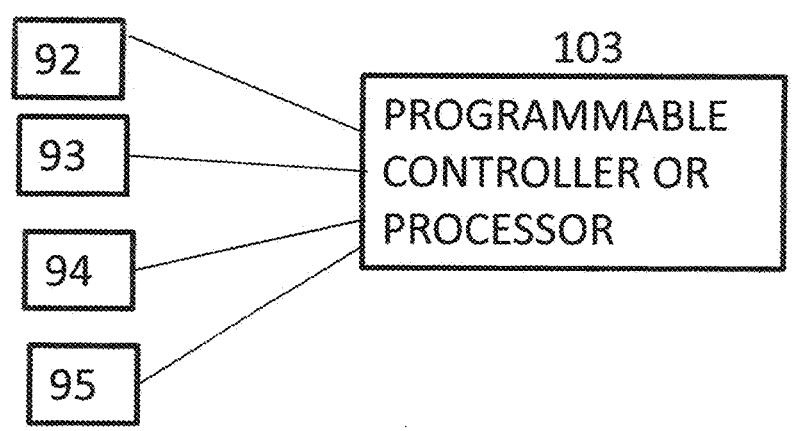
FIG. 34 is a programmable controller or processor for operating the winches 92, 93, 94, 95 so as to position each of the panels 82, 83, and 84 in the proper place at the proper time according to a programmed routine. In the alternative, the winches may be operated manually.

FIG. 34 illustrates, inter alia, a programmable controller or processor for operating the winches 92, 93, 94, 95 so as to position each of the panels 82, 83, and 84 in the proper place at the proper time according to a programmed routine. In the alternative, the winches may be operated manually. Similarly, a programmable controller or processor may be used to power the motor assemblies 86 shown for use in conjunction with gears 88 and motor 87 for use in conjunction with gear 90.

Figure 35:
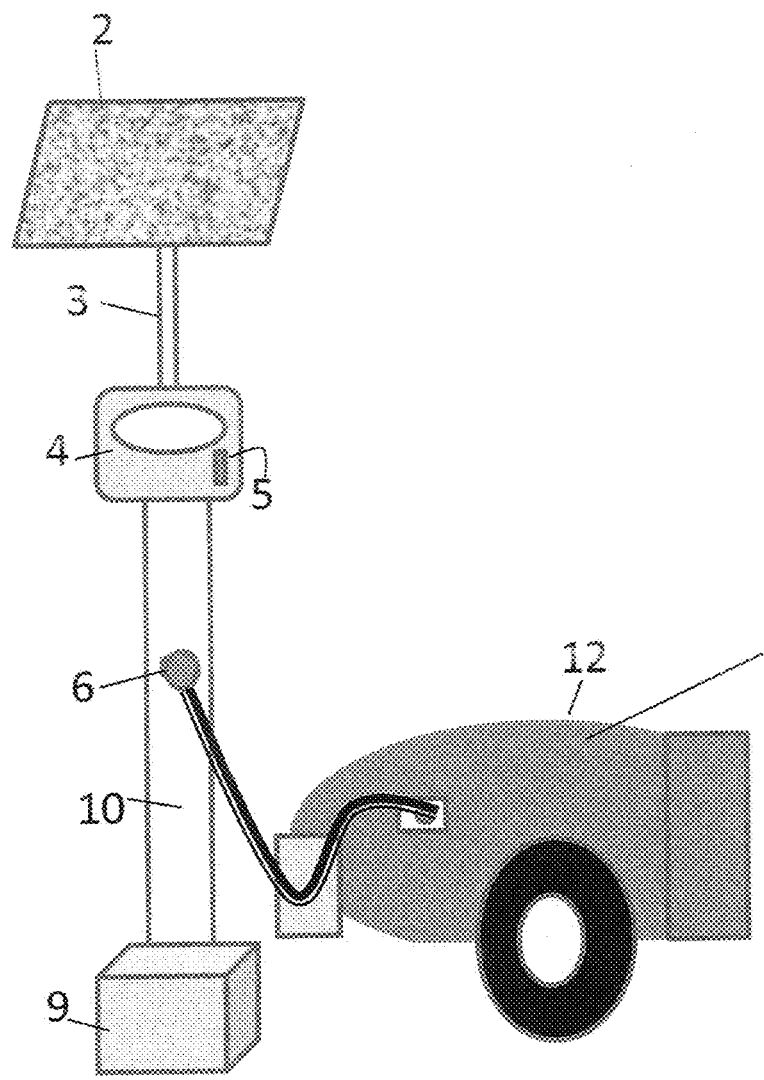
FIG. 35 is a diagrammatic illustration of a vehicle being connected electrically to a charging station which in this illustration has the dual function of a parking meter and charging station where a pay for charge policy can be implemented.

FIG. 35 is a diagrammatic illustration of a vehicle being connected electrically to a charging station which in this illustration has the dual function of a parking meter and charging station where a pay for charge policy can be implemented.

Figure 36:
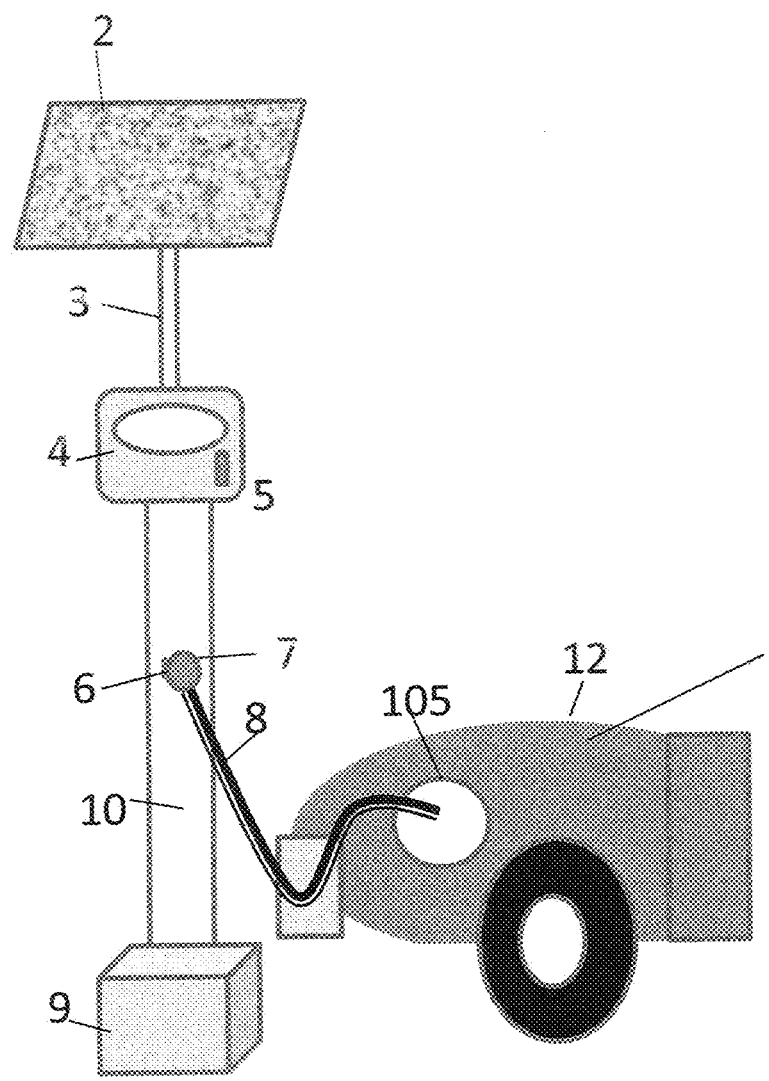
FIG. 36 is a diagrammatic illustration of a vehicle being connected electrically to a charging station, as in FIG. 35, wherein the cord 8 may be locked to the vehicle 12 to prevent interruption of the charging using a housing 105.

FIG. 36 is a diagrammatic illustration of a vehicle being connected electrically to a charging station, as in FIG. 35, wherein the cord 8 may be locked to the vehicle 12 to prevent interruption of the charging using, inter alia, a housing 105.

Figure 37A:
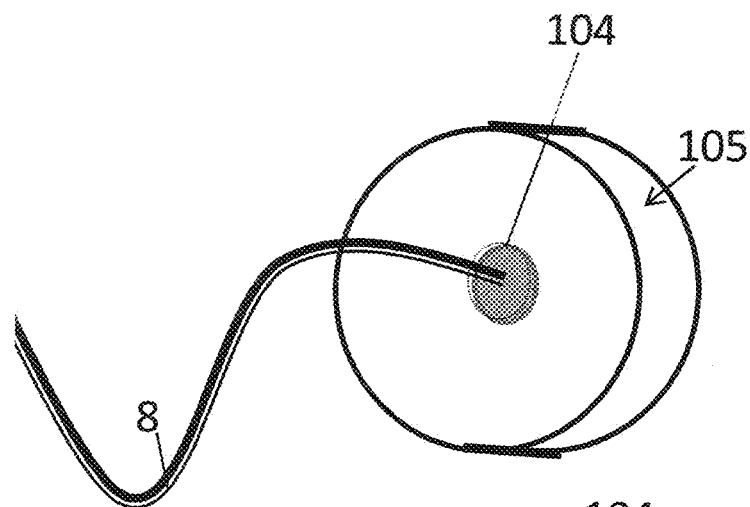
FIG. 37A is a schematic front view illustration of the housing 105 with the outer portions removed.

FIG. 37A is a schematic front view illustration of the housing 105 with the outer portions removed.

Figure 37B:
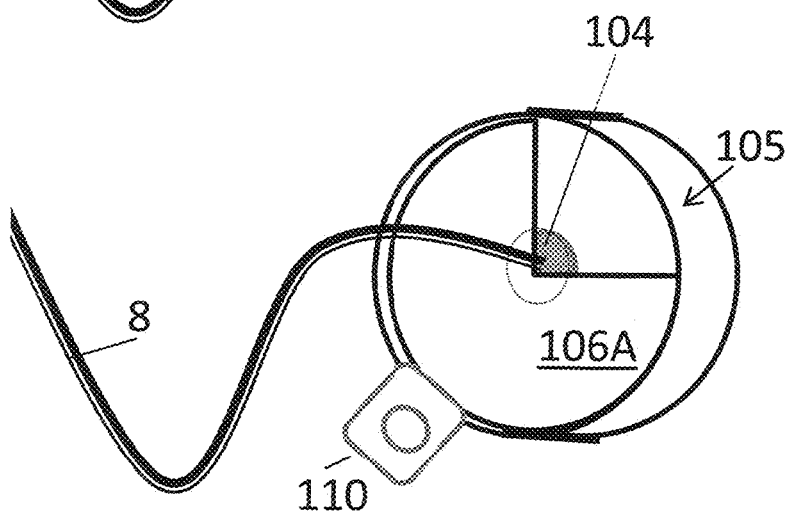
FIG. 37B is a schematic front view illustration of the housing 105 with the sliding door in an open position.

FIG. 37B is a schematic front view illustration of the housing 105 with the sliding door in an open position. The door 106A rotates or pivots around its diametrical center in a groove or the like within the housing 105.

Figure 37C:
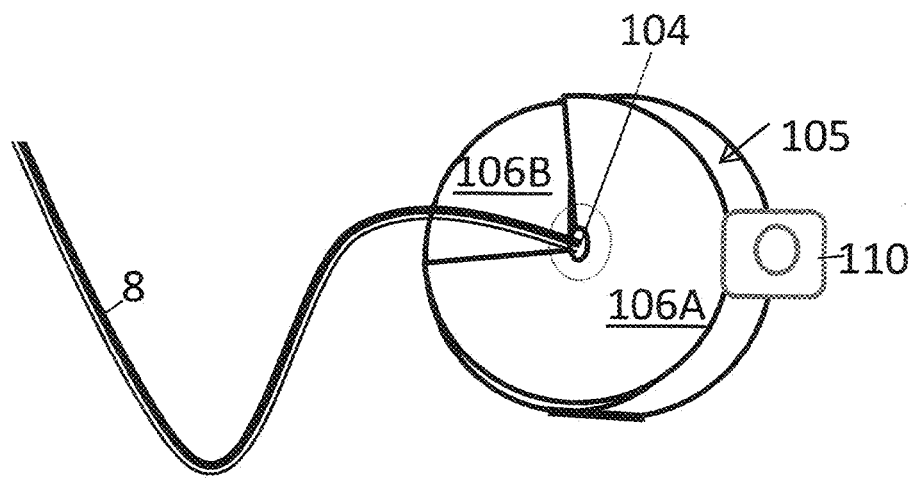
FIG. 37C is a schematic front view illustration of the housing 105 with the sliding door in a closed position.

FIG. 37C is a schematic front view illustration of the housing 105 with the sliding door in a closed position. It may be secured by a lock 110.

Figure 38A:
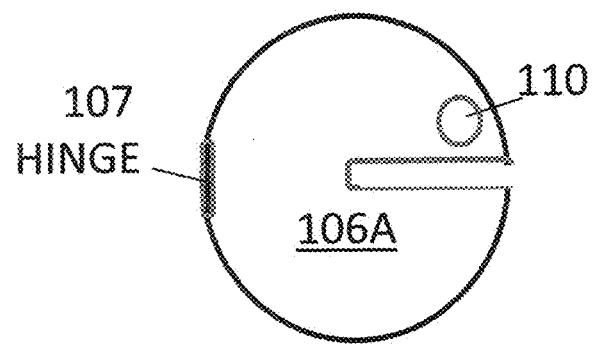
FIG. 38A is a schematic front view illustration of an alternate housing 105A with the outer portions removed.
Figure 38B:
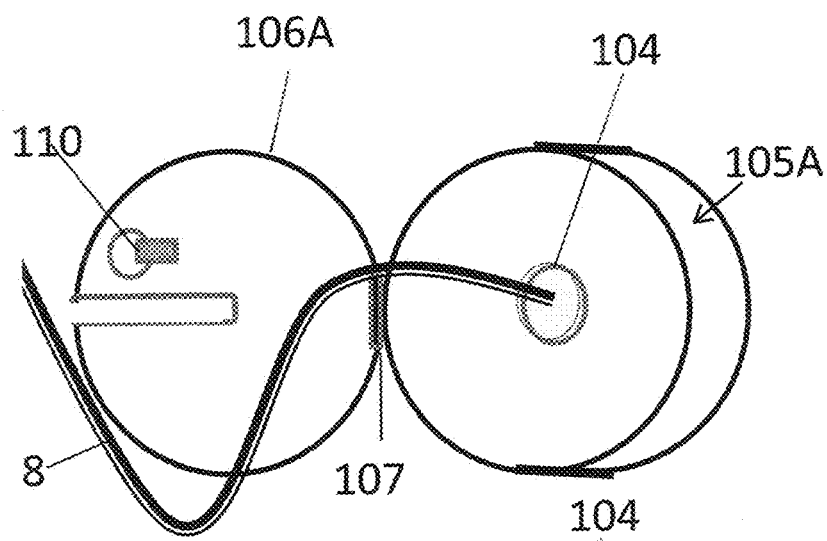
FIG. 38B is a schematic front view illustration of the housing 105A with the hinged door 106A in an open position.
Figure 38C:
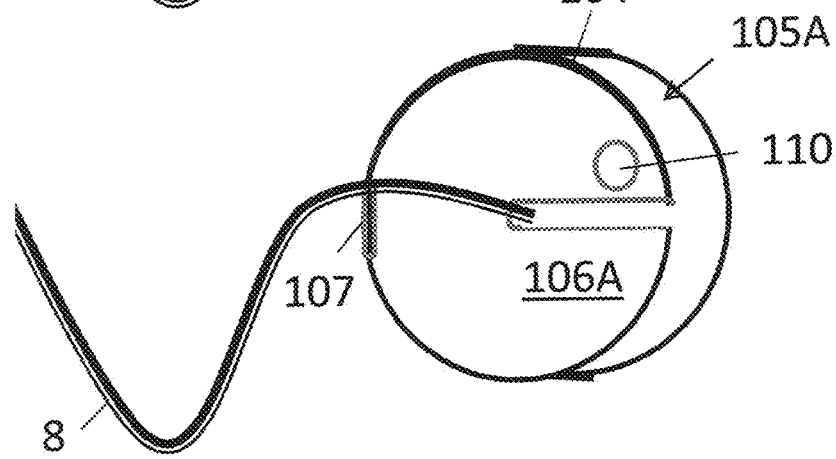
FIG. 38C is a schematic front view illustration of the housing 105A with the hinged door 106A in a closed position.

FIGS. 38A-38C illustrate schematically an alternate preferred embodiment housing 105A. FIG. 38A illustrates the door 106A apart from the housing 105A.

FIG. 38B is a schematic front view illustration of the housing 105A with the hinged door 106A in an open position. Also appearing is the reverse side of the lock 110 with a protrusion for engaging a stationary hook or the like. Also shown in FIG. 38B is a plug 104 at the end of cord 8.

FIG. 38C is a schematic front view illustration of the housing 105A with the hinged door 106A in a closed position. A slot is used to enable the cord 6 and plug 104 to remain in the proper position so that the vehicle may receive a charge. Also illustrated is a lock 110 to prevent tampering while the vehicle is being charged.

Figure 39:
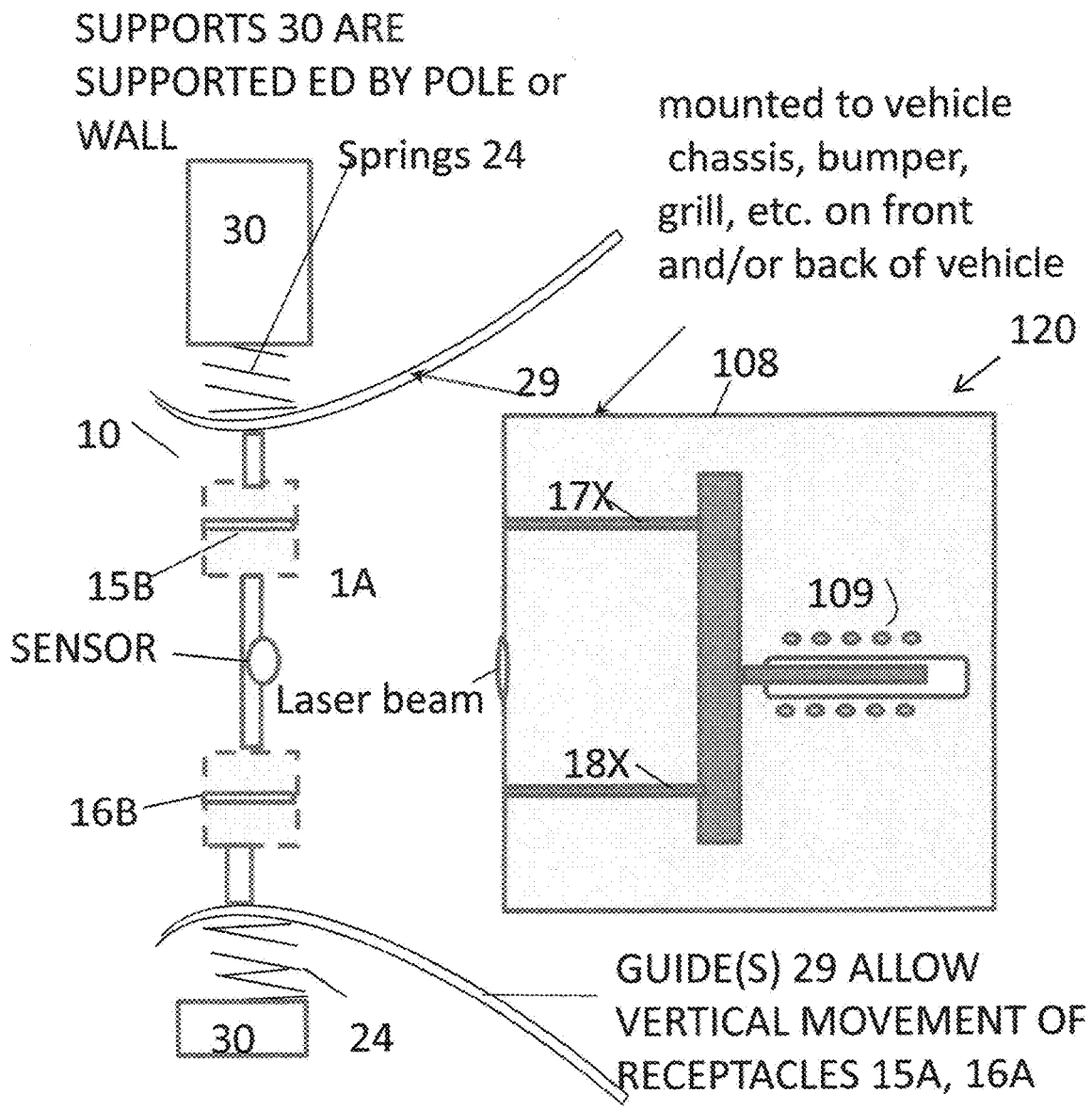
FIG. 39 is a schematic side view illustration of a close-up view of a preferred embodiment assembly 120 of the present invention comprising a support 10, receptacle portions 15B, 16B, and a housing 108 having a solenoid 109 protruding connector portions 17X, 18X. The solenoid operating to insert protruding connector portions 17X, 18X when the laser beam aligns with the sensor 111.

FIG. 39 is a schematic side view illustration of a close-up view of a preferred embodiment assembly 120 of the present invention comprising a support 10, receptacle portions 15B, 16B, and a housing 108 having a solenoid 109 protruding connector portions 17X, 18X. The solenoid operating to insert protruding connector portions 17X, 18X when the laser beam aligns with the sensor 111.

Figure 40:
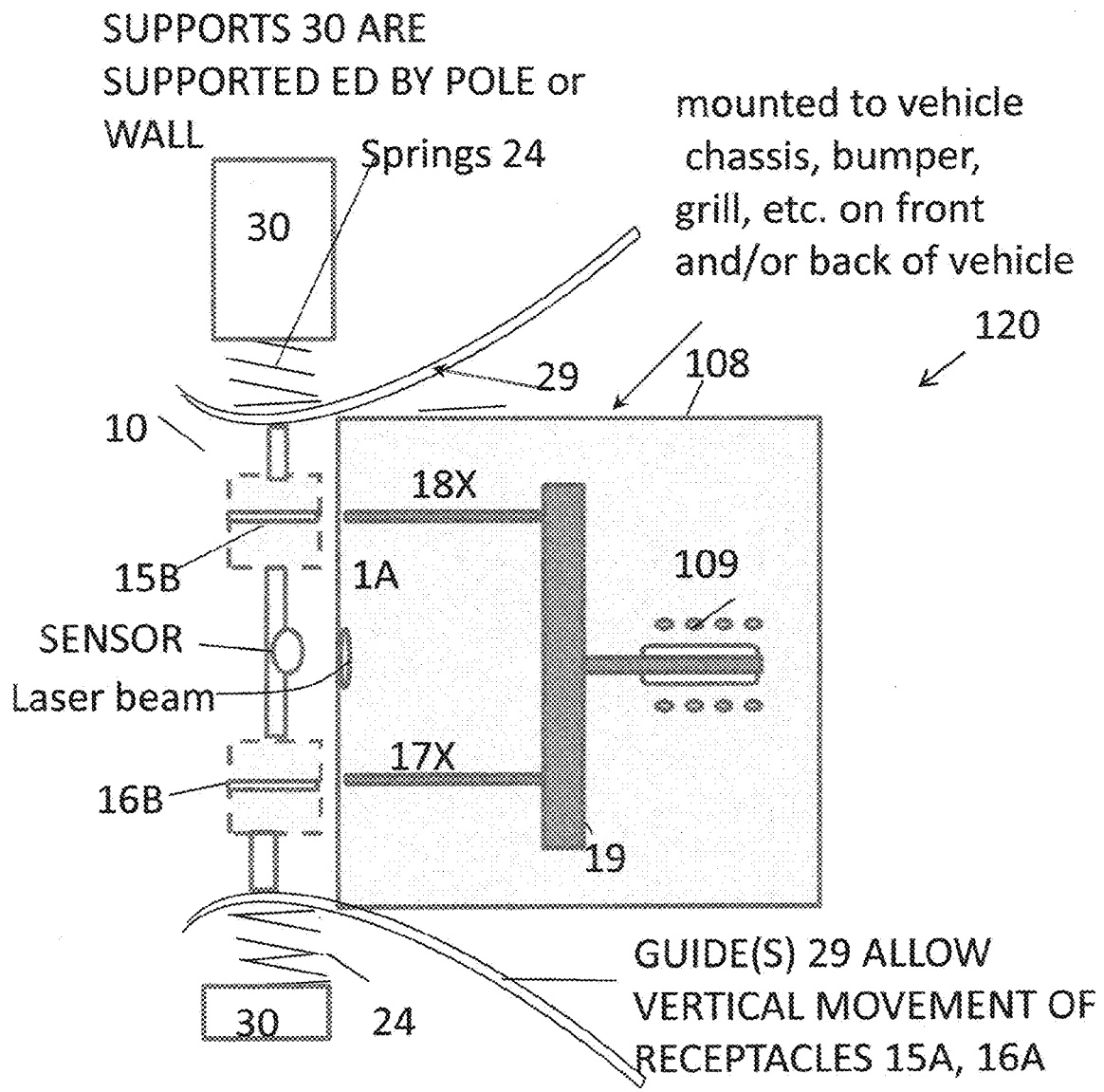
FIG. 40 is a schematic side view illustration of a close-up view of a preferred embodiment assembly 120 of the present invention comprising a support 10, receptacle portions 15B, 16B, and a housing 108 having a solenoid 109 protruding connector portions 17X, 18X. The solenoid operating to insert protruding connector portions 17X, 18X when the laser beam aligns with the sensor 111, wherein the housing 120 is in close proximity to the receptacle portions 15B and 15C through alignment of guides 29 which provides positioning of the receptacle portions.

FIG. 40 is a schematic side view illustration of a close-up view of a preferred embodiment assembly 120 of the present invention comprising a support 10, receptacle portions 15B, 16B, and a housing 108 having a solenoid 109 protruding connector portions 17X, 18X. The solenoid operating to insert protruding connector portions 17X, 18X when the laser beam aligns with the sensor 111, wherein the housing 120 is in close proximity to the receptacle portions 15B and 15C through alignment of guides 29 which provides positioning of the receptacle portions.

Figure 41:
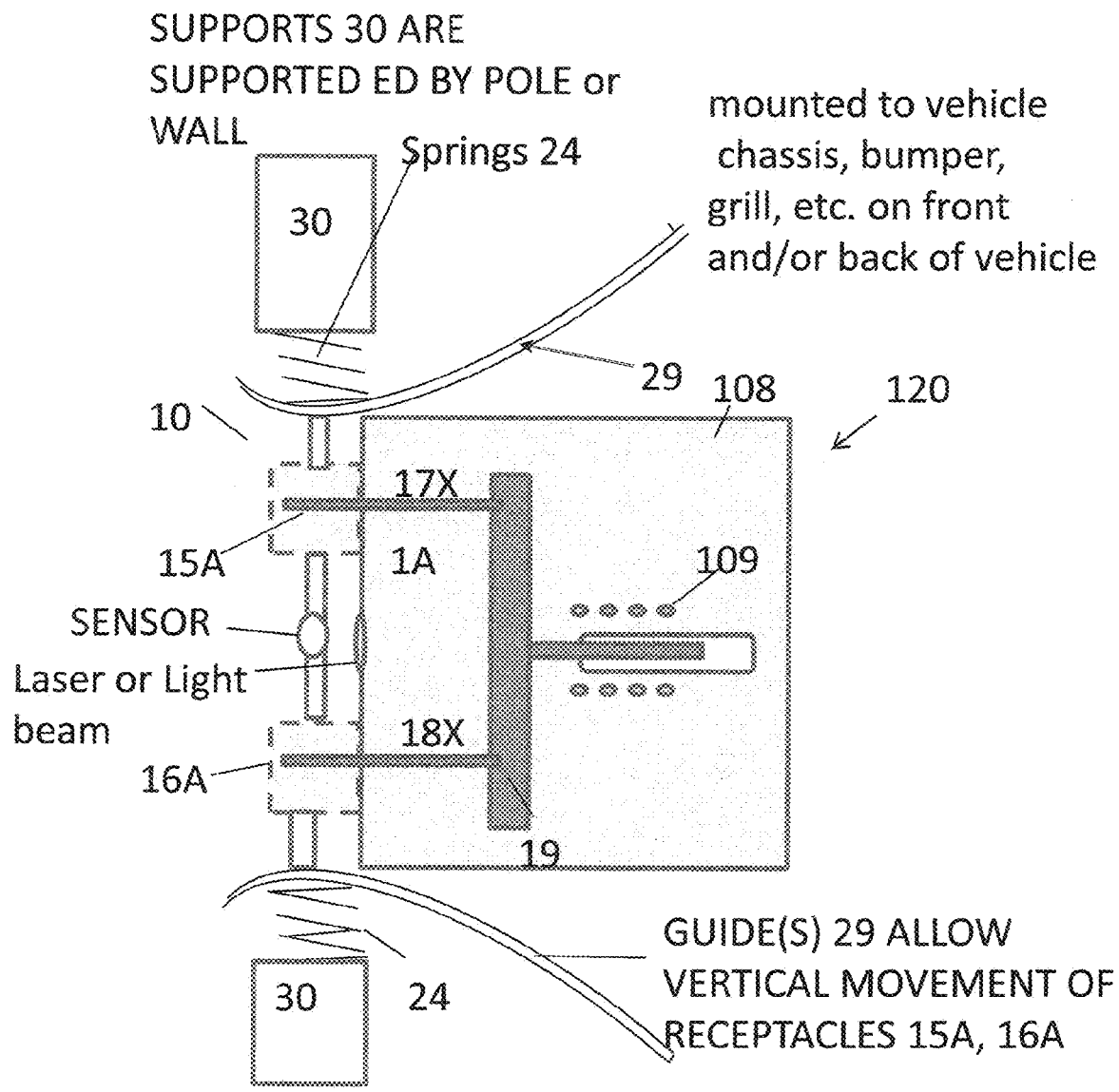
FIG. 41 is a schematic side view illustration of a close-up view of a preferred embodiment assembly 120 of the present invention comprising a support 10, receptacle portions 15B, 16B, and a housing 108 having a solenoid 109 which inserts protruding connector portions 17X, 18X. The solenoid operating to insert protruding connector portions 17X, 18X when the laser beam aligns with the sensor.

FIG. 41 is a schematic side view illustration of a close-up view of a preferred embodiment assembly 120 of the present invention comprising a support 10, receptacle portions 15B, 16B, and a housing 108 having a solenoid 109 which inserts protruding connector portions 17X, 18X. The solenoid operating to insert protruding connector portions 17X, 18X when the laser beam aligns with the sensor.

Figure 42:
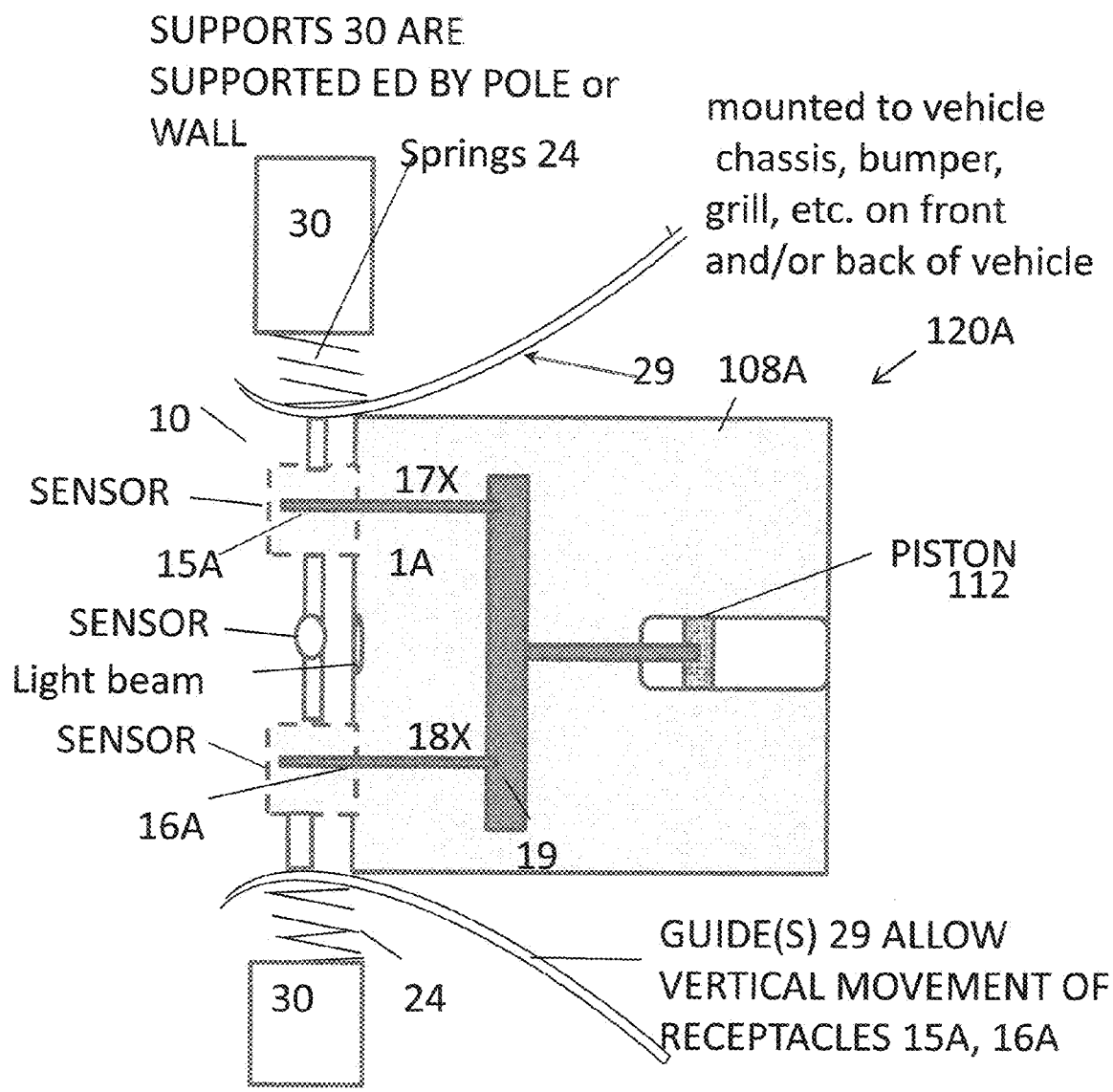
FIG. 42 is a schematic side view illustration of a close-up view of a preferred embodiment assembly 120A of the present invention comprising a support 10, receptacle portions 15B, 16B, and a housing 108 having an alternate piston assembly 112 which inserts protruding connector portions 17X, 18X. The piston operating to insert protruding connector portions 17X, 18X when the laser beam aligns with the sensor
Figure 43:
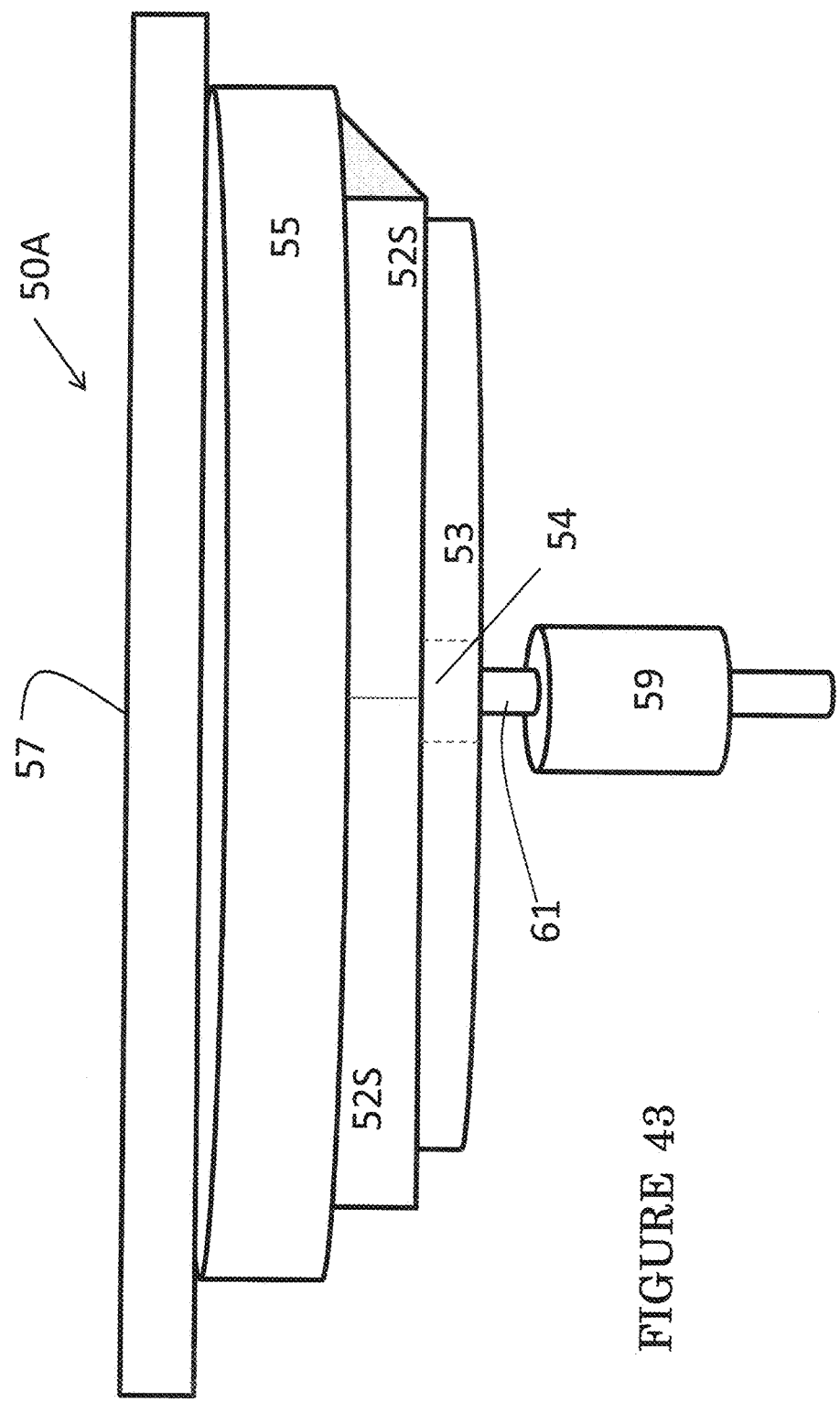
FIG. 43 is an illustration showing a side view of a preferred embodiment assembly 50A of the present invention comprising solar panels support 52, LED support 53, central portion 54, cover 55, wind direction detector 57, and motor/generator 59.

FIG. 42 is a schematic side view illustration of a close-up view of a preferred embodiment assembly 120A of the present invention comprising a support 10, receptacle portions 15B, 16B, and a housing 108 having an alternate piston assembly 112 which inserts protruding connector portions 17X, 18X. The piston operating to insert protruding connector portions 17X, 18X when the laser beam aligns with the sensor FIG. 43 is a side view of a preferred embodiment of the present invention. The assembly shown in FIG. 43 is a preferred embodiment assembly 50A comprising solar panel support surface 52S, LED support 53, central portion 54, cover 55, wind direction detector 57, and motor/generator 59. It can be readily appreciated by those of ordinary skill in the art that the solar support surface 52 may comprise one or a plurality of panels 52S and may take a variety of forms, such as circles, squares, rectangles or arcuate sections. The solar panels 52 may range in dimensions from 1 inch by one inch to two square feet depending on the application, power requirements, and resources available. The LED support 53 is shown as a "disk" but can be any configuration or form. LED support 53 supports LED 3L; which may be a plurality of up to 50 depending on the intensity desired. Moreover, the selection of LEDs 53L is exemplary and any type of light may be used without departing from the scope of the invention. The function of the solar support 52 and LED support 53 may be combined and a single support may perform both functions. Additionally, the solar support 52 and LED support 53 as well as solar diodes 52S and LEDs 53L may be one integral unit. Inasmuch as both LEDs 53L and photodiodes 52S comprise substrates, a preferred embodiment utilizes the same substrate for both the photodiode and LEDs, as described further in U.S. Pat. No. 7,789,524, hereby incorporated by reference. In this regard, the LEDs 53L may be formed using, for example, a sapphire substrate. The same substrate may be used for the photodiode configuration. By doing so, the assembly weight and material requirements are reduced. Moreover, an integral unit comprising the solar support 52 and LED support 53 provides for ease of assembly and greater strength and durability.

Assembly 50A further comprises vanes 56 mounted on the support 53. The vanes may be plastic or aluminum or any material which provides a light weight, durable, rigid construction. The vanes cause the support 53 to turn in response to the force of the wind. Wind screen 55 is substantially semicircular in configuration and shields one side of the LED support 53 while the other side is subjected to the wind. Wind screen 55 is rotatably mounted and is controlled by central vane 57 which responds to wind direction. In addition, LED support 53 is operatively attached to central portion 54 so as to rotate as motor/generator 59 turns, as will be described later.

Figure 44:
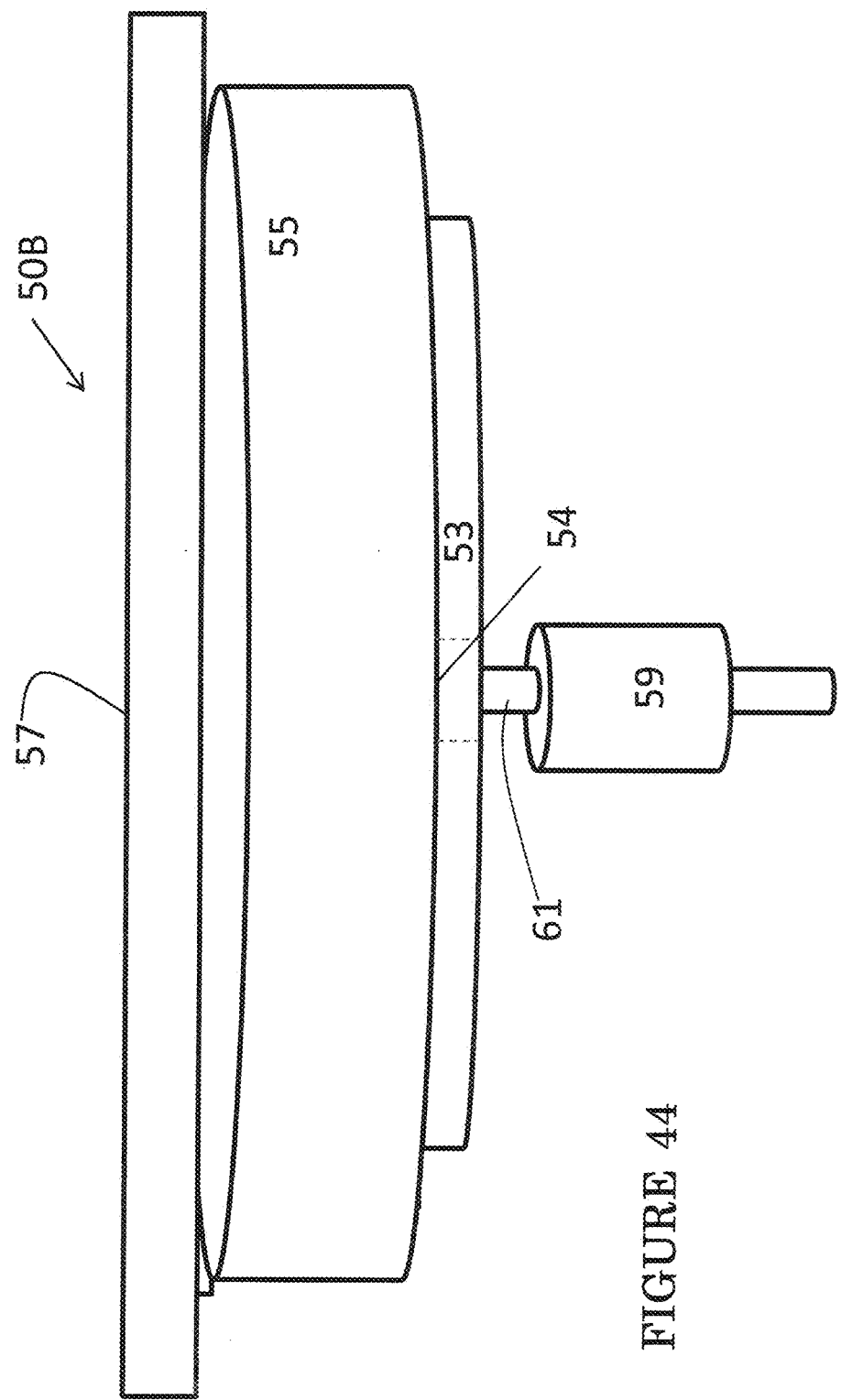
FIG. 44 is an illustration of another preferred embodiment assembly 50B wherein the vanes 56 are located between the solar support 52 and LED support 53 to increase cooling.

As shown in FIG. 44, in conjunction with preferred embodiment assembly 50B, the wind screen covers half of the vanes 56 so that the force applied by the wind to the vanes cases them to turn in a single direction. Other configurations which achieve this result are contemplated within the scope of the invention. The wind screen is substantially clear so as to allow the sun rays to penetrate to the solar panels 52.

Figure 45:
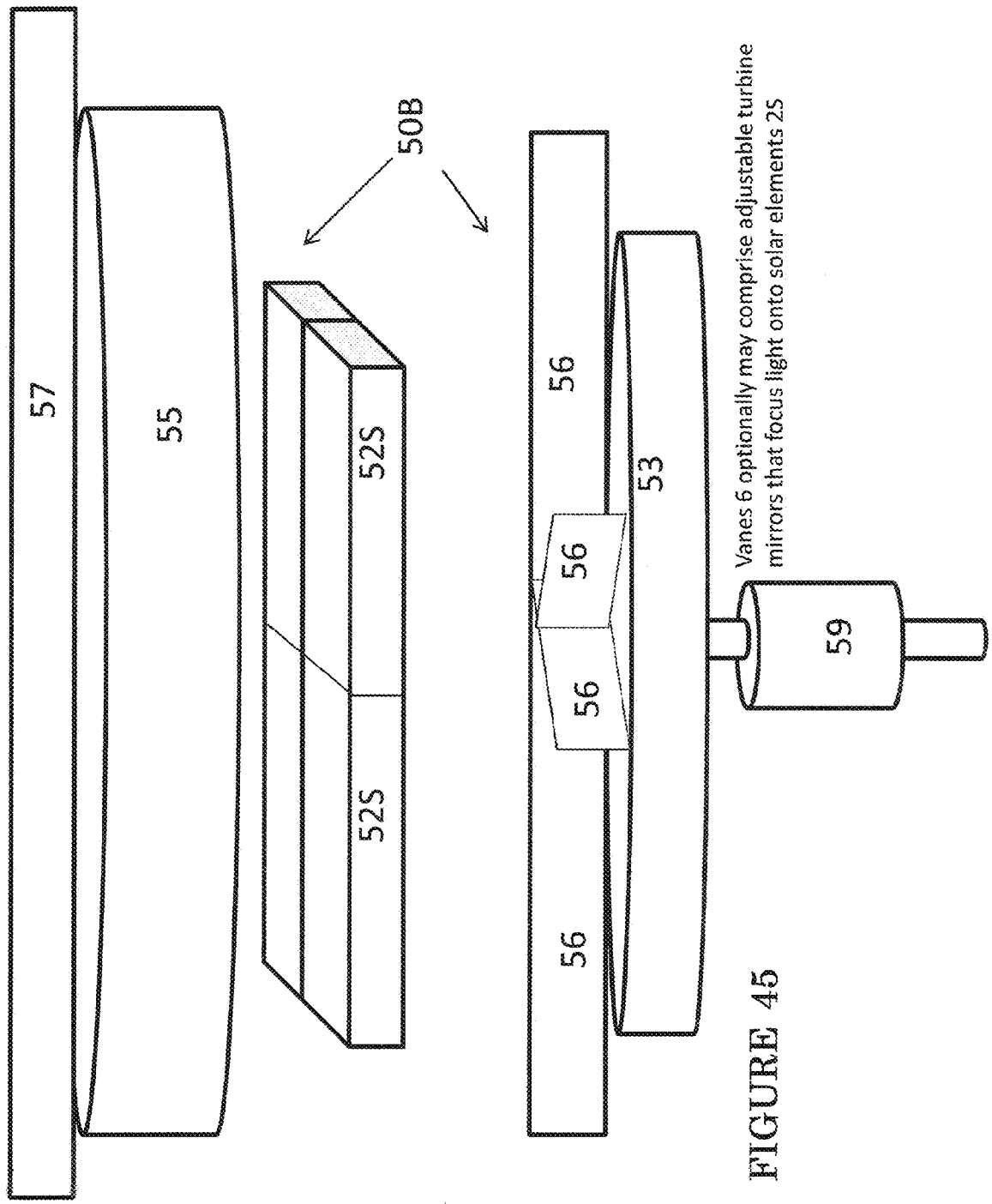
FIG. 45 is an illustration showing a cut-away view of the solar panels 52 and support 53, and vanes 56 of the preferred embodiment of the present invention shown in FIG. 26.

Shown in FIG. 45 is a preferred embodiment in which the vanes 56 are positioned between the solar panels 52S and LED support 53. This configuration effectively channels the wind between the solar panels 52 and LED structure. The wind dissipates the heat energy given off by the LEDs so as to facilitate cooling or temperature control. In the absence of wind, the vanes 56 may be turned by motor 59 to facilitate cooling. FIG. 45 further shows a side view of the LED support 53, photodiodes or solar panels 52, wind screen or cover 55 and wind directional vane 57, Wind directional vane 57 operates in a manner similar to a weather vane in that it points in the wind direction. Wind directional vane 57 may be a variety of configurations The directional vane 57 and wind screen form an integral unit and are designed so the weight is evenly distributed each side of the axis of rotation, but the pointer can move freely on its axis. The area of the directional vane 57 is distributed so that the side with the larger area is blown away from the wind direction. The optional directional pointer may be mounted such that is always on the smaller side. For the wind direction reading to be accurate, the directional vane must be located well above the ground and away from buildings, trees, and other objects which interfere with the true wind direction. But the same is not necessary for the basic functioning of the assembly 50B.

Figure 46:
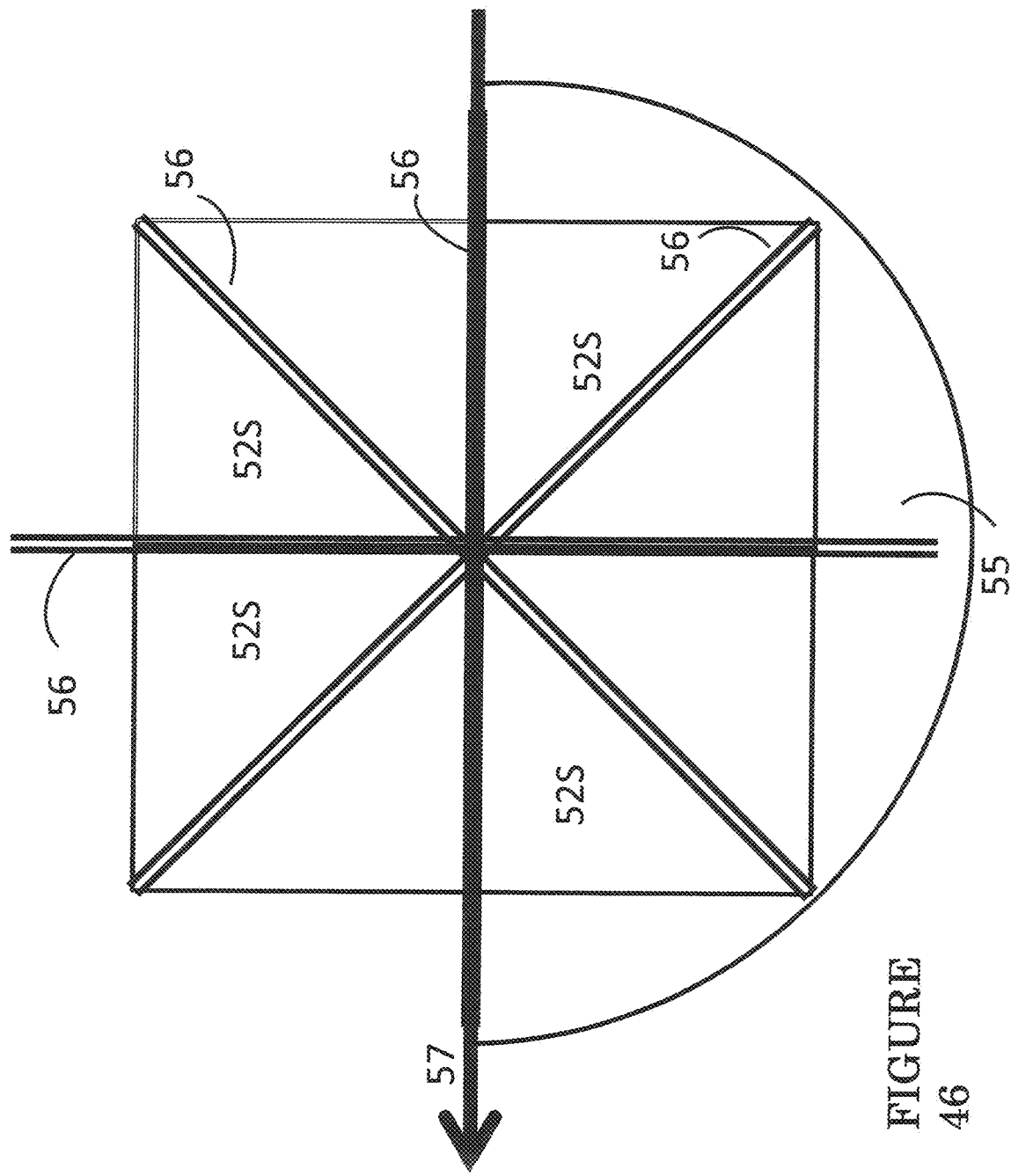
FIG. 46 is an illustration from an overhead perspective of the assembly of FIG. 25 showing the orientation of cover 55 responsive to a wind direction from the right to the left of the page.

Shown in FIG. 46 is a plan view of a preferred embodiment of the present invention. As shown in FIG. 46, for a prevailing wind direction from right to left (as shown in the Figure) the wind direction detector 57 would point to the left and the cover 5 would cover half of the vanes 56 so that the support 52 and the support 53 would turn in a counterclockwise direction on central portion 54. Central portion 54 may be a shaft which is operatively connected to shaft 61 and motor/generator 59. Although four vanes (or eight vane segments are shown in FIG. 46, any number of vanes could be used to enable the wind to propel or rotate the subassembly.

Figure 47:
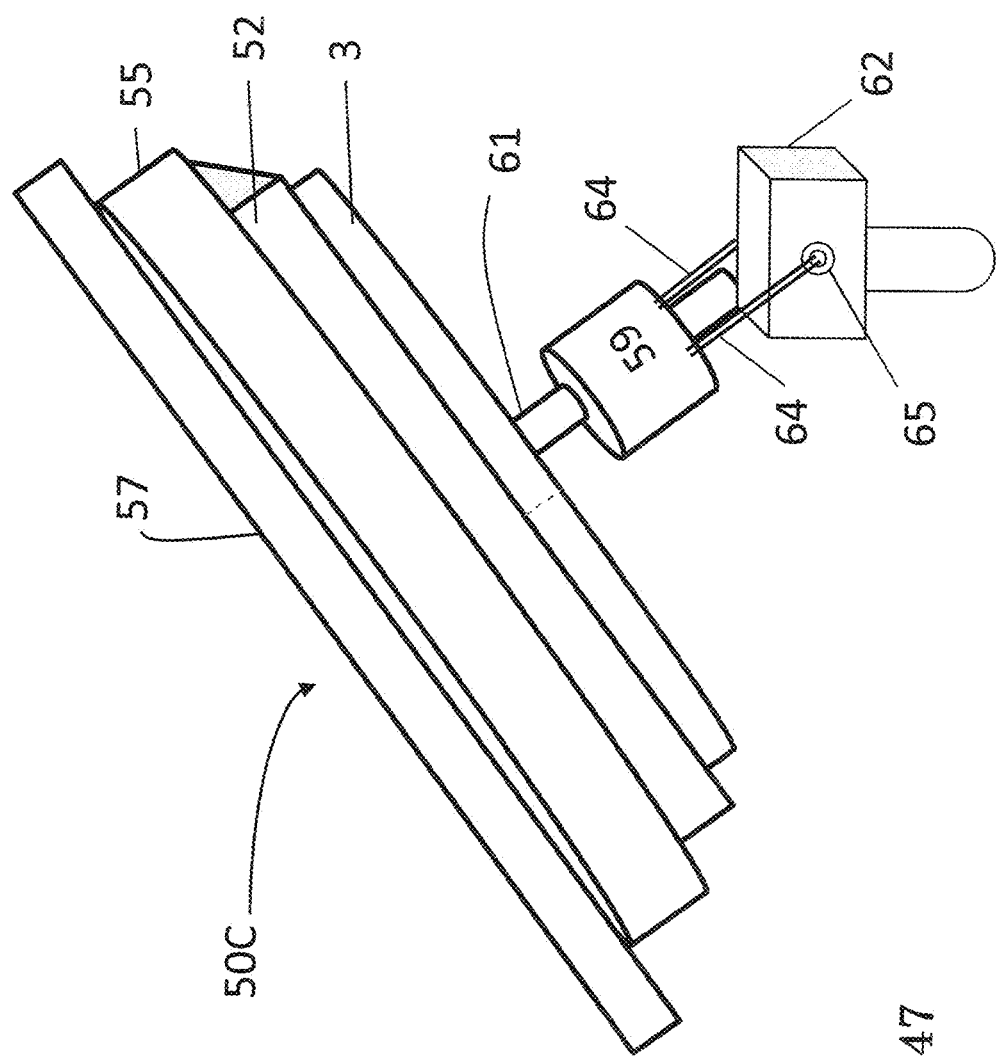
FIG. 47 is a side view illustration of the preferred embodiment of FIG. 43 which has the optional capability of tilting at an angle to gain maximum exposure to the sun.

FIG. 47 is a schematic side view of a preferred embodiment assembly 50C comprising support 53, solar panels 52, cover 55, and wind direction vane 57. Motor-generator 59 is pivotally mounted by supports 64. Each of supports 64 are attached to a pivot or shaft or pivot 65. Shaft or pivot 65 is in turn driven by a motor inside housing 62 (as described further in U.S. Pat. No. 7,789,524) which causes the entire assembly 50C to pivot as shown in FIG. 29. As a result the solar support 52 and solar elements 52S on the assembly 50C can track the sun as it rises in the east and sets in the west. For example, a motor 66 slowly turns the pulley which drives the belt resulting in the angular disposition of the elements 52S. Similarly, the same concept can be applied to the embodiments of, inter alia, FIGS. 26A, 27A, 28A, 30A-D, and 31 A-D, wherein the motors 87 (motor gear assemblies 86), and winches 92-95 are substituted for motor 66.

Figure 48:
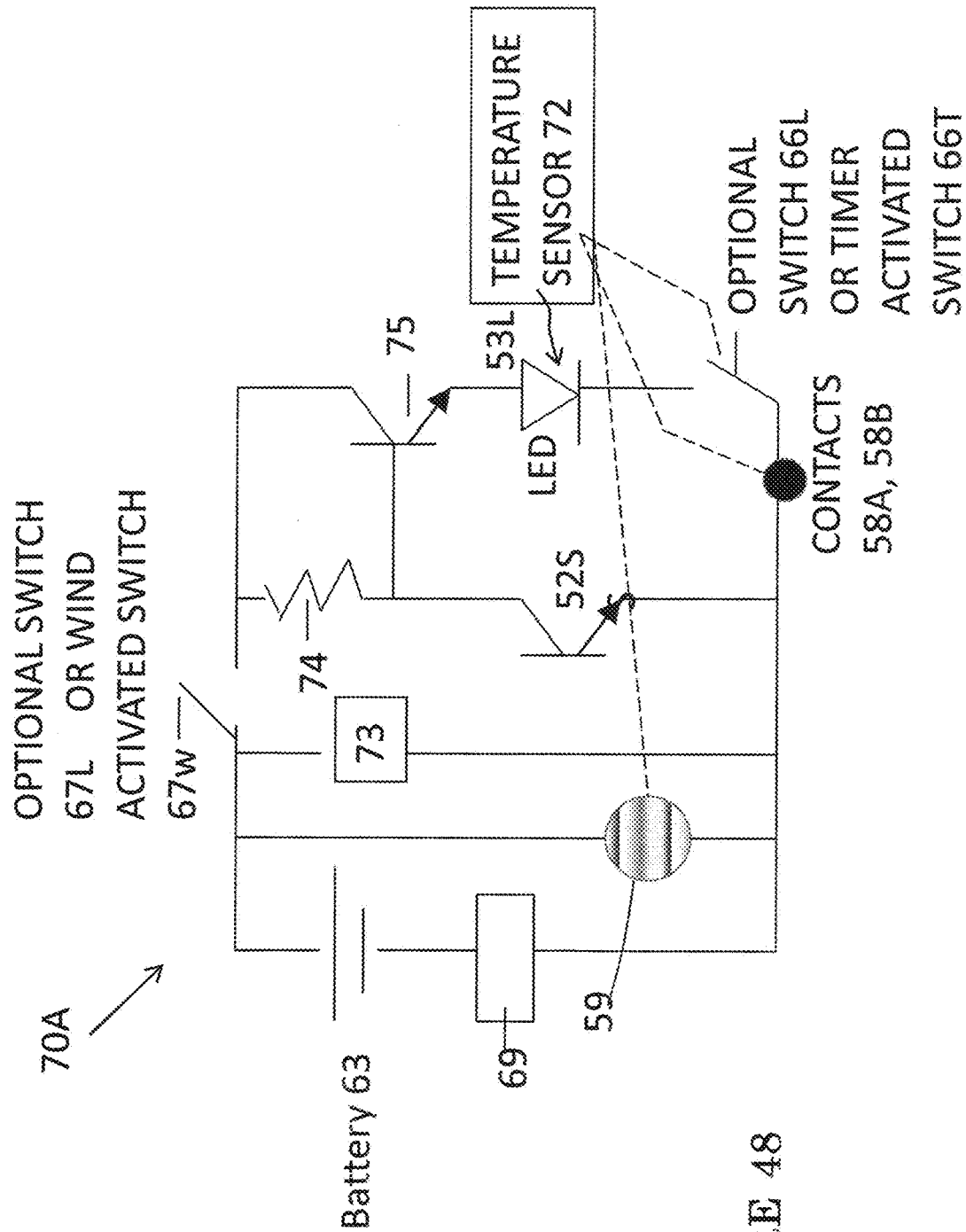
FIG. 48 is a schematic circuit 70A diagram of a preferred embodiment of the present invention.

FIG. 48 is a schematic diagram showing a device 69 for regulating the voltage, controlling the charge into, and/or current from the battery 63 which also may optionally function as an on/off switch which prevents overcharging of the battery 63 and/or effectively removes battery 63 from the circuit 70A. Motor generator 59 operates to recharge battery 63 when in the generator mode and when a low battery indicator 73 indicates the need for a charge. The motor/generator 9 is optional in that the solar diodes may optionally be the sole means for recharging the battery 63. Also, when the motor/generator 59 is operating in the circuit 70A, in cases where the wind is causing the rotation of the vanes 56, the battery may be bypassed using device 69 to disconnect the battery from the circuitry entirely. Similarly, a device 69A may optionally be position in series with the motor/generator 59 to disconnect it from the circuitry when desired. As a further option, devices 69 and 69A may be combined into a combined voltage regulator, charge controller and/or charge level indicator. When the battery is determined to be low, (from optional low battery indicator 73 or the function could be incorporated into the power controller/regulator 69) the contacts 58A, 58B may be positioned such that the contacts are only intermittently connected to create a strobe-like effect for the activation of the LEDs 53L. Similarly, temperature sensor 72 may be operatively connected to the contacts 58A, 58B shorten the contact duration through contacts 58A, 58B or optionally may operate to open the optional switch 66L to prevent over heating of the LEDs 53L, and/or activate motor/generator 59 to rotate the support 53 to create a cooling effect. Moreover, alternatively the light detector 75 (such as commonly used part 2N3904) may operate to turns the LEDs on and off at daylight and dusk either by sensing the intensity of light from the sun and/or environment or by a timer which turns the LED on and off at specified times and also be responsive to the temperature sensor.

Figure 49:
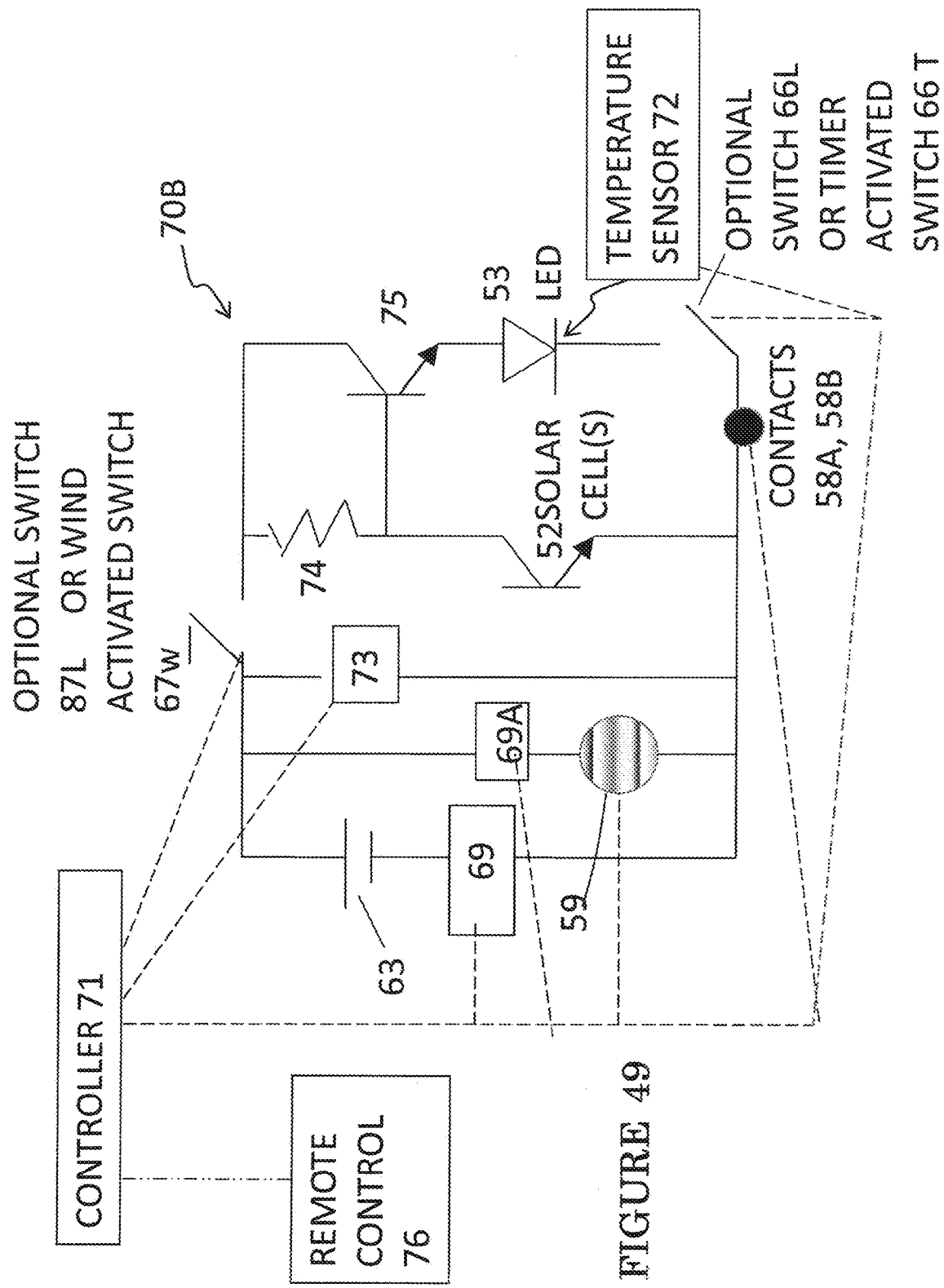
FIG. 49 is a schematic circuit 70B diagram showing the optional controller with control lines represented by dashed lines.

FIG. 49 is a schematic diagram showing circuitry 70B comprising an optional controller 71, with control lines represented by dashed lines. Controller 71 may be a microprocessor, programmable controller, processor, programmable chip device, computer, microcomputer, controller or the like. Controller 71 may receive control signals from the low battery indicator 73 and, in turn, regulate the contacts 58A, 58B such that the contacts are only intermittently connected to create a strobe-like effect for the activation of LEDs 53L. Similarly, if temperature sensor 72 sends a high temperature control signal to the controller 71, controller 71 may send control signals via the control lines to any one of or in tandem open the optional switch 66L to prevent over heating of the LED, activate motor/generator 59 to rotate the support 53 to create a cooling effect, and/or shorten the contact duration through contacts 58A, 58B. Moreover, alternatively controller 71 may have a light detector which turns the LED on and off at daylight and dusk either by sensing the intensity of light from the sun and/or environment or by a timer which turns the LED on and off at specified times. Moreover the controller 71 may be a programmable controller includes a feedback routine for measuring the intensities of the LEDs 53L and using the actual intensities as feedback. Optionally, the controller may cause the LEDs 53L to be supplied with approximately 50% of said maximum current capacity or some fraction thereof to either conserve power or reduce the temperature of the LEDs. Optionally, the programmable controller may operate to adjust the intensity, with the programmable controller including an intensity compensation routine for adjusting the intensity of the LED, based on the intensity as detected by feedback means.

As used herein, the terminology "without operator handling" means, in the case of the protruding portions entering the receptacles, that allow the operator may be controlling the positioning of the vehicle, the location of the protruding contact portions is determined by the positioning of the vehicle and the operator need not disembark from the vehicle. At the same time, the assembly may be removably positioned on the periphery of the vehicle by the operator without departing from the scope of the invention.

As used herein the geographical orientation means the vehicle orientation in terms of north, east, west or south.

As used herein the terminology "processor" or "controller" as used herein may be a microprocessor, computer, programmable controller, programmable chip, multiprocessor, personal computer, CPU, coprocessor, central processor, or the like.

The terminology motor/generator as used herein means a combination motor/generator or, in the alternative, a motor operatively connected to a generator. The motor/generator having a motor mode when it is used to turn a shaft and a generator mode in which a turning shaft generates electrical power.

As used herein the terminology "external" means external to the vehicle.

Embodiments of the present invention are described herein are schematic illustrations of idealized embodiments of the present invention. As such, variations from the shapes of the illustrations as a result, for example, of manufacturing techniques and/or tolerances, are to be expected. The embodiments of the present invention should not be construed as limited to the particular shapes of displays illustrated herein but are to include deviations in shapes that result, for example, from manufacturing. The regions (or display areas) illustrated in the figures are schematic in nature and their shapes are not intended to illustrate the precise shape of a region and are not intended to limit the scope of the present invention.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

The invention claimed is:

1. An assembly for recharging an electric vehicle comprising:
   at least one solar panel movably positioned above the surface of a vehicle;
   at least one motor assembly operatively connected to the at least one solar panel for movably positioning the at least one solar panel;
   the at least one solar panel moving by operation of the at least one motor assembly;
   the at least one solar panel being automatically positionable by the at least one motor assembly for substantially optimal absorption of sunlight; the at least one motor assembly moves the at least one solar panel in response to a timer and a geographical position sensor in order to track the position of the sun.

2. The assembly of claim 1 further comprising at least one sensor which detects the amount of electricity being converted from solar energy by the at least one solar panel; the at least one motor assembly operatively connected to the at least one sensor to automatically move the at least one solar panel in response to the movement of the sun.

3. The assembly of claim 2 wherein based upon the amount of electricity produced by the at least one solar panel, the at least one motor assembly operates to periodically automatically move the at least one solar panel to a point of maximum exposure to the sunlight.

4. The assembly of claim 3 wherein the at least one solar panel comprises at least three inter connected sections, a rear section which covers at least a portion of the rear of the vehicle, a middle section which covers at least a portion of the central portion of the vehicle and a front section which covers at least a portion of the front the vehicle and the at least one motor assembly controls the positioning of the front and rear sections to afford maximum exposure to the sun.

5. The assembly of claim 4 wherein the front and rear sections move from a closed position in which the front, middle and rear sections are stacked on top of one another in close proximity to a position in which the front and rear sections cover at least portions of the front and rear of the vehicle.

6. The assembly of claim 2 wherein the movement of the front and rear sections is controlled by a processor which is operatively connected to the at least one sensor, the processor operating to individually position the front and rear sections to obtain maximum exposure to the sun.

7. The assembly of claim 3 wherein the at least one sensor comprises an ammeter and the at least one solar panel is positionable by the at least one motor assembly to obtain optimal exposure to the sun using an ammeter to determine the maximum current available, the ammeter measuring the amount of electricity collected while the at least one motor moves the at least one solar panal slowly to and fro to obtain an optimal position.

8. The assembly of claim 1 wherein the at least one solar panel comprises front and rear sections, the front and rear sections covering at least portions of the front and rear of the vehicle, and wherein the at least one solar panel is positionable to obtain increased and/or maximum exposure to the sun using a timer to adjust the positioning of the front and rear sections.

9. The assembly of claim 1 wherein the assembly operates to position the at least one solar panel substantially perpendicular to the sunlight direction.

10. The assembly of claim 1 wherein the at least one motor assembly is operatively controlled by at least one processor operatively connected to the processor, and wherein the assembly is removably attached to the vehicle and wherein at least one solar panel is positioned for maximum exposure to sunlight by the processor which determines the optimal position of the at least one solar panel based upon the amount of electricity being generated.

11. The assembly of claim 1 further including a geographical orientation detector operatively connected to the at least one motor assembly, the geographical orientation detector comprising a compass which detects the orientation of the at least one solar panel relative to the sun, the at least one motor assembly operating to position the at least one solar panel so that it absorbs sunlight from the east in the morning hours and from the west in the evening hours.

12. The solar energy conversion assembly for converting solar power into electricity to power and electric vehicle comprising:
   a solar collector comprising a plurality of interconnected portions adapted to be mounted to the roof of a vehicle;
   at least one motor assembly which operates to open the solar collector from a closed position on the top of the vehicle to an open position which covers a substantial portion of the upper surface of the vehicle including at least the front windshield, a detector which detects the geographical orientation of the vehicle and a timer which regulates the position of at least one of the interconnected portions to control the amount of light being absorbed by at least one of the interconnected portions, the at least one motor assembly operating to position the at least one of the interconnected portions in response to the timer, the at least one solar collector being electrically connectable to the electric system of the car for recharging the batteries of the vehicle; wherein the at least one motor assembly positions at least two of the interconnected portions in response to orientation of the vehicle detected by the geographical orientation detector, such that the at least two interconnected portions may be positioned for maximum exposure to sunlight using both the geographical orientation detector and timer.

13. The assembly of claim 12 further comprising a detector which detects the amount of light being absorbed by at least one of the interconnected portions, the at least one motor assembly operating to position the at least one of the interconnected portions in response to the amount of light detected by the detector.

\* \* \* \* \*